US012676402B2

(12) United States Patent
Lee et al.

(10) Patent No.:    US 12,676,402 B2
(45) Date of Patent:        Jul. 7, 2026

(54) ELECTRONIC DEVICE INCLUDING ANTENNA

(71) Applicant: Samsung Electronics Co., Ltd., Suwon-si (KR)

(72) Inventors: Hyungjoo Lee, Suwon-si (KR); Soonheung Kwon, Suwon-si (KR); Hosaeng Kim, Suwon-si (KR); Sumin Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 223 days.

(21) Appl. No.: 18/484,059

(22) Filed: Oct. 10, 2023

(65)         Prior Publication Data

US 2024/0079762 A1      Mar. 7, 2024

Related U.S. Application Data

(63) Continuation of application No. PCT/KR2023/012901, filed on Aug. 30, 2023.

(30)        Foreign Application Priority Data

Sep. 6, 2022    (KR) ........................ 10-2022-0112776
Oct. 18, 2022    (KR) ........................ 10-2022-0133922

(51) Int. Cl.
  H01Q 1/24          (2006.01)
  H01Q 9/04          (2006.01)
        (Continued)
(52) U.S. Cl.
  CPC ............. H01Q 1/243 (2013.01); H01Q 9/045 (2013.01); H01Q 21/24 (2013.01); H04M 1/026 (2013.01)

(58) Field of Classification Search
  CPC ... H04B 1/40; H04B 5/43; H04B 7/02; H04B 7/04; H04B 7/0404
  See application file for complete search history.

(56)              References Cited

U.S. PATENT DOCUMENTS 8,947,302 B2 *   2/2015  Caballero ........... H04M 1/0202
                                                          343/702
9,331,397 B2 *   5/2016  Jin ......................... H01Q 1/243
        (Continued)

FOREIGN PATENT DOCUMENTS

KR    10-2021-0054262 A     5/2021
KR    10-2021-0090520 A     7/2021
        (Continued)

OTHER PUBLICATIONS

International Search Report and Written Opinion dated Dec. 8, 2023, issued in International Application No. PCT/KR2023/012901.
        (Continued)

*Primary Examiner* — Wen W Huang
(74) *Attorney, Agent, or Firm* — Jefferson IP Law, LLP

(57)              ABSTRACT

An electronic device is provided. The electronic device includes a housing including a lateral member, a printed circuit board disposed inside the housing and including a first ground point and a second ground point electrically connected to a first point and a second point of a first conductive part of the lateral member, a first antenna including a first feeding point disposed between the first point and the second point, and configured to transmit and/or receive a first polarization signal, a patch antenna including a first feeder point and configured to transmit and/or receive a first polarization signal, a wireless communication module electrically connected to the first feeding point and the first feeder point, and a processor electrically connected to the wireless communication module and configured to transmit (Continued)

and/or receive the first polarization signal by using the patch antenna and the first antenna.

20 Claims, 40 Drawing Sheets

(51) Int. Cl.
    *H01Q 21/24*         (2006.01)
    *H04M 1/02*         (2006.01)

(56)         References Cited

U.S. PATENT DOCUMENTS

| | | | | |
|---|---|---|---|---|
| 10,224,606 | B2 * | 3/2019 | Kim | H01Q 1/48 |
| 10,756,418 | B2 | 8/2020 | Ghabra et al. | |
| 11,095,017 | B2 | 8/2021 | Cooper et al. | |
| 11,722,983 | B2 | 8/2023 | Lee et al. | |
| 11,735,815 | B2 | 8/2023 | Rodriguez et al. | |
| 11,984,661 | B2 | 5/2024 | Jiang et al. | |
| 2015/0048979 | A1 * | 2/2015 | Asrani | H01Q 5/50 |
| | | | | 343/702 |
| 2015/0171916 | A1 * | 6/2015 | Asrani | H04M 1/0202 |
| | | | | 455/575.7 |
| 2017/0264721 | A1 * | 9/2017 | Yli-Peltola | H04M 1/026 |
| 2017/0302771 | A1 * | 10/2017 | Kim | H01Q 9/42 |
| 2018/0277929 | A1 * | 9/2018 | Seo | H01Q 1/241 |
| 2018/0301787 | A1 * | 10/2018 | Han | H04B 7/0404 |
| 2019/0081694 | A1 * | 3/2019 | Zhou | H05K 1/028 |
| 2020/0161763 | A1 * | 5/2020 | Lee | H01Q 25/00 |
| 2021/0013940 | A1 * | 1/2021 | Lu | H04B 1/58 |
| 2021/0075090 | A1 | 3/2021 | Yarga et al. | |
| 2021/0135351 | A1 | 5/2021 | Son et al. | |
| 2021/0135361 | A1 * | 5/2021 | Cooper | H01Q 9/42 |
| 2021/0320417 | A1 | 10/2021 | Lee et al. | |
| 2021/0356550 | A1 | 11/2021 | Lee et al. | |
| 2022/0029298 | A1 | 1/2022 | Huang et al. | |
| 2022/0384933 | A1 * | 12/2022 | Choi | H01Q 5/42 |
| 2023/0118019 | A1 | 4/2023 | Seol et al. | |
| 2023/0163469 | A1 | 5/2023 | Yun et al. | |
| 2023/0178901 | A1 | 6/2023 | Kim et al. | |
| 2023/0239385 | A1 | 7/2023 | Lee et al. | |

FOREIGN PATENT DOCUMENTS

| | | |
|---|---|---|
| KR | 10-2021-0125345 A | 10/2021 |
| KR | 10-2021-0141116 A | 11/2021 |
| KR | 10-2022-0007331 A | 1/2022 |
| KR | 10-2022-0012065 A | 2/2022 |
| KR | 10-2022-0017131 A | 2/2022 |
| KR | 10-2022-0046309 A | 4/2022 |
| KR | 10-2022-0065630 A | 5/2022 |

OTHER PUBLICATIONS

Extended European Search Report dated Aug. 26, 2025, issued in European Application No. 23863402.6-1201.

* cited by examiner

Co-pol
(H)

Cross-pol
(V)

ELECTRONIC DEVICE INCLUDING ANTENNA

CROSS-REFERENCE TO RELATED APPLICATION(S)

This application is a continuation application, claiming priority under § 365(c), of an International application No. PCT/KR2023/012901, filed on Aug. 30, 2023, which is based on and claims the benefit of a Korean patent application number 10-2022-0112776, filed on Sep. 6, 2022, in the Korean Intellectual Property Office, and of a Korean patent application number 10-2022-0133922, filed on Oct. 18, 2022, in the Korean Intellectual Property Office, the disclosure of each of which is incorporated by reference herein in its entirety.

TECHNICAL FIELD

The disclosure relates to an electronic device including at least one antenna.

BACKGROUND ART

Usage of an electronic device, such as a bar type, a foldable type, a rollable type, a sliding type, or a wearable type, is on the rise, and various functions are provided to the electronic device.

The electronic device may make a phone call with another electronic device and may transmit and receive various kinds of data to and from the other electronic device through wireless communication.

The electronic device may include at least one antenna in order to perform wireless communication with another electronic device by using a network.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device may use an angle of arrival (AoA) service that can measure the location of another electronic device by utilizing ultra wide band (UWB) communication.

The electronic device may include a first patch antenna, a second patch antenna, and a third patch antenna. For example, the first patch antenna and the second patch antenna may measure an angle of arrival (AoA) of a polarization (e.g., vertical polarization) in a first scan direction, and the first patch antenna and the third patch antenna may measure an angle of arrival (AoA) of polarization (e.g., horizontal polarization) in a second scan direction, so that the electronic device may measure the location of another electronic device.

In case that the electronic device measures the angle of arrival (AoA) of another electronic device by using three patch antennas (e.g., the first patch antenna, second patch antenna, and third patch antenna), the electronic device may have a reduced inner space in which other electronic components are disposed.

Aspects of the disclosure are to address at least the above-mentioned problems and/or disadvantages and to provide at least the advantages described below. Accordingly, an aspect of the disclosure is to provide an electronic device which can measure the angle of arrival (AoA) for a first polarization (e.g., vertical polarization) signal and a second polarization (e.g., horizontal polarization) signal by using patch antennas and at least one antenna including a conductive part included in a housing (e.g., lateral member) of the electronic device.

Another aspect of the disclosure is to provide an electronic device which can transmit and/or receive a first polarization (e.g., vertical polarization) signal and a second polarization (e.g., horizontal polarization) signal by using patch antennas and at least one antenna including a conductive part included in a housing (e.g., lateral member) of the electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a front plate, a rear plate, and a lateral member surrounding a space between the front plate and the rear plate, a printed circuit board disposed inside the housing and including a ground, and including a first ground point and a second ground point electrically connected to a first point and a second point of a first conductive part formed on the lateral member, a first antenna including a first feeding point disposed between the first point and the second point of the first conductive part formed on the lateral member, and configured to transmit and/or receive a first polarization signal, a patch antenna disposed inside the housing, including a first feeder point, and configured to transmit and/or receive a first polarization signal, a wireless communication module electrically connected to the first feeding point of the first conductive part and the first feeder point of the patch antenna, and a processor electrically connected to the wireless communication module, wherein the processor is configured to transmit and/or receive the first polarization signal by using the patch antenna and the first antenna.

In accordance with another aspect of the disclosure, an electronic device is provided. The electronic device includes a lateral member including a first segment part, a second segment part, and a third segment part, a printed circuit board disposed inside a housing of the electronic device at least partly spaced apart from the lateral member and including a ground, and including a first ground point, a second ground point, a third ground point, and/or a fourth ground point, a first antenna disposed between the first segment part and the second segment part, and including a first conductive part including a first feeding point, a first point, and a second point, a second antenna disposed between the second segment part and the third segment part, and including a second conductive part including a second feeding point, a third point, and a fourth point, a patch antenna disposed inside the housing and including a first feeder point, a wireless communication module electrically connected to the first feeding point of the first conductive part, the second feeding point of the second conductive part, and the first feeder point of the patch antenna, and a processor electrically connected to the wireless communication module, wherein the processor is configured to transmit and/or receive a polarization signal by using the patch antenna, the first antenna, and the second antenna.

Advantageous Effects

According to various embodiments of the disclosure, it is possible to measure the angle of arrival (AoA) for the first polarization (e.g., vertical polarization) signal and the second polarization (e.g., horizontal polarization) signal by using the patch antennas and at least one antenna including the conductive part, and to secure disposition spaces of other electronic components included in the electronic device by reducing the number of patch antennas.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 4A is a diagram schematically illustrating an embodiment in which an electronic device transmits and/or receives a first polarization signal and a second polarization signal by using a patch antenna, a first antenna, and a second antenna according to an embodiment of the disclosure;

FIG. 5A is a diagram schematically illustrating an embodiment in which an electronic device transmits and/or receives a polarization signal by using at least one matching circuit and patch antenna according to an embodiment of the disclosure;

FIG. 11A is a diagram schematically illustrating an embodiment in which an electronic device transmits and/or receives a first polarization signal and a second polarization signal by using a patch antenna, a first antenna, a second antenna, and a third antenna according to an embodiment of the disclosure;

FIG. 14 is a diagram schematically illustrating an embodiment in which an electronic device includes a first antenna, a second antenna, and a third antenna according to an embodiment of the disclosure;

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
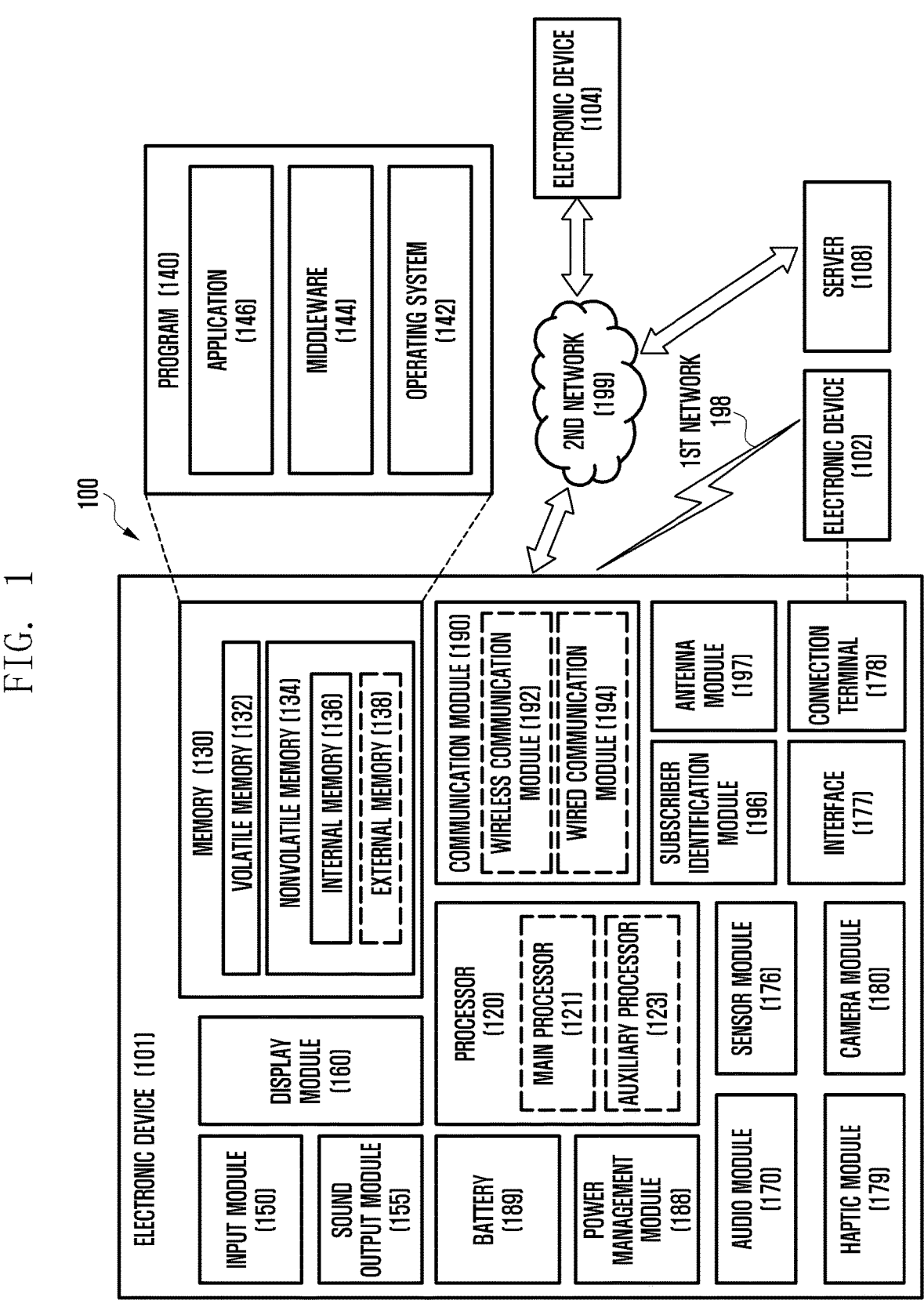
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Figure 2A:
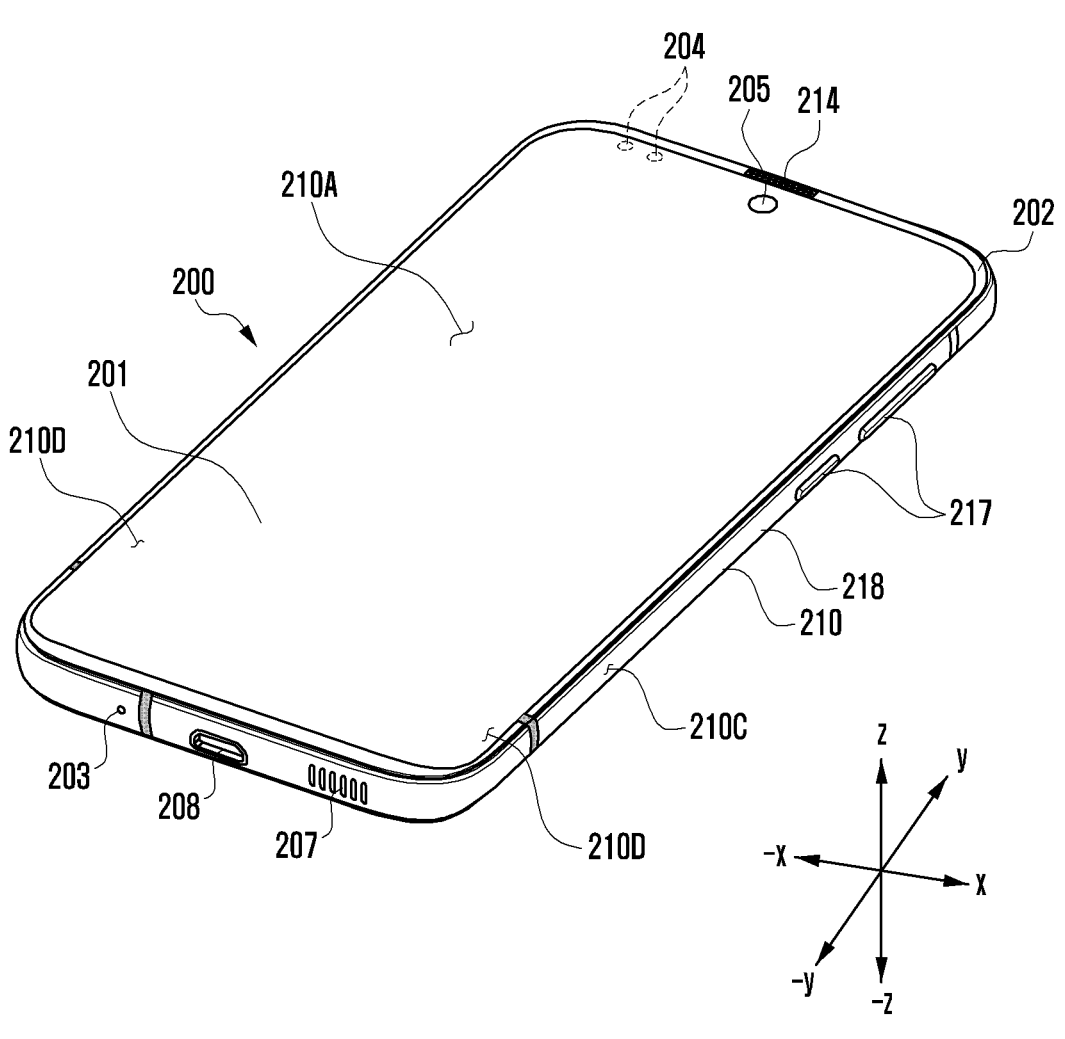
FIG. 2A is a perspective view of a front surface of an electronic device according to an embodiment of the disclosure.

FIG. 2A is a front perspective view of an electronic device according to an embodiment of the disclosure.

Figure 2B:
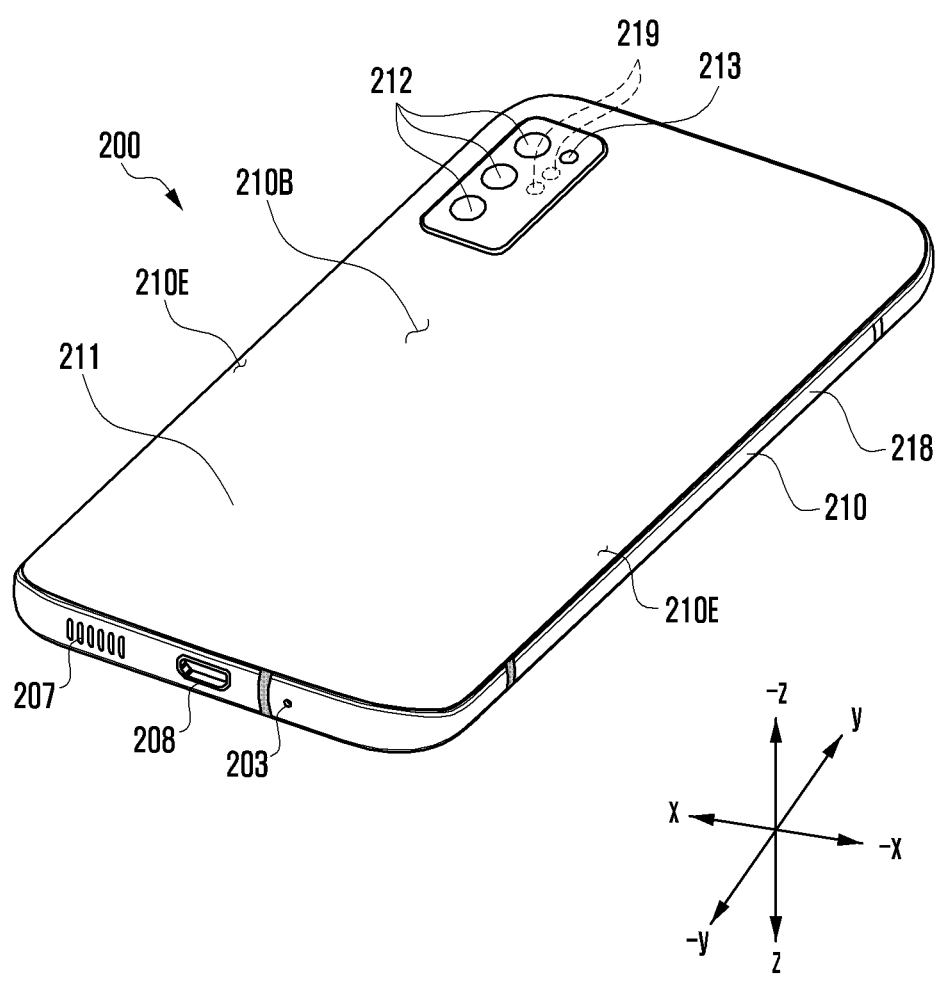
FIG. 2B is a perspective view of a rear surface of an electronic device according to an embodiment of the disclosure.

FIG. 2B is a rear perspective view of the electronic device in FIG. 2A according to an embodiment of the disclosure.

Referring to FIGS. 2A and 2B, an electronic device 200 according to an embodiment may include a housing 210 including a first surface (or front surface) 210A, a second surface (or rear surface) 210B, and a side surface 210C surrounding the space between the first surface 210A and the second surface 210B. In another embodiment (not illustrated), the housing may denote a structure that forms a part of the first surface 210A, the second surface 210B, and the side surface 210C illustrated in FIGS. 2A and 2B. According to an embodiment, the first surface 210A may be formed by a front plate 202, at least a part of which is substantially transparent (for example, a glass plate including various coating layers, or a polymer plate). The second surface 210B may be formed by a rear plate 211 that is substantially opaque. The rear plate 211 may be made of coated or colored glass, ceramic, polymer, metal (for example, aluminum, stainless steel (STS), or magnesium), or a combination of at least two of the above-mentioned materials. The side surface 210C may be formed by a side bezel structure (or "side member") 218 which is coupled to the front plate 202 and to the rear plate 211, and which includes metal and/or polymer. In some embodiments, the rear plate 211 and the side bezel structure 218 may be formed integrally and may include the same material (for example, a metal material such as aluminum).

In the illustrated embodiment, the front plate 202 may include two first areas 210D on both ends of the long edge of the front plate 202 such that the two first areas 210D bend from the first surface 210A toward the rear plate 211 and extend seamlessly. In the illustrated embodiment (see FIG. 2B), the rear plate 211 may include two second areas 210E on both ends of the long edge such that the two second areas 210E bend from the second surface 210B toward the front plate 202 and extend seamlessly. In some embodiments, the front plate 202 (or the rear plate 211) may include only one of the first areas 210D (or the second areas 210E). In another embodiment, a part of the first areas 210D or the second areas 210E may not be included. In the above embodiments, when seen from the side surface of the electronic device 200, the side bezel structure 218 may have a first thickness (or width) on a part of the side surface, which does not include the first areas 210D or the second areas 210E as described above, and may have a second thickness that is smaller than the first thickness on a part of the side surface, which includes the first areas 210D or the second areas 210E.

According to an embodiment, the electronic device 200 may include at least one of a display 201, audio modules 203, 207, and 214, sensor modules 204, 216, and 219, camera modules 205, 212, and 213, a key input device 217, a light-emitting element 206, and connector holes 208 and 209. In some embodiments, at least one of the constituent elements (for example, the key input device 217 or the light-emitting element 206) of the electronic device 200 may be omitted, or the electronic device 200 may additionally include another constituent element.

The display 201 may be exposed through a corresponding part of the front plate 202, for example. In some embodiments, at least a part of the display 201 may be exposed through the front plate 202 that forms the first areas 210D of the side surface 210C and the first surface 210A. In some embodiments, the display 201 may have a corner formed in substantially the same shape as that of the adjacent outer periphery of the front plate 202. In another embodiment (not illustrated), in order to increase the area of exposure of the display 201, the interval between the outer periphery of the display 201 and the outer periphery of the front plate 202 may be formed to be substantially identical.

In another embodiment (not illustrated), a recess or an opening may be formed in a part of the screen display area of the display 201, and at least one of an audio module 214, a sensor module 204, a camera module 205, and a light-emitting element 206 may be included and aligned with the recess or the opening. In another embodiment (not illustrated), on the back surface of the screen display area of the display 201, at least one of an audio module 214, a sensor module 204, a camera module 205, a fingerprint sensor 216, and a light-emitting element 206 may be included. In another embodiment (not illustrated), the display 201 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 204 and 219 and/or at least a part of the key input device 217 may be arranged in the first areas 210D and/or the second areas 210E.

The audio modules 203, 207, and 214 may include a microphone hole 203 and speaker holes 207 and 214. A microphone for acquiring an external sound may be arranged in the microphone hole 203, and a plurality of microphones may be arranged therein such that the direction of a sound can be sensed in some embodiments. The speaker holes 207 and 214 may include an outer speaker hole 207 and a speech receiver hole 214. In some embodiments, the speaker holes 207 and 214 and the microphone hole 203 may be implemented as a single hole, or a speaker may be included (for example, a piezoelectric speaker) without the speaker holes 207 and 214.

The sensor modules 204 and 219 may generate an electric signal or a data value corresponding to the internal operating condition of the electronic device 200 or the external environment condition thereof. The sensor modules 204 and 219 may include, for example, a first sensor module 204 (for example, a proximity sensor) arranged on the first surface 210A of the housing 210, and/or a second sensor module (not illustrated) (for example, a fingerprint sensor), and/or a third sensor module 219 (for example, an HRM sensor) arranged on the second surface 210B of the housing 210, and/or a fourth sensor module (for example, a fingerprint sensor). The fingerprint sensor may be arranged not only on the first surface 210A (for example, the display 201) of the housing 210, but also on the second surface 210B thereof. The electronic device 200 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor.

The camera modules 205, 212, and 213 may include a first camera device (e.g., camera module 205) arranged on the first surface 210A of the electronic device 200, a second camera device 212 arranged on the second surface 210B thereof, and/or a flash 213. The first and second camera devices (e.g., camera modules 205 and 212) may include a single lens or a plurality of lenses, an image sensor, and/or an image signal processor. The flash 213 may include, for example, a light-emitting diode (LED) or a xenon lamp. In some embodiments, two or more lenses (an infrared camera, a wide-angle lens, and a telephoto lens) and image sensors may be arranged on a single surface of the electronic device 200.

The key input device 217 may be arranged on the side surface 210C of the housing 210. In another embodiment, the electronic device 200 may not include a part of the above-mentioned key input device 217 or the entire key input device 217, and the key input device 217 (not included) may be implemented in another type, such as a soft key, on the display 201. In some embodiments, the key input device may include a sensor module 216 arranged on the second surface 210B of the housing 210.

The light-emitting element may be arranged on the first surface 210A of the housing 210, for example. The light-emitting element may provide information regarding the condition of the electronic device 200 in a light type, for example. In another embodiment, the light-emitting element may provide a light source that interworks with operation of the camera module 205, for example. The light-emitting element may include, for example, an LED, an IR LED, and a xenon lamp.

The connector hole 208 may include a first connector hole 208 capable of containing a connector (for example, a USB connector) for transmitting/receiving power and/or data to/from an external electronic device, and/or a second connector hole (for example, an earphone jack) capable of containing a connector for transmitting/receiving an audio signal to/from the external electronic device.

Figure 3:
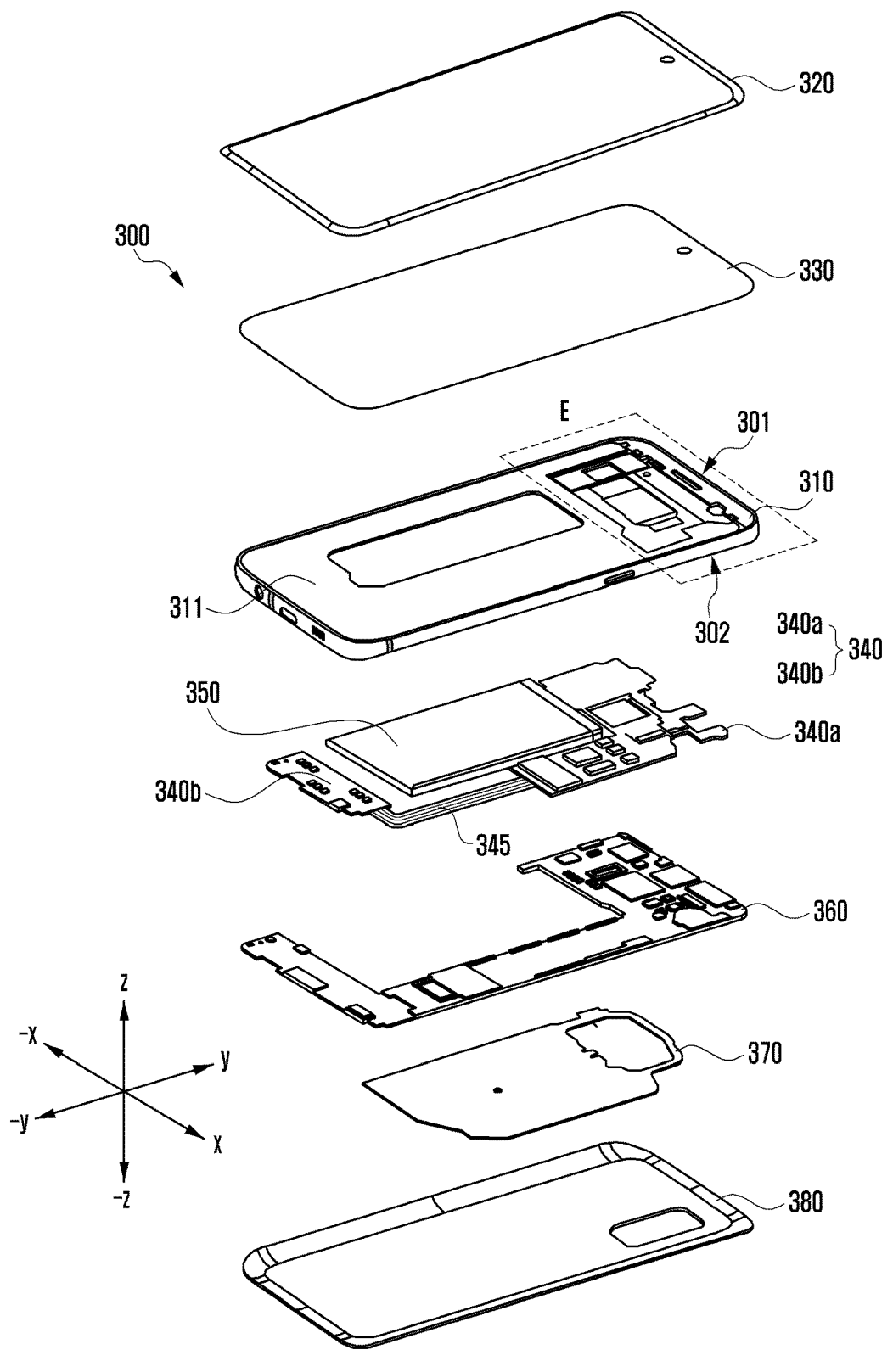
FIG. 3 is an exploded perspective view of an electronic device according to an embodiment of the disclosure.

FIG. 3 is an exploded perspective view of an electronic device according to an embodiment of the disclosure.

Referring to FIG. 3, an electronic device 300 may include a side bezel structure (e.g., lateral member 310), a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIGS. 1, 2A and 2B, and repeated descriptions thereof will be omitted herein.

The first support member 311 may be arranged inside the electronic device 300 and connected to the side bezel structure or lateral member 310, or may be formed integrally with the side bezel structure or lateral member 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

According to various embodiments, the printed circuit board 340 may include a first PCB 340a and/or a second PCB 340b. For example, the first PCB 340a and the second PCB 340b may be disposed to be spaced apart from each other, and may be electrically connected to each other by using a connection member 345 (e.g., coaxial cable and/or FPCB). For example, the printed circuit board 340 may include a structure in which a plurality of printed circuit boards (PCBs) are laminated. For example, the printed circuit board 340 may include an interposer structure. In an embodiment, the printed circuit board 340 may be implemented in the form of a flexible printed circuit board (FPCB) and/or a rigid printed circuit board (rigid PCB).

According to various embodiments, the wireless communication module 192 electrically connected to a processor 120 may be disposed on the printed circuit board 340. The wireless communication module 192 may be electrically connected to at least one patch antenna.

According to various embodiments, the lateral member 310 (e.g., housing) may include at least one conductive part separated through at least one segment part. In an embodiment, the at least one conductive part may be electrically connected to the wireless communication module 192, and perform a function of at least one antenna. In an embodiment, the lateral member 310 may include a first lateral surface 301 in the y-axis direction and a second lateral surface 302 in the x-axis direction.

The memory may include a volatile memory or a non-volatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure or lateral member 310 and/or the first support member 311

According to various embodiments, the electronic device 300 of FIG. 3 may be at least partly similar to the electronic device 101 of FIG. 1 or the electronic device 200 of FIGS. 2A and/or 2B, or may include other embodiments of the electronic device.

According to various embodiments, an antenna module (e.g., an antenna module 197 of FIG. 1) including at least one patch antenna (e.g., a patch antenna 400 of FIG. 4A) may be disposed between the lateral member 310 (e.g., the first support member 311) and the rear plate 380. For example, the antenna module including at least one patch antenna (e.g., patch antenna 400 of FIG. 4A) may be disposed inside the lateral member 310. The at least one patch antenna (e.g., patch antenna 400 of FIG. 4A) may be disposed on the antenna module so that a beam pattern is formed in one direction (e.g., −z-axis direction). In an embodiment, the second support member 360 may be omitted from the electronic device 300 of FIG. 3. The antenna module (e.g., antenna module 197 of FIG. 1) including the at least one patch antenna (e.g., patch antenna 400 of FIG. 4A) may be electrically connected to the printed circuit board 340. The at least one patch antenna (e.g., patch antenna 400 of FIG. 4A) included in the antenna module may be electrically connected to the wireless communication module 192 disposed on the printed circuit board 340. The antenna module may include an ultra-wide band (UWB) antenna module.

Figure 4A:
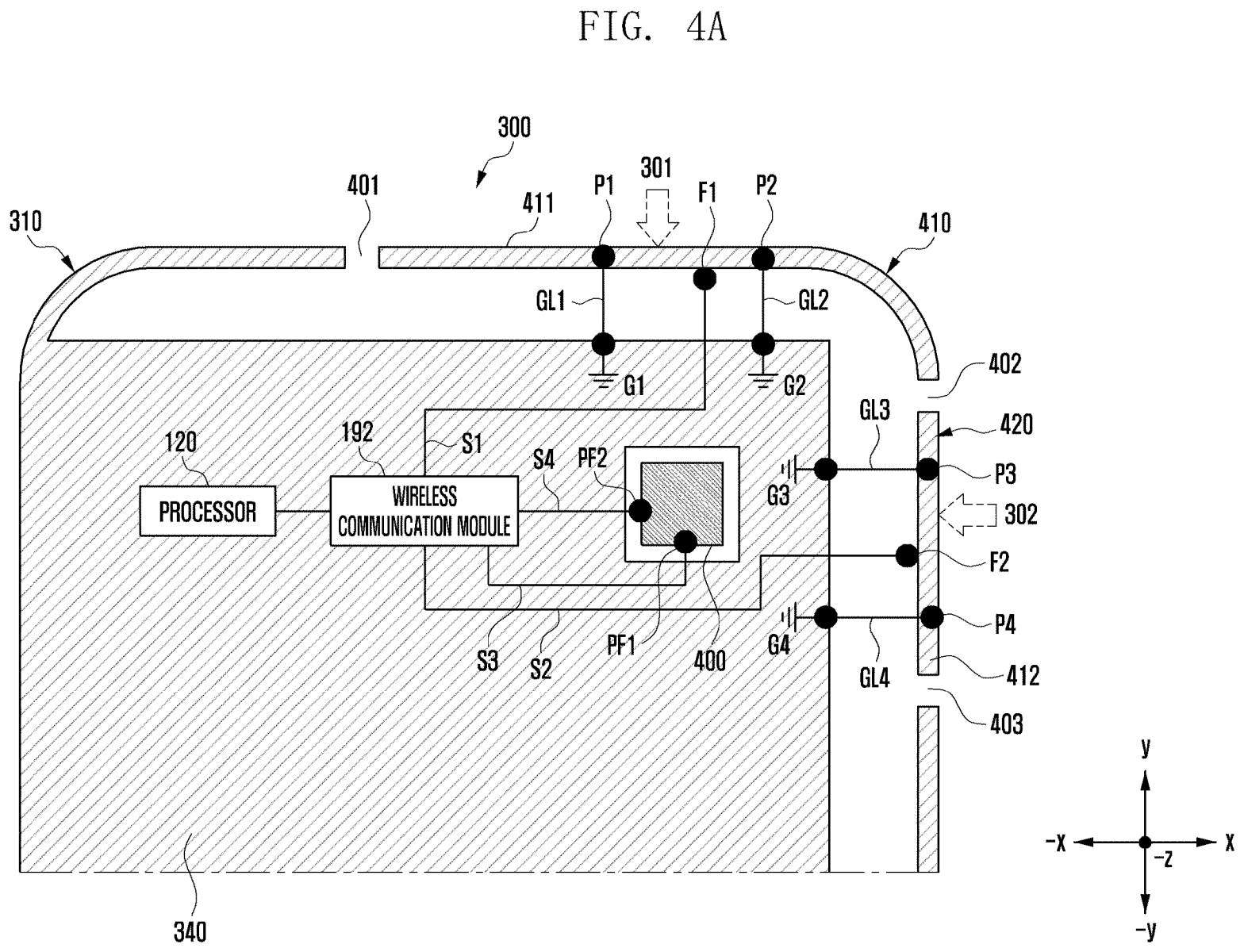

FIG. 4A is a diagram schematically illustrating an embodiment in which an electronic device transmits and/or receives a first polarization signal and a second polarization signal by using a patch antenna, a first antenna, and a second antenna according to an embodiment of the disclosure.

Figure 4B:
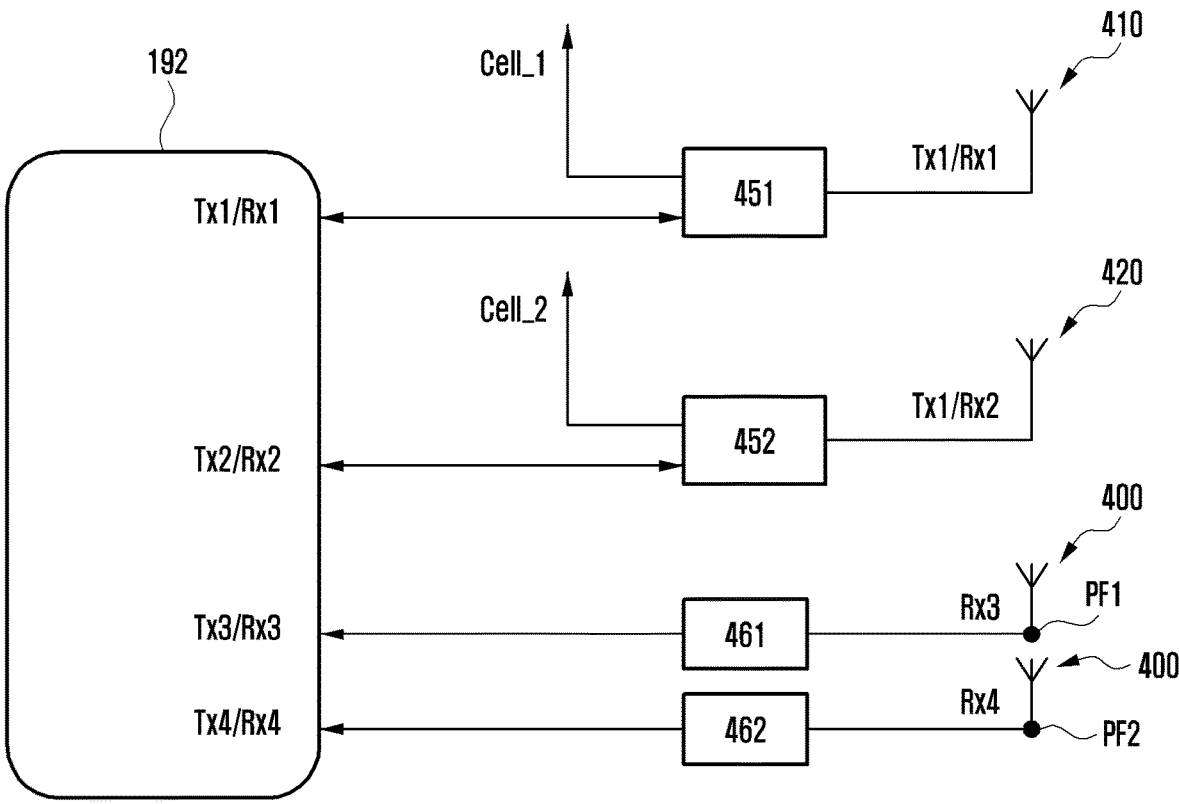
FIG. 4B is a diagram schematically illustrating a circuit constitution explaining an operation of the electronic device disclosed in FIG. 4A according to an embodiment of the disclosure.

FIG. 4B is a diagram schematically illustrating a circuit constitution explaining an operation of the electronic device disclosed in FIG. 4A according to an embodiment of the disclosure.

In an embodiment, FIG. 4A may be a drawing schematically illustrating a part (e.g., part E of FIG. 3) of the electronic device 300 when viewed in the −z-axis direction in a state where the printed circuit board 340 (e.g., first PCB 340a) is disposed on one surface (e.g., −z-axis direction) of the first support member 311 of the lateral member 310 (e.g., housing) disclosed in FIG. 3 according to various embodiments of the disclosure.

According to various embodiments, the electronic device 300 disclosed below may include the embodiments of the electronic devices 101, 200, and 300 disclosed in FIGS. 1, 2A, 2B, and 3. In describing the electronic device 300 disclosed below, the same reference numerals may be given to the constituent elements substantially the same as those in the embodiments disclosed in FIGS. 1, 2A, 2B, and 3, and duplicate explanation of their functions may be omitted.

According to an embodiment, although a bar type electronic device is described as an embodiment related to the electronic device 300 disclosed below, the embodiment is not limited thereto, and may also be applied to electronic devices, such as a foldable type, a rollable type, a sliding type, a wearable type, a tablet personal computer (PC), and/or a laptop PC.

Referring to FIG. 4A, the electronic device 300 may include the processor 120 and the wireless communication module 192 on the printed circuit board 340. The printed circuit board 340 may include a ground. The ground of the printed circuit board 340 may include at least one ground point (e.g., a first ground point G1, a second ground point G2, a third ground point G3, and/or a fourth ground point G4). The printed circuit board 340 may be disposed inside the lateral member 310 (e.g., housing). In an embodiment, the printed circuit board 340 may be spaced apart from the lateral member 310 at least partly.

According to an embodiment, the lateral member 310 of the electronic device 300 may include a first segment part 401, a second segment part 402, and/or a third segment part 403. The first segment part 401 may be formed, for example, on the first lateral surface 301 in the y-axis direction of the lateral member 310 of the electronic device. The second segment part 402 and the third segment part 403 may be formed on the second lateral surface 302 in the x-axis direction of the lateral member 310 of the electronic device 300. For example, the second segment part 402 may be formed more adjacent to the first lateral surface 301 in the y-axis direction than the third segment part 403.

According to an embodiment, a first conductive part 411 (e.g., first radiator) may be located between the first segment part 401 and the second segment part 402. In an embodiment, the first conductive part 411 may include a first feeding point F1, a first point P1, and a second point P2. The first conductive part 411 may be electrically connected to the wireless communication module 192 through the first feeding point F1 and a first signal path S1, and perform the function of a first antenna 410. For example, the first feeding point F1 may be located between the first point P1 and the second point P2. For example, the first point P1 may be located between the first segment part 401 and the first feeding point F1. For example, the second point P2 may be located between the second segment part 402 and the first feeding point F1. The first point P1 may be electrically connected to the first ground point G1 of the printed circuit board 340 through a first ground path GL1. The second point P2 may be electrically connected to the second ground point G2 of the printed circuit board 340 through a second ground path GL2. The first ground point G1 and the second ground point G2 may ground the first conductive part 411. For example, the first antenna 410 including the first conductive part 411 may operate as a first slot antenna by using the first ground point G1, the first point P1, the second point P2, and the second ground point G2. In an embodiment, the first ground path GL1 and the second ground path GL2 may include a conductive connection member (e.g., a pad for contact, a coupling member, a C-clip, or a conductive foam spring). The first ground path GL1 and the second ground path GL2 may form a ground part electrically connecting the ground of the printed circuit board 340 and the first antenna 410 (e.g., first conductive part 411) to each other.

According to an embodiment, a second conductive part 412 (e.g., second radiator) may be located between the second segment part 402 and the third segment part 403. In an embodiment, the second conductive part 412 may include a second feeding point F2, a third point P3, and a fourth point P4. The second conductive part 412 may be electrically connected to the wireless communication module 192 through the second feeding point F2 and a second signal path S2, and perform the function of a second antenna 420. For example, the second feeding point F2 may be located between the third point P3 and the fourth point P4. For example, the third point P3 may be located between the second segment part 402 and the second feeding point F2. For example, the fourth point P4 may be located between the third segment part 403 and the second feeding point F2. The third point P3 may be electrically connected to the third ground point G3 of the printed circuit board 340 through a third ground path GL3. The fourth point P4 may be electrically connected to the fourth ground point G4 of the printed circuit board 340 through a fourth ground path GL4. The third ground point G3 and the fourth ground point G4 may ground the second conductive part 412. For example, the second antenna 420 including the second conductive part 412 may operate as a second slot antenna by using the third ground point G3, the third point P3, the fourth point P4, and the fourth ground point G4. In an embodiment, the third ground path GL3 and the fourth ground path GL4 may include a conductive connection member (e.g., a pad for contact, a coupling member, a C-clip, or a conductive foam spring). The third ground path GL3 and the fourth ground path GL4 may form a ground part electrically connecting the ground of the printed circuit board 340 and the second antenna 420 (e.g., second conductive part 412) to each other.

According to an embodiment, the processor 120 may be electrically connected to the wireless communication module 192. For example, the wireless communication module 192 may include a radio frequency integrated circuit (RFIC) and/or an ultra-wide band (UWB) integrated circuit (IC). The processor 120 may control the wireless communication module 192. The processor 120 may control the wireless communication module 192 to transfer a feeding signal to at least one of the first feeding point F1 and the second feeding point F2 of the first conductive part 411. The processor 450 may include, for example, a communication processor.

According to an embodiment, the wireless communication module 192 may be electrically connected to the first feeding point F1 of the first conductive part 411 and the second feeding point F2 of the second conductive part 412. For example, the wireless communication module 192 may be electrically connected to the first feeding point F1 through the first signal path S1. For example, the wireless communication module 192 may be electrically connected to the second feeding point F2 through the second signal path S2. In an embodiment, the wireless communication module 192 may selectively transfer the feeding signal to the first feeding point F1 and/or the second feeding point F2 under the control of the processor 120.

According to various embodiments, at least one wireless communication module 192 may be included. For example, a plurality of wireless communication modules 192 may be included, and may be electrically connected to the first feeding point F1 and the second feeding point F2 to match the situation. In various embodiments, the wireless communication module 192 may be electrically connected to the first feeding point F1 and/or the second feeding point F2 by using the connection member, for example, such as the pad for contact, the coupling member, the C-clip, or the conductive foam spring. The wireless communication module 192 may support so that the first conductive part 411 and/or the second conductive part 412 transmit and/or receive the wireless signal.

According to an embodiment, the patch antenna 400 may include a first feeding point PF1 and/or a second feeding point PF2. For example, the first feeding point PF1 may be located in the −y-axis direction of the patch antenna 400. For example, the second feeding point PF2 may be located in the −x-axis direction of the patch antenna 400. The first feeding point PF1 of the patch antenna 400 may be electrically connected to the wireless communication module 192 through a third signal path S3. The second feeding point PF2 of the patch antenna 400 may be electrically connected to the wireless communication module 192 through a fourth signal path S4. In an embodiment, the processor 120 may control the wireless communication module 192 to transfer the feeding signal to at least one of the first feeding point PF1 and the second feeding point PF2 of the patch antenna 400. For example, the wireless communication module 192 may selectively transfer the feeding signal to the first feeding point PF1 and/or the second feeding point PF2 of the patch antenna 400 under the control of the processor 120. The processor 120 may determine the polarization direction of a first polarization (e.g., vertical polarization) signal and a second polarization (e.g., horizontal polarization) signal by controlling the feeding signal being transferred to the first feeding point PF1 and/or the second feeding point PF2 of the patch antenna 400 through the wireless communication module 192.

According to an embodiment, the first feeding point PF1 of the patch antenna 400 may receive the feeding signal transferred from the wireless communication module 192 in order to transmit and/or receive the signal having the first polarization (e.g., vertical polarization) to and/or from the first antenna 410 including the first conductive part 411. For example, the processor 120 may control the wireless communication module 192 to transfer the feeding signal to the first feeding point F1 of the first antenna 410 including the first conductive part 411 and the first feeding point PF1 of the patch antenna 400, and measure the angle of arrival for the polarization (e.g., first polarization (vertical polarization)) in a first scan direction (e.g., direction in parallel to the y axis and −y axis).

According to an embodiment, the second feeding point PF2 of the patch antenna 400 may receive the feeding signal transferred from the wireless communication module 192 in order to transmit and/or receive the signal having the second polarization (e.g., horizontal polarization) to/from the second antenna 420 including the second conductive part 412. For example, the processor 120 may control the wireless communication module 192 to transfer the feeding signal to the second feeding point F2 of the second antenna 420 including the second conductive part 412 and the second feeding point PF2 of the patch antenna 400, and measure the angle of arrival for the polarization (e.g., second polarization (vertical polarization)) in a second scan direction (e.g., direction in parallel to the x axis and –x axis).

According to an embodiment, the processor 120 may transfer the feeding signal to the first feeding point PF1 of the patch antenna 400 and the first feeding point F1 of the first antenna 410 including the first conductive part 411, and measure the locations of other electronic devices (e.g., electronic devices 102 and 104 of FIG. 1) by measuring the angle of arrival for the first polarization (e.g., vertical polarization). In an embodiment, the processor 120 may transfer the feeding signal to the second feeding point PF2 of the patch antenna 400 and the second feeding point F2 of the second antenna 420 including the second conductive part 412, and measure the locations of other electronic devices (e.g., electronic devices 102 and 104 of FIG. 1) by measuring the angle of arrival for the second polarization (e.g., horizontal polarization).

According to various embodiments, the patch antenna 400 may operate as the ultra-wide band (UWB) antenna for transmitting and receiving a signal of a designated frequency band (e.g., about 6 gigahertz (GHz) to 11 GHz). In an embodiment, the patch antenna 400 may transmit and/or receive the first polarization (e.g., vertical polarization) signal by using the first feeding point PF1 located in the –y-axis direction of the patch antenna 400, and may transmit and/or receive the second polarization (e.g., horizontal polarization) signal by using the second feeding point PF2 located in the –x-axis direction of the patch antenna 400. In various embodiments, the patch antenna 400 may transmit and/or receive a third polarization (e.g., diagonal polarization) signal by using a feeder point (e.g., feeding point PF of FIG. 5A) that may be disposed at a designated location (e.g., a corner between the –x-axis direction and the –y-axis direction) of the patch antenna 400. For example, the third polarization (e.g., diagonal polarization) may include components of the first polarization (e.g., vertical polarization) and the second polarization (e.g., horizontal polarization) as described above. In an embodiment, the feeder point that transmits and/or receives the third polarization (e.g., diagonal polarization) signal may transmit and/or receive the signal having the diagonal polarization between the x-axis direction and the y-axis direction. In an embodiment, the polarization direction of the patch antenna 400 may be changed in accordance with the location of the feeder point.

Referring to FIG. 4B, in an embodiment, a first diplexer 451 may be disposed between the wireless communication module 192 (e.g., UWB IC) and the first antenna 410 including the first conductive part 411. For example, the first diplexer 451 may be disposed on the printed circuit board 340. For example, the first diplexer 451 may separate a frequency signal excluding the UWB frequency band (e.g., about 6 GHz to 11 GHz) being received through the first antenna 410 to Cell_1, and transfer only the signal of the UWB frequency band to the wireless communication module 192. In an embodiment, the frequency signal separated to the Celli may be connected to another wireless communication module, and may be used for various communication services (e.g., long term evolution (LTE), millimeter wave (mmWave), global positioning system (GPS), Bluetooth™, or wireless-fidelity (Wi-Fi) communication).

According to an embodiment, a second diplexer 452 may be disposed between the wireless communication module 192 (e.g., UWB IC) and the second antenna 420 including the second conductive part 412. For example, the second diplexer 452 may be disposed on the printed circuit board 340. For example, the second diplexer 452 may separate a frequency signal excluding the UWB frequency band (e.g., about 6 GHz to 11 GHz) being received through the second antenna 420 to Cell_2, and transfer only the signal of the UWB frequency band to the wireless communication module 192. In an embodiment, the frequency signal separated to the Cell_2 may be connected to another wireless communication module, and may be used for various communication services (e.g., LTE, mmWave, GPS, or Wi-Fi communication).

According to various embodiments, the first diplexer 451 and the second diplexer 452 may include branch filter elements used to prevent channel interference and to combine or separate/divide two signals having different frequencies on one channel or line. For example, the first diplexer 451 and the second diplexer 452 may be couplers for sharing two different frequency signals. For example, the first diplexer 451 and the second diplexer 452 may be couplers or filters for propagating and radiating communication signals of two different frequency bands without interference by sharing one antenna. For example, each of the first diplexer 451 and the second diplexer 452 may include a low pass filter (LPF) and/or a high pass filter (HPF).

According to an embodiment, a first filter 461 (e.g., band pass filter (BPF)) may be disposed between the wireless communication module 192 and the first feeding point PF1 of the patch antenna 400. For example, the first filter 461 may be disposed on the printed circuit board 340. For example, the first filter 461 may filter the frequency signal excluding the UWB frequency band that is received through the patch antenna 400, and transfer only the signal of the UWB frequency band to the wireless communication module 192 in accordance with the activation of the first feeding point PF1 of the patch antenna 400.

According to an embodiment, a second filter 462 (e.g., band pass filter (BPF)) may be disposed between the wireless communication module 192 and the second feeding point PF2 of the patch antenna 400. For example, the second filter 462 may be disposed on the printed circuit board 340. For example, the second filter 462 may filter the frequency signal excluding the UWB frequency band that is received through the patch antenna 400, and transfer only the signal of the UWB frequency band to the wireless communication module 192 in accordance with the activation of the second feeding point PF2 of the patch antenna 400.

According to an embodiment, the processor 120 may transfer the feeding signal to the first feeding point PF1 of the patch antenna 400 and the first feeding point F1 of the first antenna 410 including the first conductive part 411, and measure the angle of arrival for the first polarization (e.g., vertical polarization) signal through a signal (e.g., Rx3) that is received through the patch antenna 400 and a signal (e.g., Rx1) that is received through the first antenna 410. In an embodiment, the processor 120 may transfer the feeding signal to the second feeding point PF2 of the patch antenna 400 and the second feeding point F2 of the second antenna 420 including the second conductive part 412, and measure the angle of arrival for the second polarization (e.g., horizontal polarization) signal through a signal (e.g., Rx4) that is received through the patch antenna 400 and a signal (e.g., Rx2) that is received through the second antenna 420.

Figure 5A:
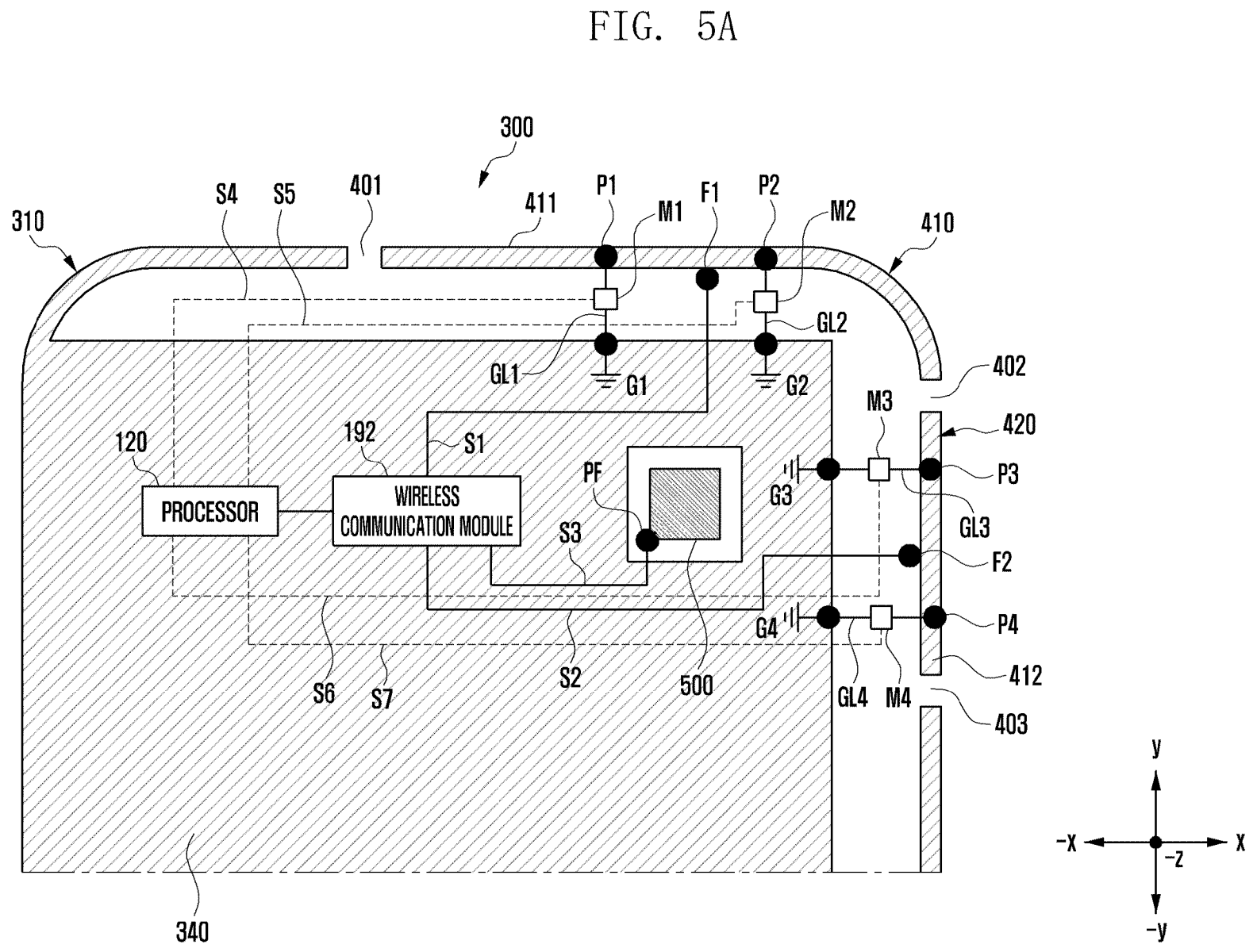

FIG. 5A is a diagram schematically illustrating an embodiment in which an electronic device transmits and/or receives a polarization signal by using at least one matching circuit and patch antenna according to an embodiment of the disclosure.

Figure 5B:
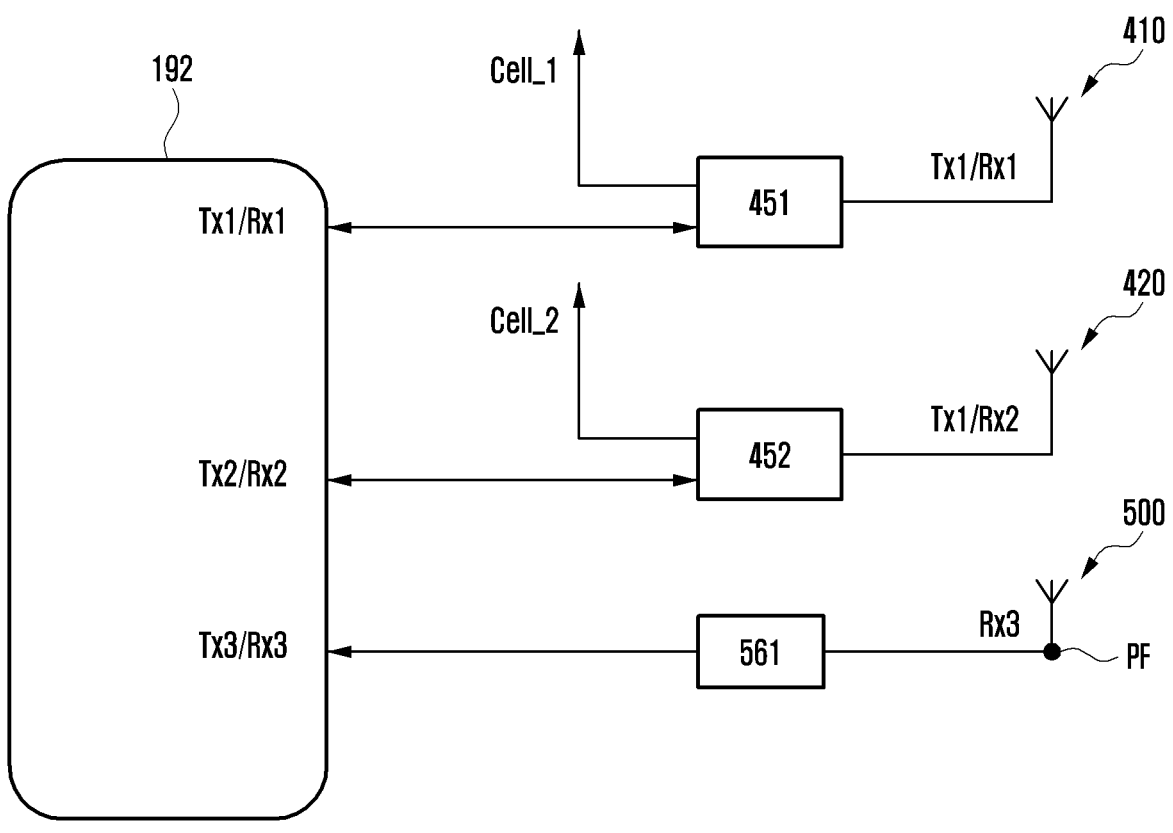
FIG. 5B is a diagram schematically illustrating a circuit constitution explaining an operation of the electronic device disclosed in FIG. 5A according to an embodiment of the disclosure.

FIG. 5B is a diagram schematically illustrating a circuit constitution explaining an operation of the electronic device disclosed in FIG. 5A according to an embodiment of the disclosure.

In an embodiment, FIG. 5A may be a drawing schematically illustrating a part (e.g., part E of FIG. 3) of the electronic device 300 when viewed in the −z-axis direction in a state where the printed circuit board 340 (e.g., first PCB 340a) is disposed on one surface (e.g., −z-axis direction) of the first support member 311 of the lateral member 310 (e.g., housing) disclosed in FIG. 3 according to various embodiments of the disclosure.

According to various embodiments, the electronic device 300 disclosed below may include the embodiments of the electronic device 300 disclosed in FIGS. 4A and 4B. For example, at least one of first to fourth matching circuits M1 to M4 of the electronic device disclosed in FIG. 5A, a patch antenna 500, and/or a feeding point PF of the patch antenna 500 may be applied to the electronic device 300 of FIG. 4A. In describing the electronic device 300 disclosed below, the same reference numerals may be given to the constituent elements substantially the same as those in the embodiment disclosed in FIGS. 4A and 4B, and duplicate explanation of their functions may be omitted.

Referring to FIG. 5A, the electronic device 300 may include the processor 120 and the wireless communication module 192 on the printed circuit board 340. The ground of the printed circuit board 340 may include at least one ground point (e.g., a first ground point G1, a second ground point G2, a third ground point G3, and/or a fourth ground point G4). The printed circuit board 340 may include the first to fourth matching circuits M1 to M4.

According to an embodiment, the lateral member 310 (e.g., housing) of the electronic device 300 may include a first segment part 401, a second segment part 402, and/or a third segment part 403. The first segment part 401 may be formed, for example, on the first side surface (e.g., the first lateral surface 301 of FIG. 3 or 4A) in the y-axis direction of the lateral member 310 of the electronic device 300. For example, the second segment part 402 and the third segment part 403 may be formed on the second side surface (e.g., the second lateral surface 302 of FIG. 3 or 4A) in the x-axis direction of the lateral member 310 of the electronic device 300.

According to an embodiment, a first conductive part 411 may be located between the first segment part 401 and the second segment part 402. In an embodiment, the first conductive part 411 may include a first feeding point F1, a first point P1, and a second point P2. The first conductive part 411 may be electrically connected to the wireless communication module 192 through the first feeding point F1 and a first signal path S1, and perform the function of a first antenna 410. For example, the first feeding point F1 may be located between the first point P1 and the second point P2. The first point P1 may be located between the first segment part 401 and the first feeding point F1, and the second point P2 may be located between the second segment part 402 and the first feeding point F1. The first point P1 may be electrically connected to the first ground point G1 of the printed circuit board 340 through a first ground path GL1. The second point P2 may be electrically connected to the second ground point G2 of the printed circuit board 340 through a second ground path GL2. The first ground point G1 and the second ground point G2 may ground the first conductive part 411. For example, the first antenna 410 including the first conductive part 411 may operate as a first slot antenna by using the first ground point G1, the first point P1, the second point P2, and the second ground point G2.

According to an embodiment, the first matching circuit M1 may be disposed in the first ground path GL1. The second matching circuit M2 may be disposed in the second ground path GL2. The first matching circuit M1 and the second matching circuit M2 may be electrically connected to the processor 120 by using a fourth signal path S4 and a fifth signal path S5. For example, the processor 120 may control the first matching circuit M1 and/or the second matching circuit M2, and control the electrical length or path of the first antenna 410 including the first conductive part 411. For example, the processor 120 may control the first matching circuit M1 and/or the second matching circuit M2, and control the polarization characteristic of the first antenna 410 including the first conductive part 411. For example, the processor 120 may control matching values of the first matching circuit M1 and/or the second matching circuit M2, and adjust and change at least one of the frequency band, resonance frequency, and polarization characteristic of the first antenna 410 including the first conductive part 411.

According to an embodiment, a second conductive part 412 may be located between the second segment part 402 and the third segment part 403. In an embodiment, the second conductive part 412 may include a second feeding point F2, a third point P3, and a fourth point P4. The second conductive part 412 may be electrically connected to the wireless communication module 192 through the second feeding point F2 and the second signal path S2, and perform the function of the second antenna 420. For example, the second feeding point F2 may be located between the third point P3 and the fourth point P4. For example, the third point P3 may be located between the second segment part 402 and the second feeding point F2, and the fourth point P4 may be located between the third segment part 403 and the second feeding point F2. The third point P3 may be electrically connected to the third ground point G3 of the printed circuit board 340 through a third ground path GL3. The fourth point P4 may be electrically connected to the fourth ground point G4 of the printed circuit board 340 through a fourth ground path GL4. The third ground point G3 and the fourth ground point G4 may ground the second conductive part 412. For example, the second antenna 420 including the second conductive part 412 may operate as a second slot antenna by using the third ground point G3, the third point P3, the fourth point P4, and the fourth ground point G4.

According to an embodiment, the third matching circuit M3 may be disposed in the third ground path GL3. The fourth matching circuit M4 may be disposed in the fourth ground path GL4. The third matching circuit M3 and the fourth matching circuit M4 may be electrically connected to the processor 120 by using a sixth signal path S6 and a seventh signal path S7. For example, the processor 120 may control the third matching circuit M3 and/or the fourth matching circuit M4, and control the electrical length or path of the second antenna 420 including the second conductive part 412. For example, the processor 120 may control the third matching circuit M3 and/or the fourth matching circuit M4, and control the polarization characteristic of the second antenna 420 including the second conductive part 412. For example, the processor 120 may control the matching values of the third matching circuit M3 and/or the fourth matching circuit M4, and adjust and change at least one of the frequency band, resonance frequency, and polarization characteristic of the second antenna 420 including the second conductive part 412.

According to an embodiment, the first matching circuit M1, the second matching circuit M2, the third matching circuit M3, or the fourth matching circuit M4 may include at least one switch or at least one lumped element. The at least one lumped element may include, for example, an inductor or a capacitor. In an embodiment, the first matching circuit M1, the second matching circuit M2, the third matching circuit M3, and/or the fourth matching circuit M4 may perform on/off operations under the control of the processor 120 (or the wireless communication module 192). The first matching circuit M1, the second matching circuit M2, the third matching circuit M3, and/or the fourth matching circuit M4 may improve the radiation performances of the first antenna 410 including the first conductive part 411 and the second antenna 420 including the second conductive part 412. For example, the processor 120 may control the first matching circuit M1 and/or the second matching circuit M2 to electrically connect or block the first point P1 and/or the second point P2 of the first conductive part 411 to or from the first ground point G1 and/or the second ground point G2. For example, the processor 120 may control the third matching circuit M3 and/or the fourth matching circuit M4 to electrically connect or block the third point P3 and/or the fourth point P4 of the second conductive part 412 to or from the third ground point G3 and/or the fourth ground point G4.

According to an embodiment, the processor 120 may be electrically connected to the wireless communication module 192. The processor 120 may control the wireless communication module 192 to transfer a feeding signal to at least one of the first feeding point F1 and the second feeding point F2 of the first conductive part 411. For example, the processor 450 may control the wireless communication module 192, and may selectively transfer the feeding signal to the first feeding point F1 or the second feeding point F2.

According to an embodiment, the patch antenna 500 may include a feeding point PF at a designated location. For example, the feeding point PF of the patch antenna 500 may be located at a corner between the −y-axis direction and the −x-axis direction. The feeding point PF of the patch antenna 500 may be electrically connected to the wireless communication module 192 through the third signal path S3. The processor 120 may control the wireless communication module 192 to transfer the feeding signal to the feeding point PF of the patch antenna 500. The processor 120 may transfer the feeding signal to the feeding point PF of the patch antenna 500 through the wireless communication module 192, and transmit and/or receive a third polarization (e.g., diagonal polarization). The third polarization (e.g., diagonal polarization) may include components of the first polarization (e.g., vertical polarization) and the second polarization (e.g., horizontal polarization). In an embodiment, the feeding point PF that transmits and/or receives the third polarization (e.g., diagonal polarization) signal may transmit and/or receive the signal having the diagonal polarization between the x-axis direction and the y-axis direction. In an embodiment, the polarization direction of the patch antenna 400 may be changed in accordance with the location of the feeder point.

In various embodiments, the feeding point PF that transmits and/or receives the third polarization (e.g., diagonal polarization) signal may transmit and/or receive the first polarization (e.g., vertical polarization) signal and the second polarization (e.g., horizontal polarization) signal.

According to an embodiment, the processor 120 may control the wireless communication module 192 to transfer the feeding signal to the first feeding point F1 of the first antenna 410 including the first conductive part 411 and the feeding point PF of the patch antenna 500, and measure the angle of arrival for the polarization (e.g., vertical polarization)) in a first scan direction (e.g., direction in parallel to the y axis and −y axis). For example, in case of measuring the angle of arrival for the vertical polarization by using the patch antenna 400 and the first antenna 410 including the first conductive part 411, the processor 120 may control the first matching circuit M1 and the second matching circuit M2 to electrically connect the first conductive part 411 to the first ground point G1 and the second ground point G2, and control to match the directions of the polarization by making the first antenna 410 operate in a slot resonance mode. In an embodiment, the first antenna 410 including the first conductive part 411 may perform resonance with an electrical length of a half wavelength.

According to an embodiment, the processor 120 may control the wireless communication module 192 to transfer the feeding signal to the second feeding point F2 of the second antenna 420 including the second conductive part 412 and the feeding point PF of the patch antenna 500, and measure the angle of arrival for the polarization (e.g., horizontal polarization)) in a second scan direction (e.g., direction in parallel to the x axis and −x axis). For example, in case of measuring the angle of arrival for the horizontal polarization by using the patch antenna 500 and the second antenna 420 including the second conductive part 412, the processor 120 may control the third matching circuit M3 and the fourth matching circuit M4 to electrically connect the second conductive part 412 to the third ground point G3 and the fourth ground point G4, and control to match the directions of the polarization by making the second antenna 420 operate in a slot resonance mode. In an embodiment, the second antenna 420 including the second conductive part 412 may perform resonance with an electrical length of a half wavelength.

Referring to FIG. 5B, in an embodiment, a first diplexer 451 may be disposed between the wireless communication module 192 (e.g., UWB IC) and the first antenna 410 including the first conductive part 411. For example, the first diplexer 451 may separate a frequency signal excluding the UWB frequency band (e.g., about 6 GHz to 11 GHz) being received through the first antenna 410 to Cell_1, and transfer only the signal of the UWB frequency band to the wireless communication module 192.

According to an embodiment, a second diplexer 452 may be disposed between the wireless communication module 192 (e.g., UWB IC) and the second antenna 420 including the second conductive part 412. For example, the second diplexer 452 may be disposed on the printed circuit board 340. For example, the second diplexer 452 may separate a frequency signal excluding the UWB frequency band (e.g., about 6 GHz to 11 GHz) being received through the second antenna 420 to Cell_2, and transfer only the signal of the UWB frequency band to the wireless communication module 192.

According to an embodiment, a filter 561 (e.g., band pass filter (BPF)) may be disposed between the wireless communication module 192 and the feeding point PF of the patch antenna 500. For example, as the feeding signal is transferred to the feeding point PF of the patch antenna 500, the filter 561 may filter the frequency signal excluding the UWB frequency band that is received through the patch antenna 500, and transfer only the signal of the UWB frequency band to the wireless communication module 192.

According to an embodiment, the processor 120 may transfer the feeding signal to the feeding point PF of the patch antenna 500 and the first feeding point F1 of the first antenna 410 including the first conductive part 411, and measure the angle of arrival for the third polarization (e.g., diagonal polarization) through a signal (e.g., Rx3) that is received through the patch antenna 500 and a signal (e.g., Rx1) that is received through the first antenna 410. For example, the processor 120 may measure the angle of arrival for the first polarization (e.g., vertical polarization) signal received through the first antenna 410 and the first polarization (e.g., vertical polarization) signal of a part of the third polarization (e.g., diagonal polarization) signal received through the patch antenna 500. The processor 120 may transfer the feeding signal to the feeding point PF of the patch antenna 500 and the second feeding point F2 of the second antenna 420 including the second conductive part 412, and measure the angle of arrival for the third polarization through the signal (e.g., Rx3) that is received through the patch antenna 500 and the signal (e.g., Rx2) that is received through the second antenna 420. For example, the processor 120 may measure the angle of arrival for the second polarization (e.g., horizontal polarization) signal received through the second antenna 420 and the second polarization (e.g., horizontal polarization) signal of a part of the third polarization (e.g., diagonal polarization) signal received through the patch antenna 500. The third polarization (e.g., diagonal polarization) may include the first polarization (e.g., vertical polarization) and the second polarization (e.g., horizontal polarization).

Figure 6:
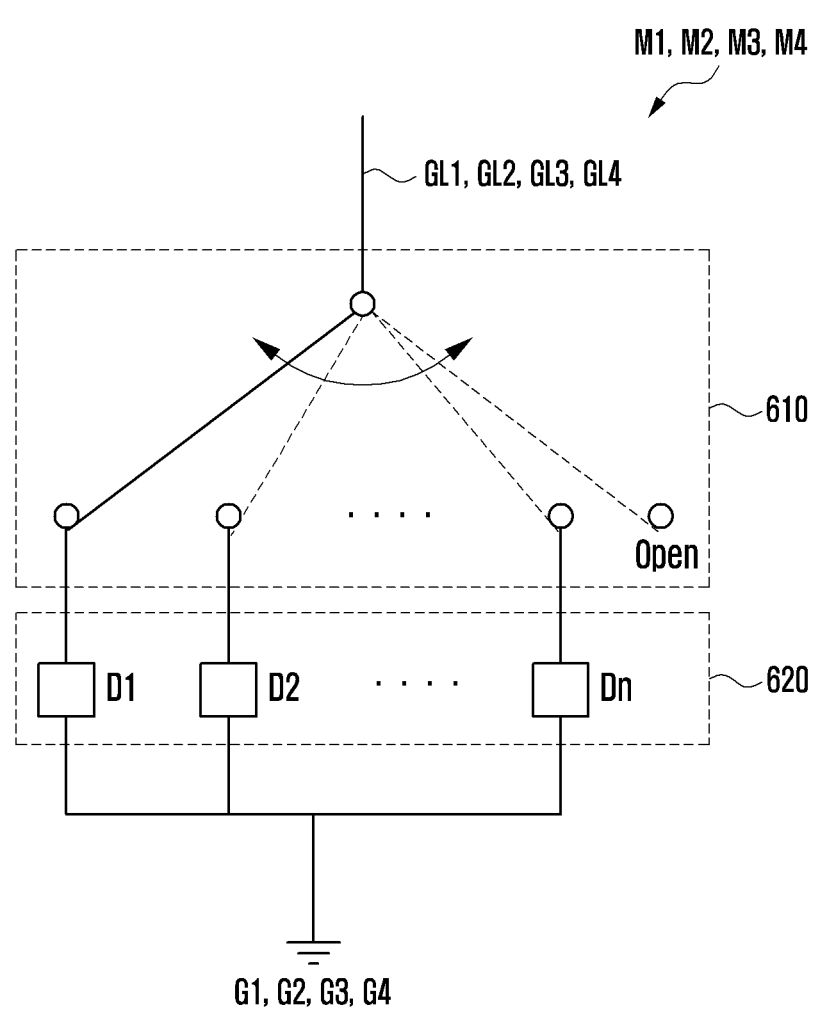
FIG. 6 is a diagram schematically illustrating a constitution of a first matching circuit, a second matching circuit, a third matching circuit, and a fourth matching circuit of an electronic device disclosed in FIG. 5A according to an embodiment of the disclosure.

FIG. 6 is a diagram schematically illustrating the constitution of a first matching circuit, a second matching circuit, a third matching circuit, and a fourth matching circuit of the electronic device disclosed in FIG. 5A according to an embodiment of the disclosure.

Referring to FIG. 6, each of the first matching circuit M1, the second matching circuit M2, the third matching circuit M3, or the fourth matching circuit M4 of the electronic device 300 according to an embodiment of the disclosure may include at least one switch 610 or at least one passive element 620 (D1, D2, . . . , Dn, and Open) that is selectively electrically connected to ground paths (e.g., a first ground path GL1, a second ground path GL2, a third ground path GL3, and/or a fourth ground path GL4) by the at least one switch 610. For example, the at least one passive element 620 may have a different element value. For example, the at least one passive element 620 (e.g., lumped element) may include capacitors having various capacitance values and/or inductors having various inductance values. Under the control of the processor 120, the at least one switch 610 may selectively connect the at least one passive element 620 having a designated element value (e.g., matching value) to the ground through the ground path. In an embodiment, the at least one switch 610 may include a micro-electromechanical systems (MEMS) switch. For example, since the MEMS switch has a complete turn on/off characteristic by performing a mechanical switching operation by an inner metal plate, it may not substantially exert an influence on the radiation characteristic change of the antenna. In a certain embodiment, the at least one switch 610 may include a single pole single throw (SPST), a single pole double throw (SPDT), or a switch including three or more throws.

Figure 7A:
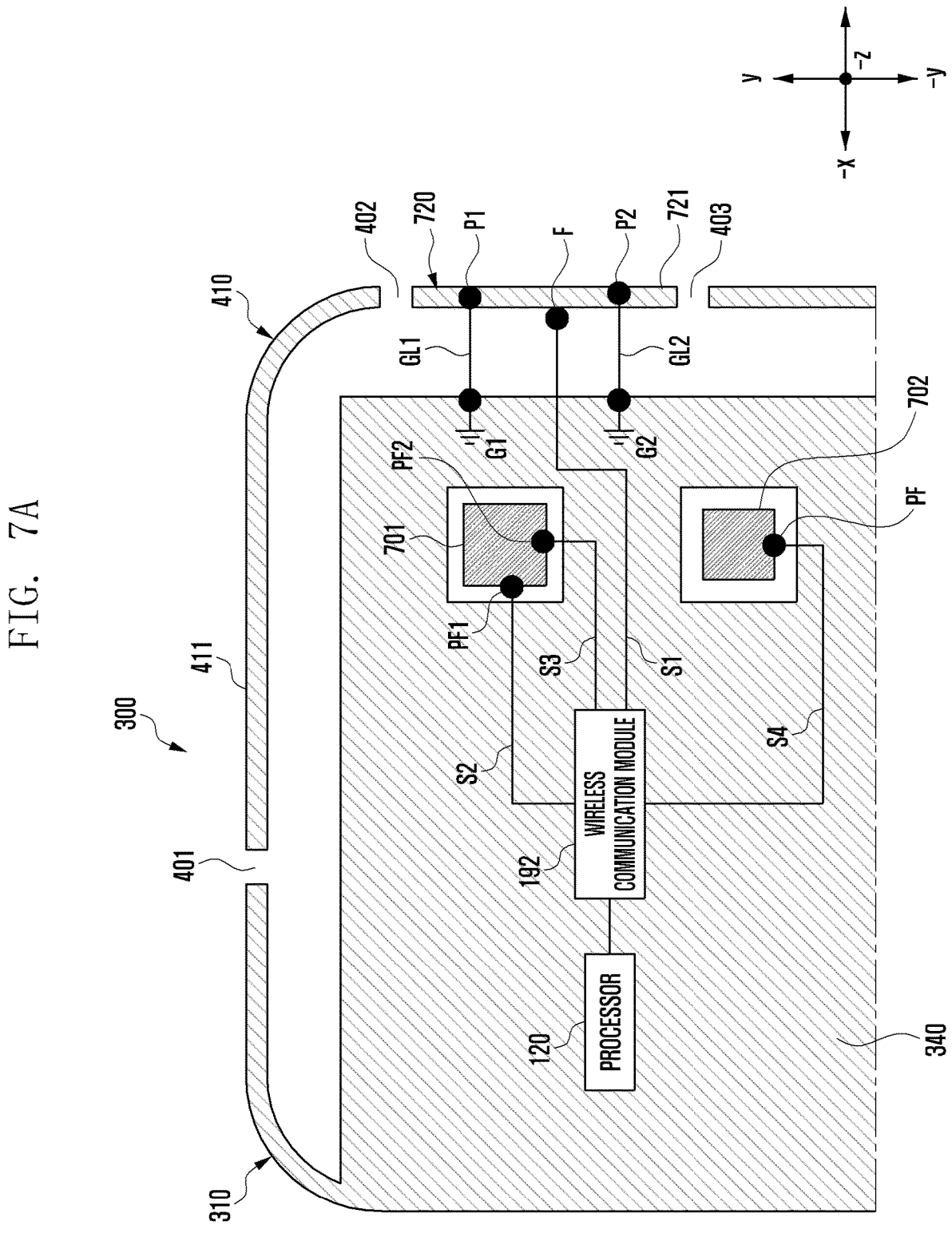
FIG. 7A is a diagram schematically illustrating an embodiment in which an electronic device transmits and/or receives a polarization signal by using an antenna, a first patch antenna, and a second patch antenna according to an embodiment of the disclosure.

FIG. 7A is a diagram schematically illustrating an embodiment in which an electronic device transmits and/or receives a polarization signal by using an antenna, a first patch antenna, and a second patch antenna according to an embodiment of the disclosure.

Figure 7B:
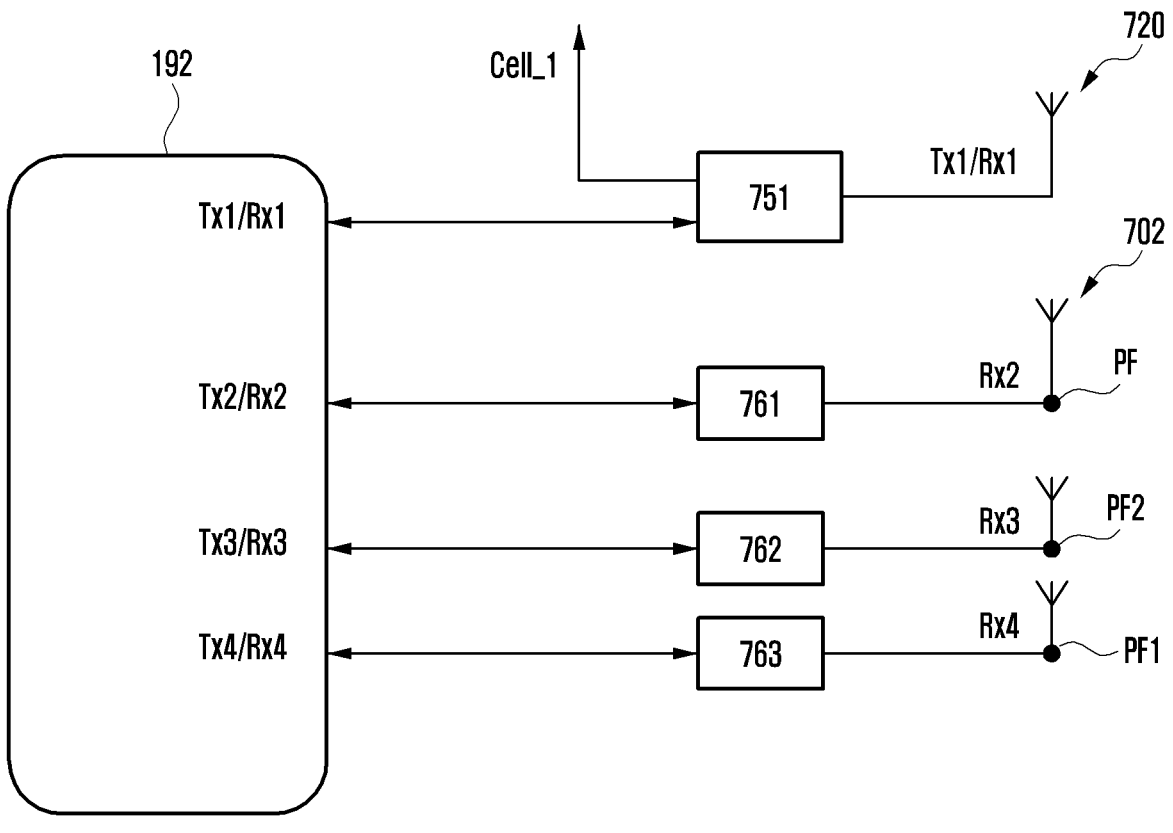
FIG. 7B is a diagram schematically illustrating a circuit constitution explaining an operation of the electronic device disclosed in FIG. 7A according to an embodiment of the disclosure.

FIG. 7B is a diagram schematically illustrating a circuit constitution explaining an operation of the electronic device disclosed in FIG. 7A according to an embodiment of the disclosure.

According to various embodiments, the electronic device 300 disclosed below may include the embodiments of the electronic device 300 disclosed in FIGS. 4A, 4B, 5A, 5B, and 6. For example, a first patch antenna 701 disclosed in FIG. 7A may be replaced by the patch antenna 500 including one feeding point PF at a designated location (e.g., corner between the −y-axis direction and −x-axis direction) as disclosed in FIG. 5A. In describing the electronic device 300 disclosed below, the same reference numerals may be given to the constituent elements substantially the same as those in the embodiments disclosed in FIGS. 4A, 4B, 5A, 5B, and 6, and duplicate explanation of their functions may be omitted.

Referring to FIG. 7A, the electronic device 300 may include the printed circuit board 340, the processor 120, the wireless communication module 192, a first patch antenna 701, and/or a second patch antenna 702.

According to an embodiment, the lateral member 310 (e.g., housing) of the electronic device 300 may include a first segment part 401, a second segment part 402, and/or a third segment part 403. The first segment part 401 may be formed, for example, on the first lateral surface (e.g., the first lateral surface 301 of FIG. 4A) in the y-axis direction of the lateral member 310 of the electronic device. For example, the second segment part 402 and the third segment part 403 may be formed on the second side surface (e.g., the second lateral surface 302 of FIG. 4A) in the x-axis direction of the lateral member 310 of the electronic device 300. The second segment part 402 may be formed more adjacent to the y-axis direction than the third segment part 403. According to various embodiments, the first segment part 401, the second segment part 402, or the third segment part 403 may be omitted.

According to an embodiment, a conductive part 721 may be located between the second segment part 402 and the third segment part 403. For example, the conductive part 721 may include a feeding point F, a first point P1, and a second point P2. The conductive part 721 may be electrically connected to the wireless communication module 192 through the feeding point F and a first signal path S1, and perform the function of an antenna 720. For example, the feeding point F may be located between the first point P1 and the second point P2. For example, the first point P1 may be located between the second segment part 402 and the feeding point F. For example, the first point P1 may be located between the second segment part 402 and the feeding point F, and the second point P2 may be located between the third segment part 403 and the feeding point F. The first point P1 may be electrically connected to the first ground point G1 of the printed circuit board 340 through a first ground path GL1. The second point P2 may be electrically connected to the second ground point G2 of the printed circuit board 340 through a second ground path GL2. The first ground point G1 and the second ground point G2 may ground the conductive part 721. For example, the antenna 720 including the conductive part 721 may operate as a slot antenna by using the first ground point G1, the first point P1, the second point P2, and the second ground point G2.

According to an embodiment, the processor 120 may be electrically connected to the wireless communication module 192. The processor 120 may control the wireless communication module 192 to transfer the feeding signal to the feeding point F of the conductive part 721.

According to an embodiment, the first patch antenna 701 may include a first feeding point PF1 and/or a second feeding point PF2. For example, the first feeding point PF1 may be located in the −x-axis direction of the first patch antenna 701. For example, the second feeding point PF2 may be located in the −y-axis direction of the first patch antenna 701. The first feeding point PF1 of the first patch antenna 701 may be electrically connected to the wireless communication module 192 through a second signal path S2. The second feeding point PF2 of the first patch antenna 701 may be electrically connected to the wireless communication module 192 through a third signal path S3. For example, the processor 120 may control the wireless communication module 192 to transfer the feeding signal to at least one of the first feeding point PF1 and the second feeding point PF2 of the first patch antenna 701. For example, the wireless communication module 192 may selectively transfer the feeding signal to the first feeding point PF1 or the second feeding point PF2 of the first patch antenna 701 under the control of the processor 120. The processor 120 may determine the measurement direction of the angle of arrival by controlling the feeding signal being transferred to the first feeding point PF1 or the second feeding point PF2 of the first patch antenna 701 through the wireless communication module 192.

According to an embodiment, the second patch antenna 702 may be disposed in the −y-axis direction (e.g., lower part) of the first patch antenna 701. The second patch antenna 702 may include one feeding point PF. For example, the feeding point PF may be located in the −y-axis direction of the second patch antenna 702. The feeding point PF of the second patch antenna 702 may be electrically connected to the wireless communication module 192 through a fourth signal path S4. The processor 120 may control the wireless communication module 192 to transfer the feeding signal to the feeding point PF of the second patch antenna 702. The processor 120 may transmit and/or receive the second polarization (e.g., vertical polarization) signal by controlling the feeding signal being transferred to the feeding point PF of the second patch antenna 702 through the wireless communication module 192. According to various embodiments, the feeding point PF of the second patch antenna 702 may be located at a corner between the −x axis and the −y axis of the second patch antenna 702.

According to an embodiment, the first feeding point PF1 of the first patch antenna 701 may receive the feeding signal transferred from the wireless communication module 192 in case of transmitting and/or receiving the first polarization (e.g., horizontal polarization) signal to and/or from the antenna 720 including the conductive part 721. For example, the processor 120 may control the wireless communication module 192 to transfer the feeding signal to the feeding point F of the antenna 720 including the conductive part 721 and the first feeding point PF1 of the first patch antenna 701, and measure the angle of arrival for the polarization (e.g., first polarization (horizontal polarization)) in the first scan direction (e.g., direction in parallel to the x axis and −x axis).

According to an embodiment, the second feeding point PF2 of the first patch antenna 701 may receive the feeding signal transferred from the wireless communication module 192 in case of measuring the angle of arrival by using the second patch antenna 702 and the second polarization (e.g., vertical polarization) signal. For example, the processor 120 may control the wireless communication module 192 to transfer the feeding signal to the second feeding point F2 of the first patch antenna 701 and the feeding point PF of the second patch antenna 702, and measure the angle of arrival for the polarization (e.g., second polarization (vertical polarization)) in the second scan direction (e.g., direction in parallel to the y axis and −y axis).

According to an embodiment, the processor 120 may transfer the feeding signal to the first feeding point PF1 of the first patch antenna 701 and the feeding point F of the antenna 720 including the conductive part 721, and for example, measure the angle of arrival for the first polarization (e.g., horizontal polarization) signal, and measure the locations of other electronic devices (e.g., electronic devices 102 and 104 of FIG. 1). The processor 120 may transfer the feeding signal to the second feeding point PF2 of the first patch antenna 701 and the feeding point PF of the second patch antenna 702, and for example, measure the angle of arrival for the second polarization (e.g., vertical polarization) signal, and measure the locations of other electronic devices (e.g., electronic devices 102 and 104 of FIG. 1).

Referring to FIG. 7B, in an embodiment, a diplexer 751 may be disposed between the wireless communication module 192 (e.g., UWB IC) and the conductive part 721. For example, the diplexer 751 may be disposed on the printed circuit board 340. For example, the diplexer 751 may separate the frequency signal excluding the UWB frequency band (e.g., about 6 GHz to 11 GHz) being received through the antenna 720 to Celli, and transfer only the signal of the UWB frequency band to the wireless communication module 192.

According to an embodiment, a first filter 761 may be disposed between the wireless communication module 192 and the feeding point PF of the second patch antenna 702. In accordance with activation of the feeding point PF of the second patch antenna 702, the first filter 761 may filter the frequency signal excluding the UWB frequency band that is received (Rx2) through the second patch antenna 702, and transfer only the signal of the UWB frequency band to the wireless communication module 192.

According to an embodiment, a second filter 762 may be disposed between the wireless communication module 192 and the second feeding point PF2 of the first patch antenna 701. In accordance with activation of the second feeding point PF2 of the first patch antenna 701, the second filter 762 may filter the frequency signal excluding the UWB frequency band that is received (Rx3) through the first patch antenna 701, and transfer only the signal of the UWB frequency band to the wireless communication module 192.

According to an embodiment, a third filter 763 may be disposed between the wireless communication module 192 and the first feeding point PF1 of the first patch antenna 701. In accordance with activation of the first feeding point PF1 of the first patch antenna 701, the third filter 763 may filter the frequency signal excluding the UWB frequency band that is received (Rx4) through the first patch antenna 701, and transfer only the signal of the UWB frequency band to the wireless communication module 192.

According to an embodiment, the processor 120 may transfer the feeding signal to the first feeding point PF1 of the first patch antenna 701 and the feeding point F of the antenna 720, and measure the angle of arrival for the first polarization (e.g., horizontal polarization) through a signal (e.g., Rx4) that is received through the first patch antenna 701 and a signal (e.g., Rx1) that is received through the antenna 720. The processor 120 may transfer the feeding signal to the second feeding point PF2 of the first patch antenna 701 and the feeding point PF of the second patch antenna 702, and measure the angle of arrival for the second polarization (e.g., vertical polarization) signal through the signal (e.g., Rx3) that is received through the first patch antenna 701 and the signal (e.g., Rx2) that is received through the second patch antenna 702.

Figure 7C:
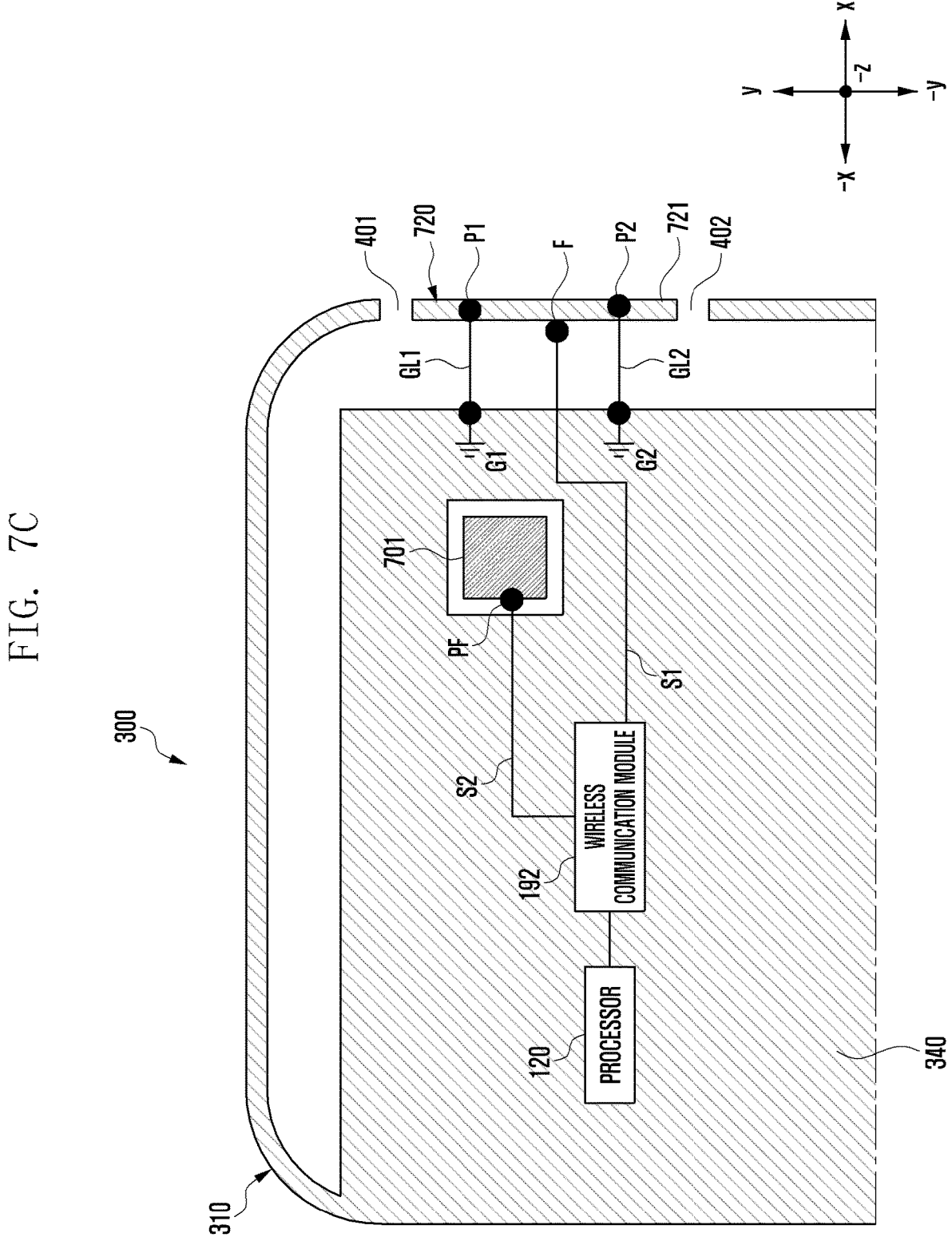
FIG. 7C is a diagram schematically illustrating an embodiment in which an electronic device transmits and/or receives a polarization signal by using an antenna and a patch antenna according to an embodiment of the disclosure.

FIG. 7C is a diagram schematically illustrating an embodiment in which an electronic device transmits and/or receives a polarization signal by using an antenna and a patch antenna according to an embodiment of the disclosure.

Referring to FIG. 7C, the electronic device 300 may include the printed circuit board 340, the processor 120, the wireless communication module 192, and the first patch antenna 701.

According to an embodiment, the lateral member 310 (e.g., housing) of the electronic device 300 may include the first segment part 401 and the second segment part 402. For example, the first segment part 401 and the second segment part 402 may be formed on the second lateral surface (e.g., the second lateral surface 302 of FIG. 3) in the x-axis direction of the lateral member 310 of the electronic device 300. For example, the first segment part 401 may be formed more adjacent to the y-axis direction than the second segment part 402.

According to an embodiment, the conductive part 721 may be located between the first segment part 401 and the second segment part 402. For example, the conductive part 721 may include the feeding point F, the first point P1, and the second point P2. The conductive part 721 may be electrically connected to the wireless communication module 192 through the feeding point F and the first signal path S1, and perform the function of the antenna 720. For example, the feeding point F may be located between the first point P1 and the second point P2. For example, the first point P1 may be located between the first segment part 401 and the feeding point F, and the second point P2 may be located between the second segment part 402 and the feeding point F. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the conductive part 721. For example, the antenna 720 including the conductive part 721 may operate as the slot antenna by using the first ground point G1, the first point P1, the second point P2, and the second ground point G2.

According to an embodiment, the processor 120 may be electrically connected to the wireless communication module 192. The processor 120 may control the wireless communication module 192 to transfer the feeding signal to the feeding point F of the conductive part 721.

According to an embodiment, the first patch antenna 701 may include the feeding point PF. For example, the feeding point PF may be located in the −x-axis direction of the first patch antenna 701. The feeding point PF of the first patch antenna 701 may be electrically connected to the wireless communication module 192 through the second signal path S2. For example, the processor 120 may control the wireless communication module 192 to transfer the feeding signal to the feeding point PF of the first patch antenna 701. The processor 120 may determine the measurement direction of the angle of arrival by controlling the feeding signal being transferred to the feeding point PF of the first patch antenna 701 through the wireless communication module 192.

According to an embodiment, the feeding point PF of the first patch antenna 701 may receive the feeding signal transferred from the wireless communication module 192 in case of transmitting and/or receiving the first polarization (e.g., horizontal polarization) signal to and/or from the antenna 720 including the conductive part 721. For example, the processor 120 may control the wireless communication module 192 to transfer the feeding signal to the feeding point F of the antenna 720 including the conductive part 721 and the feeding point PF of the first patch antenna 701, and measure the angle of arrival for the polarization (e.g., first polarization (horizontal polarization)) in the first scan direction (e.g., direction in parallel to the x axis and −x axis).

According to an embodiment, the processor 120 may transfer the feeding signal to the feeding point PF of the first patch antenna 701 and the feeding point F of the antenna 720 including the conductive part 721, and for example, measure the angle of arrival for the first polarization (e.g., horizontal polarization) signal, and measure the locations of other electronic devices (e.g., electronic devices 102 and 104 of FIG. 1).

Figure 8A:
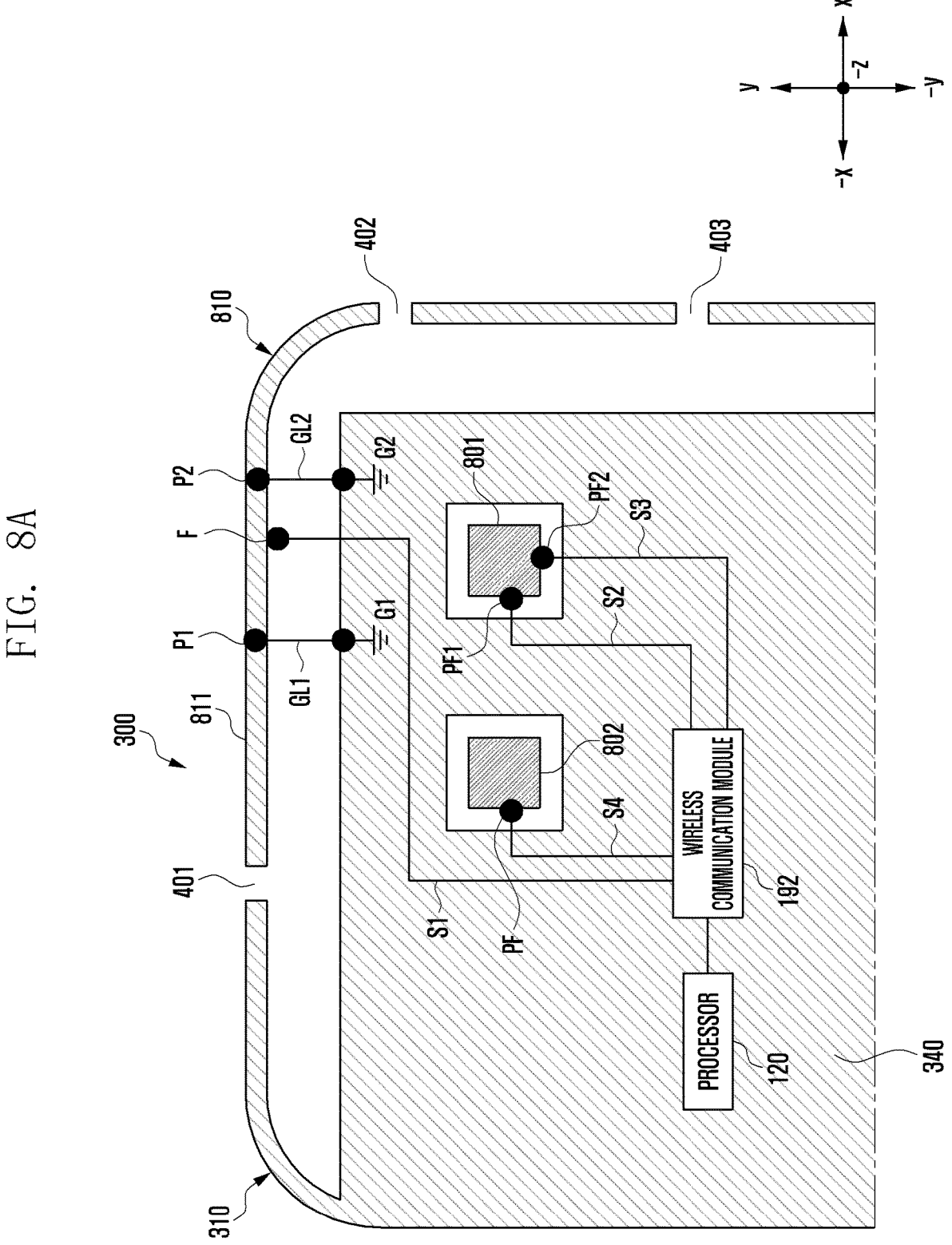
FIG. 8A is a diagram schematically illustrating various embodiments in which an electronic device transmits and/or receives a polarization signal by using an antenna, a first patch antenna, and a second patch antenna according to an embodiment of the disclosure.

FIG. 8A is a diagram schematically illustrating various embodiments in which an electronic device transmits and/or receives a polarization signal by using an antenna, a first patch antenna, and a second patch antenna according to an embodiment of the disclosure.

Figure 8B:
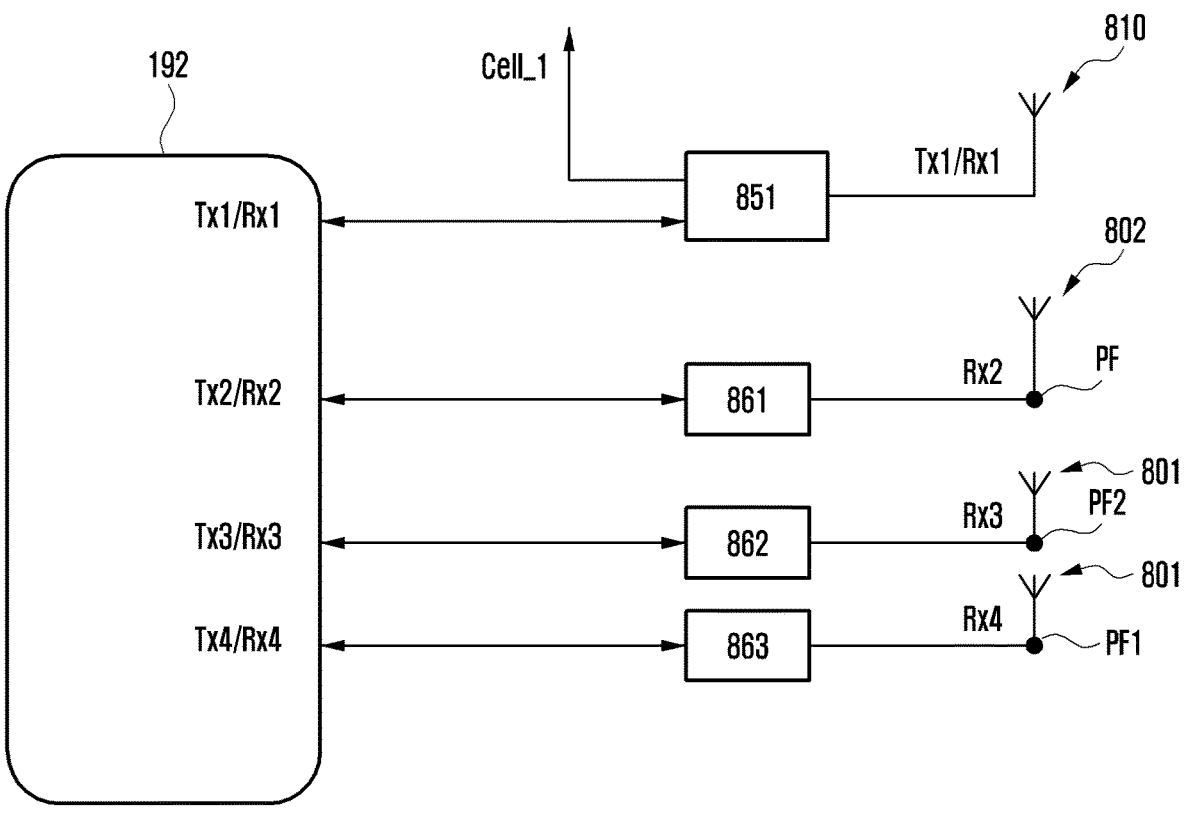
FIG. 8B is a diagram schematically illustrating a circuit constitution explaining an operation of the electronic device disclosed in FIG. 8A according to an embodiment of the disclosure.

FIG. 8B is a diagram schematically illustrating a circuit constitution explaining an operation of the electronic device disclosed in FIG. 8A according to an embodiment of the disclosure.

According to various embodiments, the electronic device 300 disclosed below may include the embodiments of the electronic device 300 disclosed in FIGS. 4A, 4B, 5A, 5B, 6, 7A, and 7B. For example, a first patch antenna 801 disclosed in FIG. 8A may be replaced by the patch antenna 500 including one feeding point PF at a designated location (e.g., corner between the −y-axis direction and −x-axis direction) as disclosed in FIG. 5A. In describing the electronic device 300 disclosed below, the same reference numerals may be given to the constituent elements substantially the same as those in the embodiments disclosed in FIGS. 4A, 4B, 5A, 5B, 6, 7A, and 7B, and duplicate explanation of their functions may be omitted.

Referring to FIG. 8A, the electronic device 300 may include the printed circuit board 340, the processor 120, the wireless communication module 192, a first patch antenna 701, and/or a second patch antenna 702.

According to an embodiment, the lateral member 310 (e.g., housing) of the electronic device 300 may include a first segment part 401, a second segment part 402, and/or a third segment part 403. The first segment part 401 may be formed, for example, on the first lateral surface (e.g., the first lateral surface 301 of FIG. 4A) in the y-axis direction of the lateral member 310 of the electronic device. For example, the second segment part 402 and the third segment part 403 may be formed on the second lateral surface (e.g., the second lateral surface 302 of FIG. 4A) in the x-axis direction of the lateral member 310 of the electronic device 300. The second segment part 402 may be formed more adjacent to the y-axis direction than the third segment part 403. According to various embodiments, the third segment part 403 may be omitted.

According to an embodiment, a conductive part 811 may be located between the first segment part 401 and the second segment part 402. For example, the conductive part 811 may include a feeding point F, a first point P1, and a second point P2. The conductive part 811 may be electrically connected to the wireless communication module 192 through the feeding point F and a first signal path S1, and perform the function of an antenna 810. For example, the feeding point F may be located between the first point P1 and the second point P2. For example, the first point P1 may be located between the second segment part 402 and the feeding point F. For example, the first point P1 may be located between the first segment part 401 and the feeding point F, and the second point P2 may be located between the second segment part 402 and the feeding point F. The first point P1 may be electrically connected to the first ground point G1 of the printed circuit board 340 through a first ground path GL1. The second point P2 may be electrically connected to the second ground point G2 of the printed circuit board 340 through a second ground path GL2. The first ground point G1 and the second ground point G2 may ground the conductive part 811. For example, the antenna 810 including the conductive part 811 may operate as a slot antenna by using the first ground point G1, the first point P1, the second point P2, and the second ground point G2.

According to an embodiment, the processor 120 may be electrically connected to the wireless communication module 192. The processor 120 may control the wireless communication module 192 to transfer the feeding signal to the first feeding point F1 of the conductive part 811.

According to an embodiment, the first patch antenna 801 may include a first feeding point PF1 and/or a second feeding point PF2. For example, the first feeding point PF1 may be located in the −x-axis direction of the first patch antenna 701. For example, the second feeding point PF2 may be located in the −y-axis direction of the first patch antenna 701. The first feeding point PF1 of the first patch antenna 701 may be electrically connected to the wireless communication module 192 through a second signal path S2. The second feeding point PF2 of the first patch antenna 801 may be electrically connected to the wireless communication module 192 through a third signal path S3. For example, the processor 120 may control the wireless communication module 192 to transfer the feeding signal to at least one of the first feeding point PF1 and the second feeding point PF2 of the first patch antenna 801. For example, the wireless communication module 192 may selectively transfer the feeding signal to the first feeding point PF1 or the second feeding point PF2 of the first patch antenna 801 under the control of the processor 120. The processor 120 may determine the measurement direction of the angle of arrival by controlling the feeding signal being transferred to the first feeding point PF1 and/or the second feeding point PF2 of the first patch antenna 801 through the wireless communication module 192.

According to an embodiment, a second patch antenna 802 may be disposed in the −x-axis direction (e.g., left) of the first patch antenna 801. The second patch antenna 802 may include one feeding point PF. For example, the feeding point PF may be located in the −x-axis direction of the second patch antenna 802. The feeding point PF of the second patch antenna 802 may be electrically connected to the wireless communication module 192 through a fourth signal path S4. The processor 120 may control the wireless communication module 192 to transfer the feeding signal to the feeding point PF of the second patch antenna 702. The processor 120 may transmit and/or receive the second polarization (e.g., vertical polarization) signal by controlling the feeding signal being transferred to the feeding point PF of the second patch antenna 802 through the wireless communication module 192. According to various embodiments, the feeding point PF of the second patch antenna 802 may be located at a corner between the −x axis and the −y axis of the second patch antenna 802.

According to an embodiment, the second feeding point PF2 of the first patch antenna 801 may receive the feeding signal transferred from the wireless communication module 192 in case of measuring the angle of arrival by using the second polarization (e.g., vertical polarization) signal with the antenna 810 including the conductive part 811. For example, the processor 120 may control the wireless communication module 192 to transfer the feeding signal to the feeding point F of the antenna 820 including the conductive part 821 and the second feeding point PF2 of the first patch antenna 801, and measure the angle of arrival for the polarization (e.g., second polarization (vertical polarization)) in the second scan direction (e.g., direction in parallel to the y axis and −y axis).

According to an embodiment, the first feeding point PF1 of the first patch antenna 801 may receive the feeding signal transferred from the wireless communication module 192 in case of measuring the angle of arrival by using the first polarization (e.g., horizontal polarization) signal with the second patch antenna 802. For example, the processor 120 may control the wireless communication module 192 to transfer the feeding signal to the first feeding point F1 of the first patch antenna 801 and the feeding point PF of the second patch antenna 802, and measure the angle of arrival for the polarization (e.g., first polarization (horizontal polarization)) in the first scan direction (e.g., direction in parallel to the x axis and −x axis).

According to an embodiment, the processor 120 may transfer the feeding signal to the second feeding point PF2 of the first patch antenna 801 and the feeding point F of the antenna 810 including the conductive part 811, and for example, measure the angle of arrival for the second polarization (e.g., vertical polarization) signal, and measure the locations of other electronic devices (e.g., electronic devices 102 and 104 of FIG. 1). The processor 120 may transfer the feeding signal to the first feeding point PF1 of the first patch antenna 801 and the feeding point PF of the second patch antenna 802, and for example, measure the angle of arrival for the first polarization (e.g., horizontal polarization) signal, and measure the locations of other electronic devices (e.g., electronic devices 102 and 104 of FIG. 1).

Referring to FIG. 8B, in an embodiment, a diplexer 851 may be disposed between the wireless communication module 192 (e.g., UWB IC) and the antenna 810 including the conductive part 811. For example, the diplexer 851 may be disposed on the printed circuit board 340. For example, the diplexer 851 may separate the frequency signal excluding the UWB frequency band (e.g., about 6 GHz to 11 GHz) being received (Rx1) through the antenna 810 to Celli, and transfer only the signal of the UWB frequency band to the wireless communication module 192.

According to an embodiment, a first filter 861 may be disposed between the wireless communication module 192 and the feeding point PF of the second patch antenna 802. For example, in accordance with activation of the feeding point PF of the second patch antenna 802, the first filter 861 may filter the frequency signal excluding the UWB frequency band that is received (Rx2) through the second patch antenna 802, and transfer only the signal of the UWB frequency band to the wireless communication module 192.

According to an embodiment, a second filter 862 may be disposed between the wireless communication module 192 and the second feeding point PF2 of the first patch antenna 801. For example, in accordance with activation of the second feeding point PF2 of the first patch antenna 801, the second filter 862 may filter the frequency signal excluding the UWB frequency band that is received (Rx3) through the first patch antenna 801, and transfer only the signal of the UWB frequency band to the wireless communication module 192.

According to an embodiment, a third filter 863 may be disposed between the wireless communication module 192 and the first feeding point PF1 of the first patch antenna 801. For example, in accordance with activation of the first feeding point PF1 of the first patch antenna 801, the third filter 863 may filter the frequency signal excluding the UWB frequency band that is received (Rx4) through the first patch antenna 801, and transfer only the signal of the UWB frequency band to the wireless communication module 192.

According to an embodiment, the processor 120 may transfer the feeding signal to the second feeding point PF2 of the first patch antenna 801 and the feeding point F of the antenna 810 including the conductive part 811, and measure the angle of arrival for the second polarization (e.g., vertical polarization) through a signal (e.g., Rx3) that is received through the first patch antenna 801 and a signal (e.g., Rx1) that is received through the antenna 810. For example, the processor 120 may transfer the feeding signal to the first feeding point PF1 of the first patch antenna 801 and the feeding point PF of the second patch antenna 802, and measure the angle of arrival for the first polarization (e.g., horizontal polarization) signal through the signal (e.g., Rx4) that is received through the first patch antenna 801 and the signal (e.g., Rx2) that is received through the second patch antenna 802.

Figure 9A:
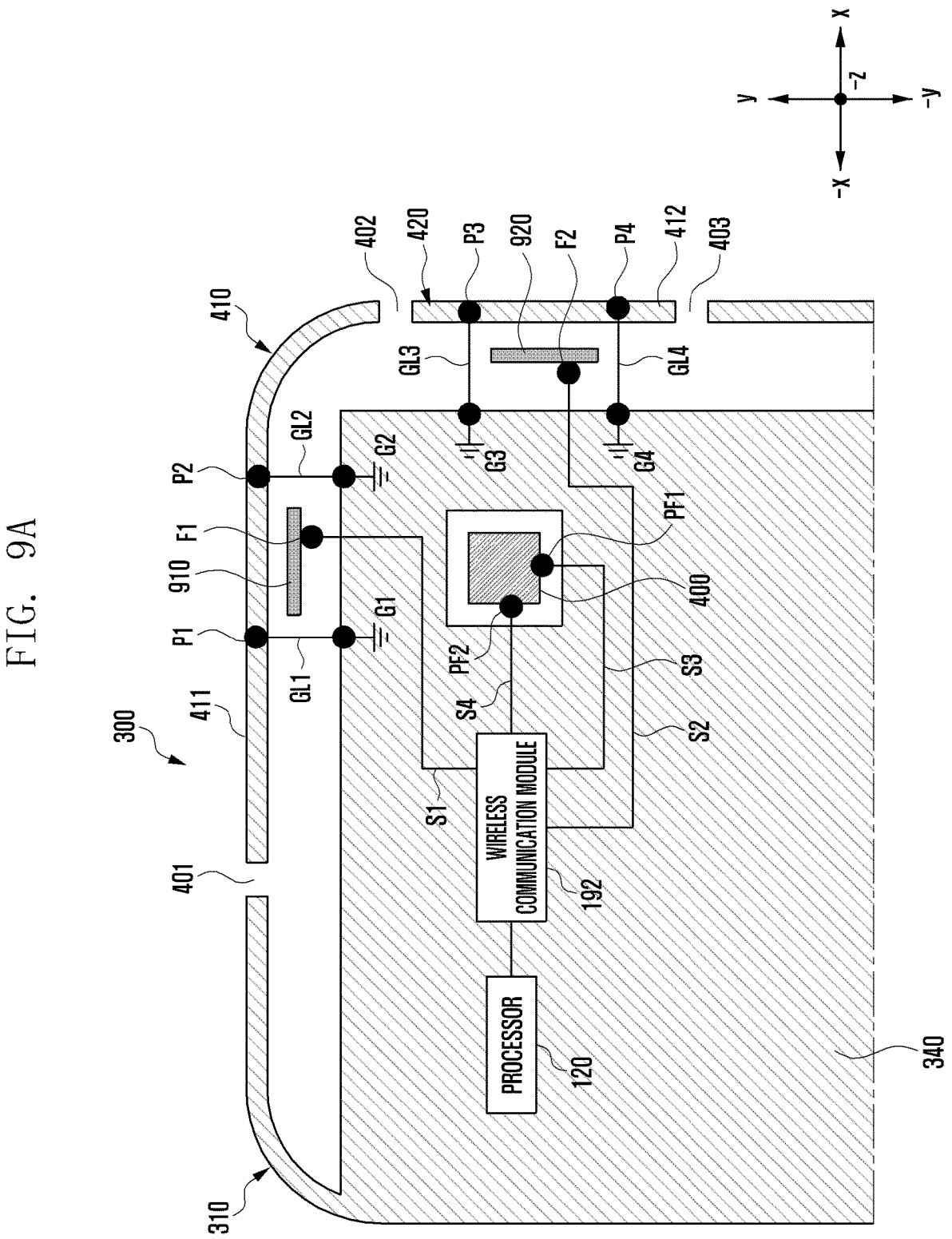
FIG. 9A is a diagram schematically illustrating an embodiment in which an electronic device transmits and/or receives a polarization signal by using a first coupling pattern and a second coupling pattern according to an embodiment of the disclosure.

FIG. 9A is a diagram schematically illustrating an embodiment in which an electronic device transmits and/or receives a polarization signal by using a first coupling pattern and a second coupling pattern according to an embodiment of the disclosure. According to an embodiment, an embodiment disclosed in FIG. 9A may be an embodiment including a first coupling pattern and a second coupling pattern in the embodiment disclosed in FIG. 4A.

According to various embodiments, the electronic device 300 disclosed below may include the embodiments of the electronic device 300 disclosed in FIGS. 4A, 4B, 5A, 5B, 6, 7A to 7C, 8A, and 8B. In describing the electronic device 300 disclosed below, the same reference numerals may be given to the constituent elements substantially the same as those in the embodiments disclosed in FIGS. 4A, 4B, 5A, 5B, 6, 7A to 7C, 8A, and 8B, and duplicate explanation of their functions may be omitted.

Referring to FIG. 9A, the electronic device 300 may include the printed circuit board 340, the processor 120, the wireless communication module 192, and/or the patch antenna 400. The printed circuit board 340 may be disposed inside the lateral member 310 (e.g., housing). For example, the printed circuit board 340 may be spaced apart from the lateral member 310 at least partly.

According to an embodiment, the lateral member 310 of the electronic device 300 may include the first segment part 401, the second segment part 402, and/or the third segment part 403. The first segment part 401 may be formed, for example, on the first lateral surface (e.g., the first lateral surface 301 of FIG. 4A) in the y-axis direction of the lateral member 310 of the electronic device 300. The second segment part 402 and the third segment part 403 may be formed in the x-axis direction of the lateral member 310 of the electronic device 300. The second segment part 402 may be formed more adjacent to the second lateral surface (e.g., the second lateral surface 302 of FIG. 4A) in the y-axis direction than the third segment part 403.

According to an embodiment, the first conductive part 411 may be disposed between the first segment part 401 and the second segment part 402. For example, a first coupling pattern 910 may be disposed between the first conductive part 411 and the printed circuit board 340. For example, the first coupling pattern 910 may be disposed so as to be coupled to the first conductive part 411. The first coupling pattern 910 may include the first feeding point F1. The first coupling pattern 910 may be coupled to the first conductive part 411. The first coupling pattern 910 may transfer the feeding signal being transferred through the first feeding point F1 to the first conductive part 411. The first conductive part 411 may perform the function of the first antenna 410. The first coupling pattern 910 may include, for example, one of a flexible printed circuit board (FPCB), stainless steel (SUS), laser direct structuring (LDS), or plate assay (PEA).

According to an embodiment, the first conductive part 411 may include the first point P1 and the second point P2. The first point P1 may be located between the first segment part 401 and the first feeding point F1, and the second point P2 may be located between the second segment part 402 and the first feeding point F1. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the first conductive part 411. For example, the first antenna 410 including the first conductive part 411 may operate as a first slot antenna by using the first ground point G1, the first point P1, the second point P2, and the second ground point G2.

According to an embodiment, the first coupling pattern 910 and the first feeding point F1 may be disposed between the first conductive part 411 and the printed circuit board 340 and between the first ground path GL1 and the second ground path GL2.

According to an embodiment, the second conductive part 412 may be located between the second segment part 402 and the third segment part 403. For example, a second coupling pattern 920 may be disposed between the second conductive part 412 and the printed circuit board 340. For example, the second coupling pattern 920 may be disposed so as to be coupled to the second conductive part 412. The second coupling pattern 920 may include the second feeding point F2. The second coupling pattern 920 may be coupled to the second conductive part 412. The second coupling pattern 920 may transfer the feeding signal being transferred through the second feeding point F2 to the second conductive part 412. The second conductive part 412 may perform the function of the second antenna 420. The second coupling pattern 920 may include, for example, one of the flexible printed circuit board (FPCB), stainless steel (SUS), laser direct structuring (LDS), or plate assay (PEA).

According to an embodiment, the second conductive part 412 may include the third point P3 and the fourth point P4. For example, the third point P3 may be located between the second segment part 402 and the second feeding point F2, and the fourth point P4 may be located between the third segment part 403 and the second feeding point F2. The third point P3 may be electrically connected to the third ground point G3 of the printed circuit board 340 through the third ground path GL3. The fourth point P4 may be electrically connected to the fourth ground point G4 of the printed circuit board 340 through the fourth ground path GL4. The third ground point G3 and the fourth ground point G4 may ground the second conductive part 412. For example, the second antenna 420 including the second conductive part 412 may operate as a second slot antenna by using the third ground point G3, the third point P3, the fourth point P4, and the fourth ground point G4.

According to an embodiment, the second coupling pattern 920 and the second feeding point F2 may be disposed between the second conductive part 412 and the printed circuit board 340 and between the third ground path GL3 and the fourth ground path GL4.

According to an embodiment, the processor 120 may be electrically connected to the wireless communication module 192. For example, the processor 120 may control the wireless communication module 192 to transfer the feeding signal to at least one of the first feeding point F1 of the first coupling pattern 910 and the second feeding point F2 of the second coupling pattern 920.

According to an embodiment, the wireless communication module 192 may be electrically connected to the first feeding point F1 of the first coupling pattern 910 and the second feeding point F2 of the second coupling pattern 920. For example, the wireless communication module 192 may be electrically connected to the first feeding point F1 through the first signal path S1. The wireless communication module 192 may be electrically connected to the second feeding point F2 through the second signal path S2. Under the control of the processor 120, the wireless communication module 192 may selectively transfer the feeding signal to the first feeding point F1 or the second feeding point F2.

According to an embodiment, the patch antenna 400 may include the first feeding point PF1 and/or the second feeding point PF2. For example, the first feeding point PF1 may be located in the −y-axis direction of the patch antenna 400. The second feeding point PF2 may be located in the −x-axis direction of the patch antenna 400. The first feeding point PF1 of the patch antenna 400 may be electrically connected to the wireless communication module 192 through the third signal path S3. The second feeding point PF2 of the patch antenna 400 may be electrically connected to the wireless communication module 192 through the fourth signal path S4. For example, the processor 120 may control the wireless communication module 192 to transfer the feeding signal to at least one of the first feeding point PF1 and the second feeding point PF2 of the patch antenna 400. For example, the wireless communication module 192 may selectively transfer the feeding signal to the first feeding point PF1 or the second feeding point PF2 of the patch antenna 400 under the control of the processor 120. The processor 120 may determine the measurement direction of the angle of arrival using the first polarization (e.g., vertical polarization) signal and/ or the second polarization (e.g., horizontal polarization) signal by controlling the feeding signal being transferred to the first feeding point PF1 or the second feeding point PF2 of the patch antenna 400 through the wireless communication module 192.

According to an embodiment, the first feeding point PF1 of the patch antenna 400 may receive the feeding signal transferred from the wireless communication module 192 in case of measuring the angle of arrival by using the first polarization (e.g., vertical polarization) signal with the first antenna 410 including the first conductive part 411. For example, the processor 120 may control the wireless communication module 192 to transfer the feeding signal to the first feeding point F1 of the first coupling pattern 910 and the first feeding point PF1 of the patch antenna 400, and measure the angle of arrival for the polarization (e.g., first polarization (vertical polarization)) signal in the first scan direction (the direction in parallel to the y axis and −y axis).

According to an embodiment, the second feeding point PF2 of the patch antenna 400 may receive the feeding signal transferred from the wireless communication module 192 in case of measuring the angle of arrival by using the second polarization (e.g., horizontal polarization) signal with the second antenna 420 including the second conductive part 412. For example, the processor 120 may control the wireless communication module 192 to transfer the feeding signal to the second feeding point F2 of the second coupling pattern 920 and the second feeding point PF2 of the patch antenna 400, and measure the angle of arrival for the polarization (e.g., second polarization (horizontal polarization)) signal in the second scan direction (the direction in parallel to the x axis and −x axis).

According to an embodiment, the processor 120 may transfer the feeding signal to the first feeding point PF1 of the patch antenna 400 and the first feeding point F1 of the first coupling pattern 910, and for example, measure the locations of other electronic devices (e.g., electronic devices 102 and 104 of FIG. 1) by measuring the angle of arrival for the first polarization (e.g., vertical polarization) signal. For example, the processor 120 may transfer the feeding signal to the second feeding point PF2 of the patch antenna 400 and the second feeding point F2 of the second coupling pattern 920, and for example, measure the locations of other electronic devices (e.g., electronic devices 102 and 104 of FIG. 1) by measuring the angle of arrival for the second polarization (e.g., horizontal polarization) signal.

According to various embodiments, the patch antenna 400 may operate as the ultra-wide band (UWB) antenna for transmitting and receiving the signal of the designated frequency band (e.g., about 6 GHz to 11 GHz). In an embodiment, the patch antenna 400 may transmit and/or receive the first polarization (e.g., vertical polarization) signal by using the first feeding point PF1 located in the −y-axis direction of the patch antenna 400, and may transmit and/or receive the second polarization (e.g., horizontal polarization) signal by using the second feeding point PF2 located in the −x-axis direction of the patch antenna 400. According to various embodiments, the patch antenna 400 may also transmit and/or receive the third polarization (e.g., diagonal polarization) signal by using the feeding point (e.g., feeding point PF of FIG. 5A) that may be disposed at the designated location (e.g., the corner between the −x-axis direction and the −y-axis direction) of the patch antenna 400. The third polarization (e.g., diagonal polarization) may include components of the first polarization (e.g., vertical polarization) and the second polarization (e.g., horizontal polarization). In an embodiment, the feeding point (e.g., feeding point PF of FIG. 5A) that transmits and/or receives the third polarization (e.g., diagonal polarization) signal may transmit and/or receive the signal having the diagonal polarization between the x-axis direction and the y-axis direction. In an embodiment, the polarization direction of the patch antenna 400 may be changed in accordance with the location of the feeding point.

Figure 9B:
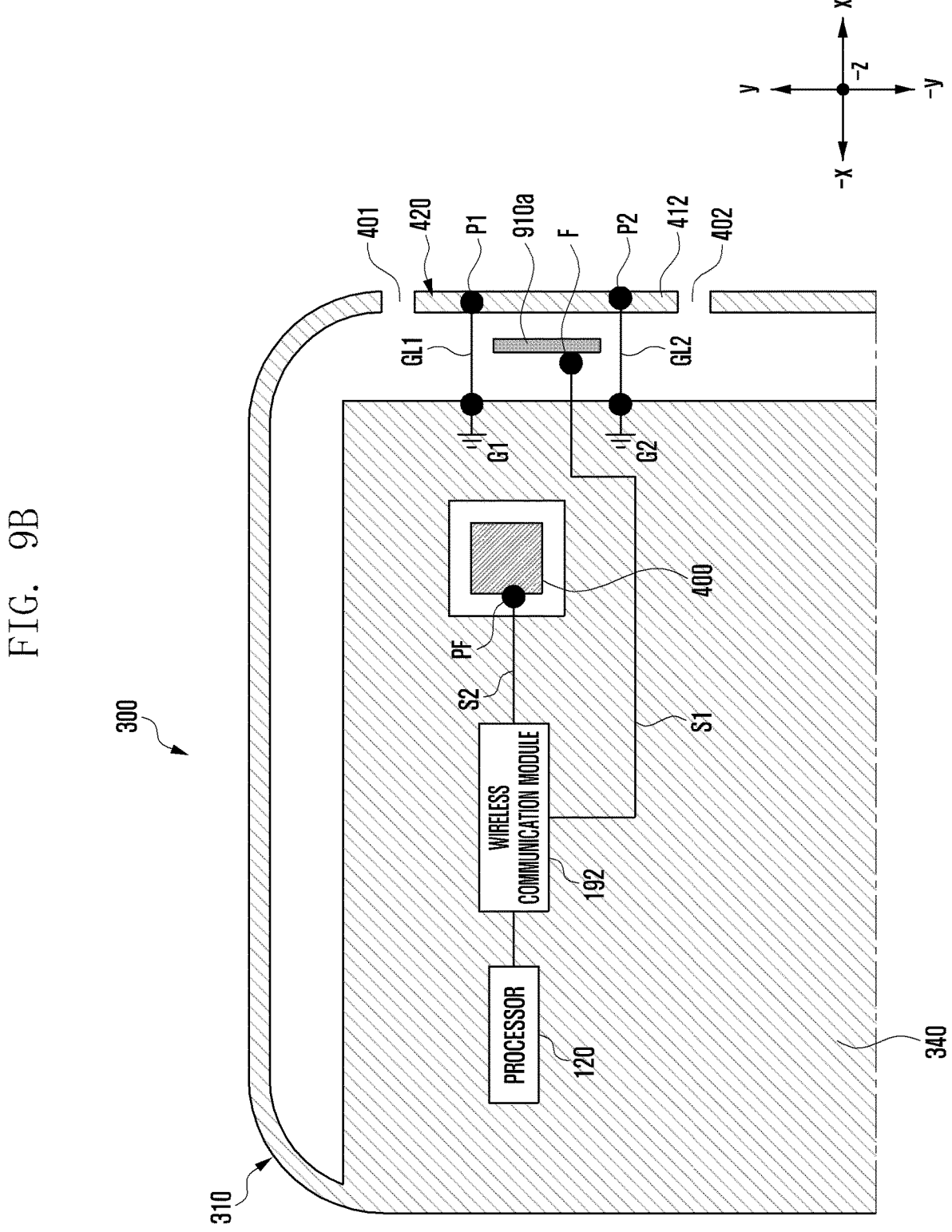
FIG. 9B is a diagram schematically illustrating an embodiment in which an electronic device transmits and/or receives a polarization signal by using one coupling pattern according to an embodiment of the disclosure.

FIG. 9B is a diagram schematically illustrating an embodiment in which an electronic device transmits and/or receives a polarization signal by using one coupling pattern according to an embodiment of the disclosure.

Referring to FIG. 9B, the electronic device 300 may include the printed circuit board 340, the processor 120, the wireless communication module 192, and the patch antenna 400.

According to an embodiment, the lateral member 310 (e.g., housing) of the electronic device 300 may include the first segment part 401 and the second segment part 402. For example, the first segment part 401 and the second segment part 402 may be formed, for example, on the second lateral surface (e.g., the second lateral surface 302 of FIG. 3) in the x-axis direction of the lateral member 310 of the electronic device 300. The first segment part 401 may be formed more adjacent to the y-axis direction than the second segment part 402.

According to an embodiment, the second conductive part 412 may be located between the first segment part 401 and the second segment part 402. For example, a coupling pattern 910a may be disposed between the second conductive part 412 and the printed circuit board 340. For example, the coupling pattern 910a may be disposed so as to be coupled to the second conductive part 412. The coupling pattern 910a may include the feeding point F. The coupling pattern 910a may be coupled to the second conductive part 412. The coupling pattern 910a may transfer the feeding signal being transferred through the feeding point F to the second conductive part 412. The second conductive part 412 may perform the function of the first antenna 410.

According to an embodiment, the second conductive part 412 may include the feeding point F, the first point P1, and the second point P2. For example, the feeding point F may be located between the first point P1 and the second point P2. For example, the first point P1 may be located between the first segment part 401 and the feeding point F, and the second point P2 may be located between the second segment part 402 and the feeding point F. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the second conductive part 412. For example, the second antenna 420 including the second conductive part 412 may operate as the slot antenna by using the first ground point G1, the first point P1, the second point P2, and the second ground point G2.

According to an embodiment, the processor 120 may be electrically connected to the wireless communication module 192. The processor 120 may control the wireless communication module 192 to transfer the feeding signal to the feeding point F of the coupling pattern 910a.

According to an embodiment, the wireless communication module 192 may be electrically connected to the feeding point F of the coupling pattern 910a. For example, the wireless communication module 192 may be electrically connected to the feeding point F through the first signal path S1.

According to an embodiment, the patch antenna 400 may include the feeding point PF. For example, the feeding point PF may be located in the −x-axis direction of the patch antenna 400. The feeding point PF of the patch antenna 400 may be electrically connected to the wireless communication module 192 through the second signal path S2. For example, the processor 120 may control the wireless communication module 192 to transfer the feeding signal to the feeding point PF of the patch antenna 400. The processor 120 may determine the measurement direction of the angle of arrival using the second polarization (e.g., horizontal polarization) signal by controlling the feeding signal being transferred to the feeding point PF of the patch antenna 400 through the wireless communication module 192.

According to an embodiment, the feeding point PF of the patch antenna 400 may receive the feeding signal transferred from the wireless communication module 192 in case of measuring the angle of arrival by using the first polarization (e.g., horizontal polarization) signal with the second antenna 420 including the second conductive part 412. For example, the processor 120 may control the wireless communication module 192 to transfer the feeding signal to the feeding point F of the coupling pattern 910a and the feeding point PF of the patch antenna 400, and measure the angle of arrival for the polarization (e.g., first polarization (horizontal polarization)) signal in the first scan direction (the direction in parallel to the x axis and −x axis).

According to an embodiment, the processor 120 may transfer the feeding signal to the feeding point PF of the patch antenna 400 and the feeding point F of the coupling pattern 910a, and for example, measure the locations of other electronic devices (e.g., electronic devices 102 and 104 of FIG. 1) by measuring the angle of arrival for the first polarization (e.g., horizontal polarization) signal.

Figure 10:
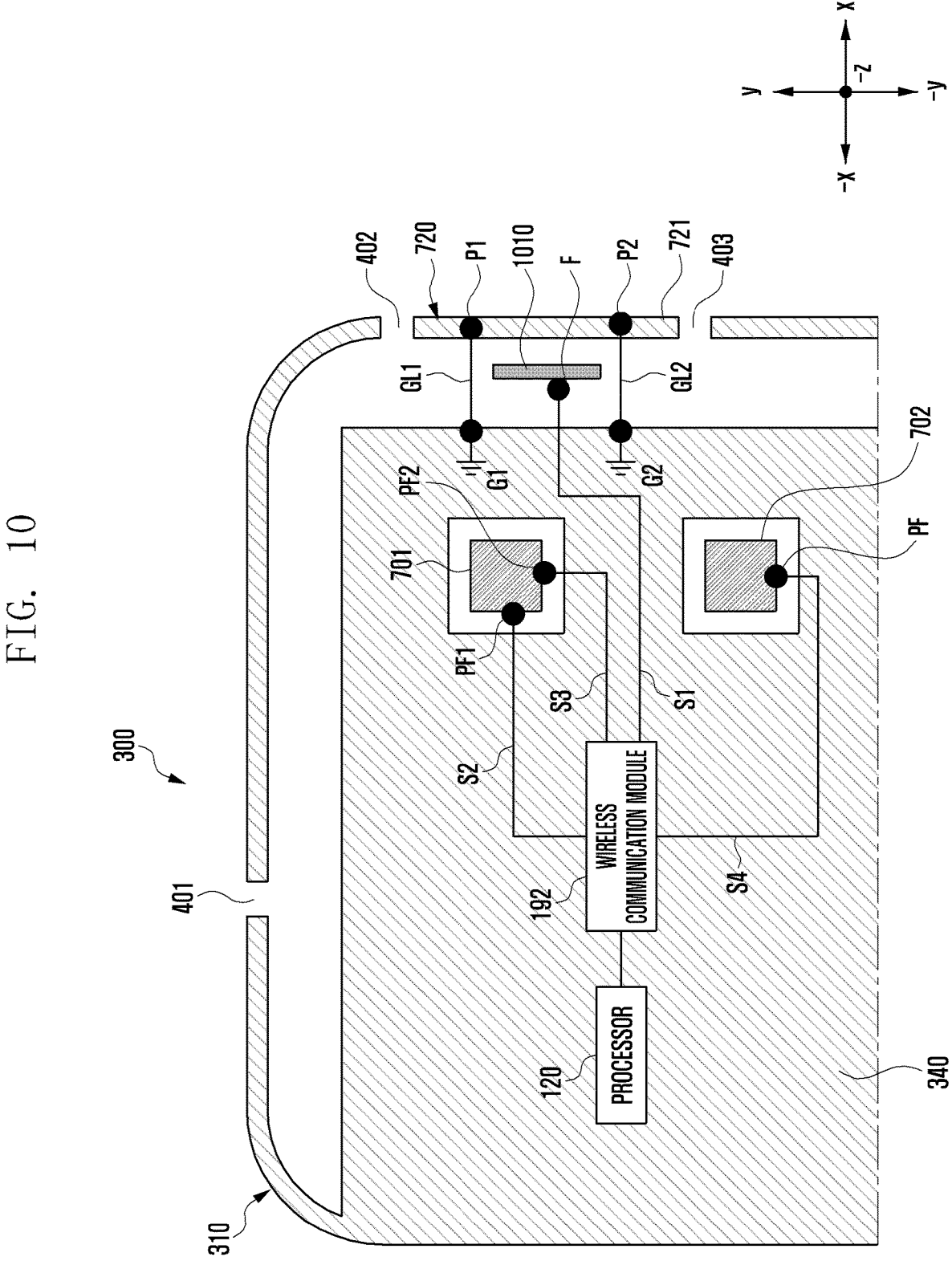
FIG. 10 is a diagram schematically illustrating an embodiment in which an electronic device transmits and/or receives a polarization signal by using an antenna, a first patch antenna, a second patch antenna, and a coupling pattern according to an embodiment of the disclosure.

FIG. 10 is a diagram schematically illustrating an embodiment in which an electronic device transmits and/or receives a polarization signal by using an antenna, a first patch antenna, a second patch antenna, and a coupling pattern according to an embodiment of the disclosure. According to an embodiment, the embodiment disclosed in FIG. 10 may be an embodiment including a coupling pattern in the embodiment disclosed in FIG. 7A.

According to various embodiments, the electronic device 300 disclosed below may include the embodiments of the electronic device 300 disclosed in FIGS. 4A, 4B, 5A, 5B, 6, 7A to 7C, 8A, 9A and 9B. In describing the electronic device 300 disclosed below, the same reference numerals may be given to the constituent elements substantially the same as those in the embodiments disclosed in FIGS. 4A, 4B, 5A, 5B, 6, 7A to 7C, 8A, 9A and 9B, and duplicate explanation of their functions may be omitted.

Referring to FIG. 10, the electronic device 300 may include the printed circuit board 340, the processor 120, the wireless communication module 192, a first patch antenna 701, and/or a second patch antenna 702.

According to an embodiment, the lateral member 310 (e.g., housing) of the electronic device 300 may include a first segment part 401, a second segment part 402, and/or a third segment part 403. The first segment part 401 may be formed, for example, on the first lateral surface (e.g., the first lateral surface 301 of FIG. 4A) in the y-axis direction of the lateral member 310 of the electronic device. The second segment part 402 and the third segment part 403 may be formed on the second lateral surface (e.g., the second lateral surface 302 of FIG. 4A) in the x-axis direction of the lateral member 310 of the electronic device 300. The second segment part 402 may be formed more adjacent to the y-axis direction than the third segment part 403. According to various embodiments, the first segment part 401 may be omitted.

According to an embodiment, the conductive part 721 may be disposed between the second segment part 402 and the third segment part 403. For example, a coupling pattern 1010 may be disposed between the conductive part 721 and the printed circuit board 340. For example, the coupling pattern 1010 may be disposed so as to be coupled to the conductive part 721. The coupling pattern 1010 may include the feeding point F. The coupling pattern 1010 may be coupled to the conductive part 721. The coupling pattern 1010 may transfer the feeding signal being transferred through the feeding point F to the conductive part 721. The conductive part 721 may perform the function of the antenna 720. The coupling pattern 1010 may include, for example, one of a flexible printed circuit board (FPCB), stainless steel (SUS), laser direct structuring (LDS), or plate assay (PEA).

According to an embodiment, the conductive part 721 may include the first point P1 and the second point P2. For example, the feeding point F may be located between the first point P1 and the second point P2. For example, the first point may be located adjacent to the second segment part 402, and the second point P2 may be located adjacent to the third segment part 403. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the conductive part 721. For example, the antenna 720 including the conductive part 721 may operate as the slot antenna by using the first ground point G1, the first point P1, the second point P2, and the second ground point G2.

According to an embodiment, the coupling pattern 1010 and the feeding point F may be disposed between the conductive part 721 and the printed circuit board 340 and between the first ground path GL1 and the second ground path GL2.

According to an embodiment, the processor 120 may be electrically connected to the wireless communication module 192. The processor 120 may control the wireless communication module 192 to transfer the feeding signal to the feeding point F of the coupling pattern 1010. The wireless communication module 192 may be electrically connected to the feeding point F of the coupling pattern 1010. For example, the wireless communication module 192 may be electrically connected to the feeding point F through the first signal path S1.

According to an embodiment, the first patch antenna 701 may include the first feeding point PF1 and/or the second feeding point PF2. For example, the first feeding point PF1 may be located in the −x-axis direction of the first patch antenna 701. For example, the second feeding point PF2 may be located in the −y-axis direction of the first patch antenna 701. The first feeding point PF1 of the first patch antenna 701 may be electrically connected to the wireless communication module 192 through the second signal path S2. The second feeding point PF2 of the first patch antenna 701 may be electrically connected to the wireless communication module 192 through the third signal path S3. The processor 120 may control the wireless communication module 192 to transfer the feeding signal to at least one of the first feeding point PF1 and the second feeding point PF2 of the patch antenna 400. The wireless communication module 192 may selectively transfer the feeding signal to the first feeding point PF1 or the second feeding point PF2 of the first patch antenna 701 under the control of the processor 120. The processor 120 may determine the measurement direction of the angle of arrival by using the first polarization (e.g., horizontal polarization) signal and/or the second polarization (e.g., vertical polarization) signal by controlling the feeding signal being transferred to the first feeding point PF1 or the second feeding point PF2 of the first patch antenna 701 through the wireless communication module 192.

According to an embodiment, the second patch antenna 702 may be disposed in the −y-axis direction (e.g., lower part) of the first patch antenna 701. For example, the second patch antenna 702 may include the feeding point PF. For example, the feeding point PF may be located in the −y-axis direction of the second patch antenna 702. The feeding point PF of the second patch antenna 702 may be electrically connected to the wireless communication module 192 through the fourth signal path S4. The processor 120 may control the wireless communication module 192 to transfer the feeding signal to the feeding point PF of the second patch antenna 702. The processor 120 may determine the measurement direction of the angle of arrival using the second polarization (e.g., vertical polarization) signal by controlling the feeding signal being transferred to the feeding point PF of the second patch antenna 702 through the wireless communication module 192. According to various embodiments, the feeding point PF of the second patch antenna 702 may be located at the corner between the −x axis and the −y axis of the second patch antenna 702.

According to an embodiment, the first feeding point PF1 of the first patch antenna 701 may receive the feeding signal transferred from the wireless communication module 192 in case of measuring the angle of arrival by using the first polarization (e.g., horizontal polarization) signal with the antenna 720 including the conductive part 721. For example, the processor 120 may control the wireless communication module 192 to transfer the feeding signal to the feeding point F of the coupling pattern 1010 and the first feeding point PF1 of the first patch antenna 701, and measure the angle of arrival for the polarization (e.g., first polarization (horizontal polarization)) signal in the first scan direction (e.g., direction in parallel to the x axis and −x axis).

According to an embodiment, the second feeding point PF2 of the first patch antenna 701 may receive the feeding signal transferred from the wireless communication module 192 in case of measuring the angle of arrival by using the second polarization (e.g., vertical polarization) signal with the second patch antenna 702. For example, the processor 120 may control the wireless communication module 192 to transfer the feeding signal to the second feeding point F2 of the first patch antenna 701 and the feeding point PF of the second patch antenna 702, and measure the angle of arrival for the polarization (e.g., second polarization (vertical polarization)) signal in the second scan direction (e.g., direction in parallel to the y axis and −y axis).

According to an embodiment, the processor 120 may transfer the feeding signal to the first feeding point PF1 of the first patch antenna 701 and the feeding point F of the coupling pattern 1010, and for example, measure the locations of other electronic devices (e.g., electronic devices 102 and 104 of FIG. 1) by measuring the angle of arrival for the first polarization (e.g., horizontal polarization) signal. For example, the processor 120 may transfer the feeding signal to the second feeding point PF2 of the first patch antenna 701 and the feeding point PF of the second patch antenna 702, and for example, measure the locations of other electronic devices (e.g., electronic devices 102 and 104 of FIG. 1) by measuring the angle of arrival for the second polarization (e.g., vertical polarization) signal.

Figure 11A:
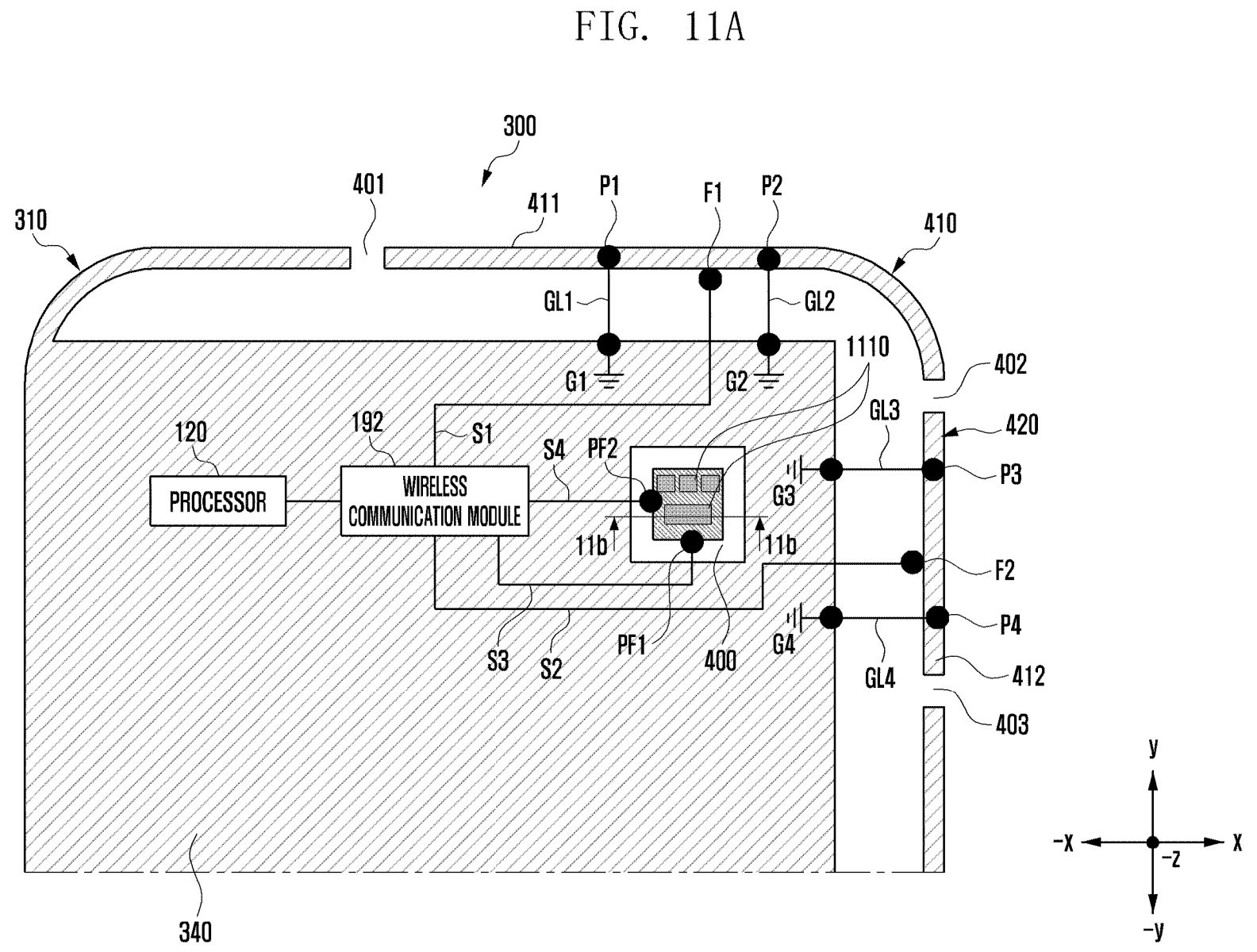

FIG. 11A is a diagram schematically illustrating an embodiment in which an electronic device transmits and/or receives a first polarization signal and a second polarization signal by using a patch antenna, a first antenna, a second antenna, and a third antenna according to an embodiment of the disclosure.

Figure 11B:
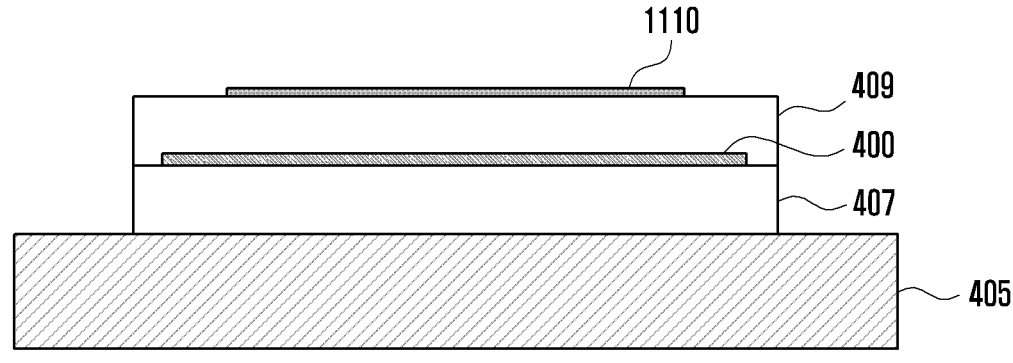
FIG. 11B is a cross-sectional view of a part 11*b*-11*b* of the electronic device of FIG. 11A according to an embodiment of the disclosure.

FIG. 11B is a cross-sectional view of a part 11b-11b of the electronic device of FIG. 11A according to an embodiment of the disclosure.

According to an embodiment, the embodiment disclosed in FIG. 11A may be an embodiment in which a third antenna 1110 is disposed on a patch antenna 400 in the embodiment disclosed in FIG. 4A.

According to various embodiments, the electronic device 300 disclosed below may include the embodiments disclosed in FIGS. 4A and 10. In describing the electronic device 300 disclosed below, the same reference numerals may be given to the constituent elements substantially the same as those in the embodiment disclosed in FIGS. 4A, 4B, 5A, 5B, 6, 7A to 7C, 8A, 9A, 9B, and 10, and duplicate explanation of their functions may be omitted.

Referring to FIGS. 11A and 11B, the electronic device 300 may include the printed circuit board 340, the processor 120, the wireless communication module 192, the patch antenna 400, and/or the third antenna 1110. The printed circuit board 340 may be disposed inside the lateral member 310 (e.g., housing). For example, the printed circuit board 340 may be spaced apart from the lateral member 310 at least partly.

According to an embodiment, the lateral member 310 of the electronic device 300 may include a first segment part 401, a second segment part 402, and/or a third segment part 403. The first segment part 401 may be formed, for example, on the first lateral surface (the first lateral surface 301 of FIG. 3 or 4A) in the y-axis direction of the lateral member 310 of the electronic device 300. The second segment part 402 and the third segment part 403 may be formed on the second lateral surface (e.g., the second lateral surface 302 of FIG. 3 or 4A) in the x-axis direction of the lateral member 310 of the electronic device 300. For example, the second segment part 402 may be formed more adjacent to the first lateral surface 301 in the y-axis direction than the third segment part 403.

According to an embodiment, the first conductive part 411 may be located between the first segment part 401 and the second segment part 402. In an embodiment, the first conductive part 411 may include the first feeding point F1, the first point P1, and the second point P2. The first conductive part 411 may be electrically connected to the wireless communication module 192 through the first feeding point F1 and the first signal path S1, and perform the function of the first antenna 410. For example, the first feeding point F1 may be located between the first point P1 and the second point P2. The first point P1 may be located between the first segment part 401 and the first feeding point F1, and the second point P2 may be located between the second segment part 402 and the first feeding point F1. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the first conductive part 411. The first antenna 410 including the first conductive part 411 may operate as the first slot antenna by using the first ground point G1, the first point P1, the second point P2, and the second ground point G2.

According to an embodiment, the second conductive part 412 may be located between the second segment part 402 and the third segment part 403. In an embodiment, the second conductive part 412 may include the second feeding point F2, the third point P3, and the fourth point P4. The second conductive part 412 may be electrically connected to the wireless communication module 192 through the second feeding point F2 and the second signal path S2, and perform the function of the second antenna 420. For example, the second feeding point F2 may be located between the third point P3 and the fourth point P4. The third point P3 may be located between the second segment part 402 and the second feeding point F2, and the fourth point P4 may be located between the third segment part 403 and the second feeding point F2. The third point P3 may be electrically connected to the third ground point G3 of the printed circuit board 340 through the third ground path GL3. The fourth point P4 may be electrically connected to the fourth ground point G4 of the printed circuit board 340 through the fourth ground path GL4. The third ground point G3 and the fourth ground point G4 may ground the second conductive part 412. For example, the second antenna 420 including the second conductive part 412 may operate as the second slot antenna by using the third ground point G3, the third point P3, the fourth point P4, and the fourth ground point G4.

According to an embodiment, the processor 120 may be electrically connected to the wireless communication module 192. The processor 120 may control the wireless communication module 192 to transfer the feeding signal to at least one of the first feeding point F1 of the first conductive part 411 and the second feeding point F2 of the second conductive part 412.

According to an embodiment, the wireless communication module 192 may be electrically connected to the first feeding point F1 of the first conductive part 411 and the second feeding point F2 of the second conductive part 412. For example, the wireless communication module 192 may be electrically connected to the first feeding point F1 through the first signal path S1. The wireless communication module 192 may be electrically connected to the second feeding point F2 through the second signal path S2. The wireless communication module 192 may selectively transfer the feeding signal to the first feeding point F1 or the second feeding point F2 under the control of the processor 120.

According to an embodiment, the patch antenna 40 may include the first feeding point PF1 and/or the second feeding point PF2. For example, the first feeding point PF1 may be located in the −y-axis direction of the patch antenna 400. For example, the second feeding point PF2 may be located in the −x-axis direction of the patch antenna 400. The first feeding point PF1 of the patch antenna 400 may be electrically connected to the wireless communication module 192 through the third signal path S3. The second feeding point PF2 of the patch antenna 400 may be electrically connected to the wireless communication module 192 through the fourth signal path S4. The processor 120 may control the wireless communication module 192 to transfer the feeding signal to at least one of the first feeding point PF1 and the second feeding point PF2 of the patch antenna 400. Under the control of the processor 120, the wireless communication module 192 may selectively transfer the feeding signal to the first feeding point PF1 or the second feeding point PF2 of the patch antenna 400. The processor 120 may determine the measurement direction of the angle of arrival using the first polarization (e.g., vertical polarization) signal and/or the second polarization (e.g., horizontal polarization) signal by controlling the feeding signal being transferred to the first feeding point PF1 or the second feeding point PF2 of the patch antenna 400 through the wireless communication module 192.

According to an embodiment, the first feeding point PF1 of the patch antenna 400 may receive the feeding signal being transferred from the wireless communication module 192 in order to transmit and/or receive the signal having the first polarization (e.g., vertical polarization) to and/or from the first antenna 410 including the first conductive part 411. For example, the processor 120 may control the wireless communication module 192 to transfer the feeding signal to the first feeding point F1 of the first antenna 410 including the first conductive part 411 and the first feeding point PF1 of the patch antenna 400, and measure the angle of arrival for the polarization (e.g., first polarization (vertical polarization) in the first scan direction (e.g., the direction in parallel to the y axis and the −y axis).

According to an embodiment, the second feeding point PF2 of the patch antenna 400 may receive the feeding signal being transferred from the wireless communication module 192 in order to transmit and/or receive the signal having the second polarization (e.g., horizontal polarization) to and/or from the second antenna 420 including the second conductive part 412. For example, the processor 120 may control the wireless communication module 192 to transfer the feeding signal to the second feeding point F2 of the second antenna 420 including the second conductive part 412 and the second feeding point PF2 of the patch antenna 400, and measure the angle of arrival for the polarization (e.g., second polarization (horizontal polarization) in the second scan direction (e.g., the direction in parallel to the x axis and the −x axis).

According to an embodiment, the processor 120 may transfer the feeding signal to the first feeding point PF1 of the patch antenna 400 and the first feeding point F1 of the first antenna 410 including the first conductive part 411, and for example, measure the locations of other electronic devices (e.g., electronic devices 102 and 104 of FIG. 1) by measuring the angle of arrival for the first polarization (e.g., vertical polarization). In an embodiment, the processor 120 may transfer the feeding signal to the second feeding point PF2 of the patch antenna 400 and the second feeding point F2 of the second antenna 420 including the second conductive part 412, and for example, measure the locations of other electronic devices (e.g., electronic devices 102 and 104 of FIG. 1) by measuring the angle of arrival for the second polarization (e.g., horizontal polarization).

According to an embodiment, the third antenna 1110 may be disposed on the upper part (e.g., −z-axis direction) of the patch antenna 400. The third antenna 1110 may include an mmWave antenna. For example, the third antenna 1110 may include a patch type conductive plate. For example, the patch antenna 400 may perform the ground function of the third antenna 1110. Referring to FIG. 11B, the patch antenna 400 may be disposed on a first layer 407, and a ground 405 may be formed on the lower part of the first layer 407. The third antenna 1110 may be disposed on a second layer 409. The third antenna 1110 may be electrically connected to the wireless communication module 192 (e.g., UWB communication module). In an embodiment, the wireless communication module 192 may include an mmWave communication module, a transceiver, or a communication processor. Since the third antenna 1110 is disposed on an upper part (e.g., −z-axis direction) of the patch antenna 400, it is possible to secure a space in which other electronic components can be disposed inside the electronic device 300.

Figure 12:
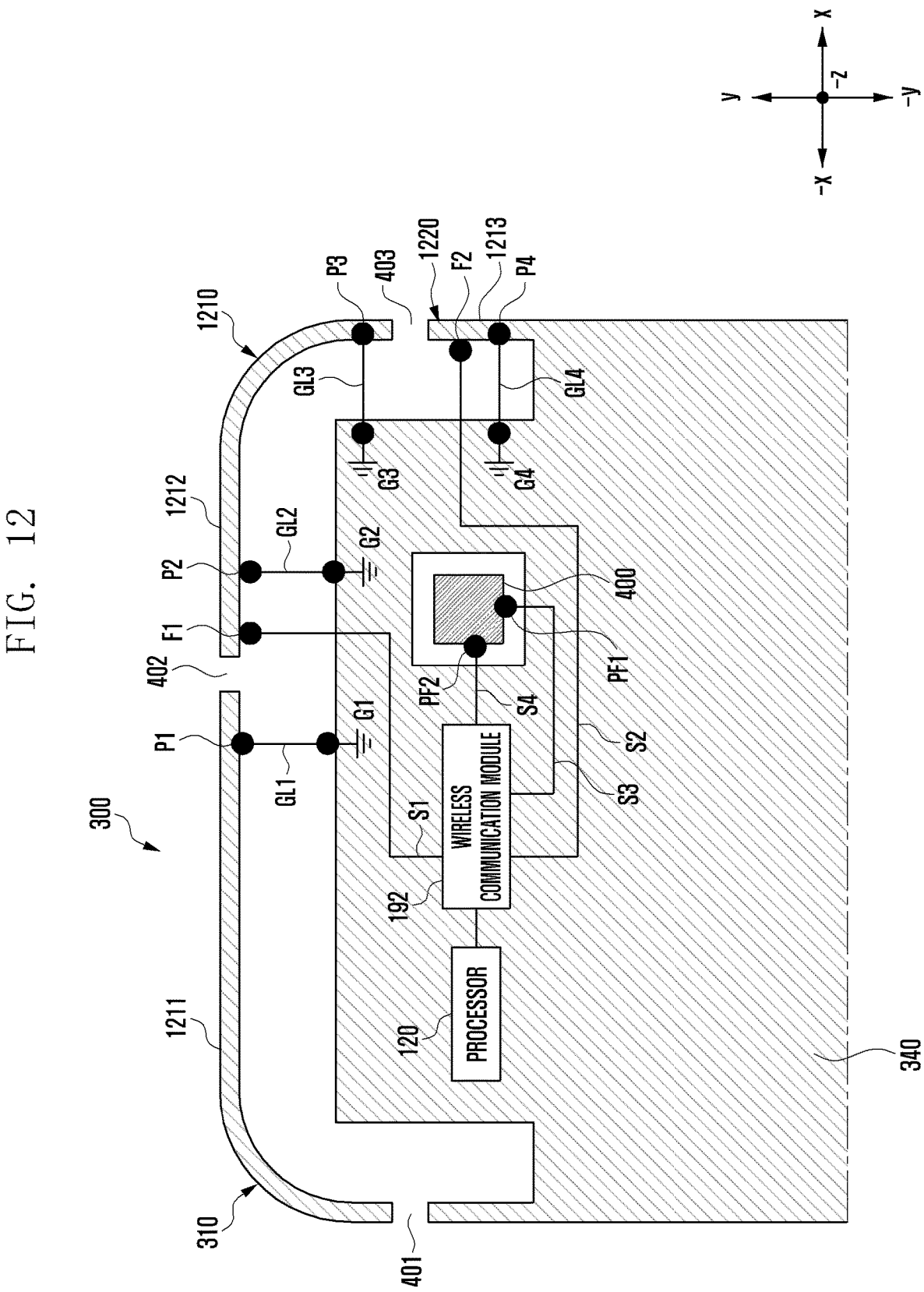
FIG. 12 is a diagram schematically illustrating an embodiment in which an electronic device transmits and/or receives a polarization signal by using a patch antenna, a first antenna, and a second antenna according to an embodiment of the disclosure.

FIG. 12 is a diagram schematically illustrating an embodiment in which an electronic device transmits and/or receives a polarization signal by using a patch antenna, a first antenna, and a second antenna according to an embodiment of the disclosure. According to an embodiment, the embodiment disclosed in FIG. 12 may be an embodiment in which the location of a segment part is changed in the embodiment disclosed in FIG. 4A.

According to various embodiments, the electronic device 300 disclosed below may include the embodiments of the electronic device 300 disclosed in FIGS. 4A, 4B, 5A, 5B, 6, 7A to 7C, 8A, 8B, 9A, 9B, 10, 11A, and 11B. In describing the electronic device 300 disclosed below, the same reference numerals may be given to the constituent elements substantially the same as those in the embodiments disclosed in FIGS. 4A, 4B, 5A, 5B, 6, 7A to 7C, 8A, 8B, 9A, 9B, 10, 11A, and 11B, and duplicate explanation of their functions may be omitted.

Referring to FIG. 12, the electronic device 300 may include the printed circuit board 340, the processor 120, the wireless communication module 192, and/or the patch antenna 400. The printed circuit board 340 may be disposed inside the lateral member 310 (e.g., housing). The printed circuit board 340 may be spaced apart from the lateral member 310 at least partly.

According to an embodiment, the lateral member 310 of the electronic device 300 may include the first segment part 401, the second segment part 402, and/or the third segment part 403. For example, the first segment part 401 may be formed, for example, on the lateral surface in the −x-axis direction of the lateral member 310 of the electronic device 300. For example, the second segment part 402 may be formed on the first lateral surface (e.g., first lateral surface 301 of FIG. 3 or 4A) in the y-axis direction of the lateral member 310 of the electronic device 300. For example, the third segment part 403 may be formed on the second lateral surface (e.g., the second lateral surface 302 of FIG. 3 or 4A) in the x-axis direction of the lateral member 310 of the electronic device 300.

According to an embodiment, a first conductive part 1211 may be located between the first segment part 401 and the second segment part 402. For example, the first conductive part 1211 may include the first point P1. The first point P1 of the first conductive part 411 may be electrically connected to the first ground point G1 of the printed circuit board 340 through the first ground path GL1.

According to an embodiment, a second conductive part 1212 may be located between the second segment part 402 and the third segment part 403. For example, the second conductive part 1212 may include the first feeding point F1, the second point P2, and/or the third point P3. The first feeding point F1 may be electrically connected to the wireless communication module 192 through the first signal path S1. The second point P2 may be electrically connected to the second ground point G2 of the printed circuit board 340 through the second ground path GL2. The third point P3 may be electrically connected to the third ground point G3 of the printed circuit board 340 through the third ground path GL3. The first feeding point F1 may be located more adjacent to the second segment part 402 than the second point P2. For example, the first feeding point F1 may be located between the second point P2 and the second segment part 402. The second point P2 may be located more adjacent to the second segment part 402 than the third point P3. The third point P3 may be located more adjacent to the third segment part 403 than the second point P2. The second conductive part 1212 may be electrically connected to the wireless communication module 192, and perform the function of a first antenna 1210.

According to an embodiment, a third conductive part 1213 located on the second lateral surface in the x-axis direction of the lateral member 310 may include the second feeding point F2 and the fourth point P4. For example, the third segment part 403 may be located between the second conductive part 1212 and the third conductive part 1213. The second feeding point F2 may be located more adjacent to the third segment part 403 than the fourth point P4. The second feeding point F2 may be electrically connected to the wireless communication module 192 through the second signal path S2. The fourth point P4 may be electrically connected to the fourth ground point G4 of the printed circuit board 340 through the fourth ground path GL4. The third conductive part 1213 may be electrically connected to the wireless communication module 192, and perform the function of a second antenna 1220.

According to an embodiment, the processor 120 may be electrically connected to the wireless communication module 192. The processor 120 may control the wireless communication module 192 to transfer the feeding signal to at least one of the first feeding point F1 of the second conductive part 1212 and the second feeding point F2 of the third conductive part 1213. For example, the wireless communication module 192 may selectively transfer the feeding signal to the first feeding point F1 or the second feeding point F2 under the control of the processor 120.

According to an embodiment, the patch antenna 400 may include the first feeding point PF1 and/or the second feeding point PF2. For example, the first feeding point PF1 may be located in the −y-axis direction of the patch antenna 400. The second feeding point PF2 may be located in the −x-axis direction of the patch antenna 400. The first feeding point PF1 of the patch antenna 400 may be electrically connected to the wireless communication module 192 through the third signal path S3. The second feeding point PF2 of the patch antenna 400 may be electrically connected to the wireless communication module 192 through the fourth signal path S4. For example, the processor 120 may control the wireless communication module 192 to transfer the feeding signal to at least one of the first feeding point PF1 and the second feeding point PF2 of the patch antenna 400. For example, the wireless communication module 192 may selectively transfer the feeding signal to the first feeding point PF1 or the second feeding point PF2 of the patch antenna 400 under the control of the processor 120. The processor 120 may determine the measurement direction of the angle of arrival using the first polarization (e.g., vertical polarization) signal and/or the second polarization (e.g., horizontal polarization) signal by controlling the feeding signal being transferred to the first feeding point PF1 or the second feeding point PF2 of the patch antenna 400 through the wireless communication module 192.

According to an embodiment, the first feeding point PF1 of the patch antenna 400 may receive the feeding signal transferred from the wireless communication module 192 in case of measuring the angle of arrival by using the first polarization (e.g., vertical polarization) signal with the first antenna 1210 including the second conductive part 1212. For example, the processor 120 may control the wireless communication module 192 to transfer the feeding signal to the first feeding point F1 of the second conductive part 1212 and the first feeding point PF1 of the patch antenna 400, and measure the angle of arrival for the polarization (e.g., first polarization (vertical polarization)) signal in the first scan direction (the direction in parallel to the y axis and −y axis).

According to an embodiment, the second feeding point PF2 of the patch antenna 400 may receive the feeding signal transferred from the wireless communication module 192 in case of measuring the angle of arrival by using the second polarization (e.g., horizontal polarization) signal with the second antenna 1220 including the third conductive part 1213. For example, the processor 120 may control the wireless communication module 192 to transfer the feeding signal to the second feeding point F2 of the third conductive part 1213 and the second feeding point PF2 of the patch antenna 400, and measure the angle of arrival for the polarization (e.g., second polarization (horizontal polarization)) signal in the second scan direction (the direction in parallel to the x axis and −x axis).

According to an embodiment, the processor 120 may transfer the feeding signal to the first feeding point PF1 of the patch antenna 400 and the first feeding point F1 of the second conductive part 1212, and for example, measure the locations of other electronic devices (e.g., electronic devices 102 and 104 of FIG. 1) by measuring the angle of arrival for the first polarization (e.g., vertical polarization) signal. For example, the processor 120 may transfer the feeding signal to the second feeding point PF2 of the patch antenna 400 and the second feeding point F2 of the third conductive part 1213, and for example, measure the angle of arrival for the second polarization (e.g., horizontal polarization) signal, and measure the locations of other electronic devices (e.g., electronic devices 102 and 104 of FIG. 1).

Figure 13:
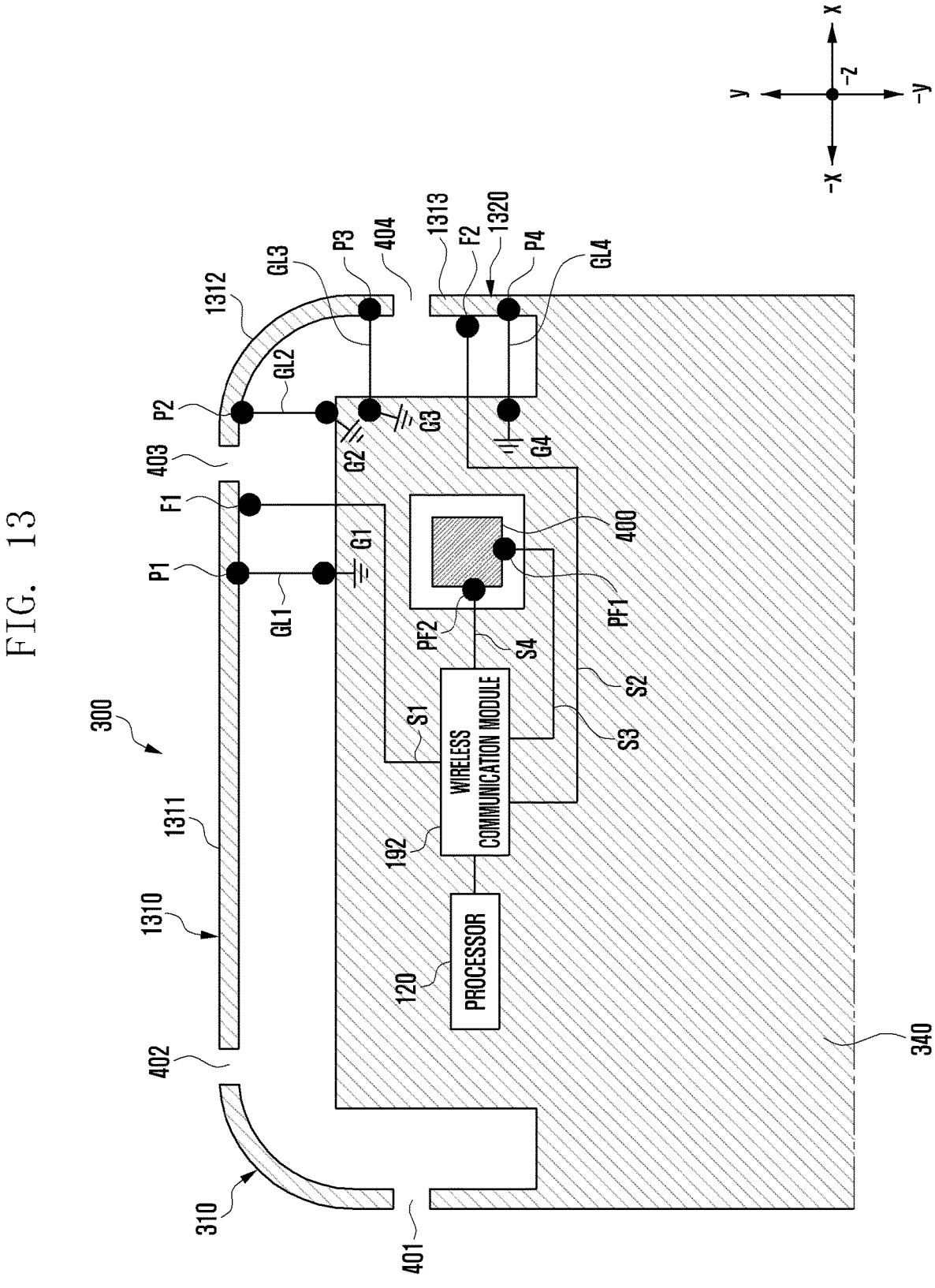
FIG. 13 is a diagram schematically illustrating various embodiments in which an electronic device transmits and/or receives a polarization signal by using a patch antenna, a first antenna, and a second antenna according to an embodiment of the disclosure.

FIG. 13 is a diagram schematically illustrating various embodiments in which an electronic device transmits and/or receives a polarization signal by using a patch antenna, a first antenna, and a second antenna according to an embodiment of the disclosure. According to an embodiment, the embodiment disclosed in FIG. 13 may be an embodiment in which a fourth segment part 404 is additionally formed in the embodiment disclosed in FIG. 4A or 12.

According to various embodiments, the electronic device 300 disclosed below may include the embodiments of the electronic device 300 disclosed in FIGS. 4A, 4B, 5A, 5B, 6, 7A to 7C, 8A, 8B, 9A, 9B, 10, 11A, 11B, and 12. In describing the electronic device 300 disclosed below, the same reference numerals may be given to the constituent elements substantially the same as those in the embodiments disclosed in FIGS. 4A, 4B, 5A, 5B, 6, 7A to 7C, 8A, 8B, 9A, 9B, 10, 11A, 11B, and 12, and duplicate explanation of their functions may be omitted.

Referring to FIG. 13, the electronic device 300 may include the printed circuit board 340, the processor 120, the wireless communication module 192, and/or the patch antenna 400. The printed circuit board 340 may be disposed inside the lateral member 310. The printed circuit board 340 may be spaced apart from the lateral member 310 at least partly.

According to an embodiment, the lateral member 310 (e.g., housing) of the electronic device 300 may include the first segment part 401, the second segment part 402, the third segment part 403, and/or the fourth segment part 404. For example, the first segment part 401 may be formed, for example, on the lateral surface in the −x-axis direction of the lateral member 310 of the electronic device 300. The second segment part 402 may be formed on the lateral surface (e.g., the first lateral surface 301 of FIG. 3 or 4A) in the y-axis direction of the lateral member 310 of the electronic device 300. The third segment part 403 may be formed on the lateral surface (e.g., the first lateral surface 301 of FIG. 3 or 4A) in the y-axis direction of the lateral member 310 of the electronic device 300. For example, the second segment part 402 may be formed more adjacent to the first segment part 401 than the third segment part 403. The fourth segment part 404 may be formed on the lateral surface (e.g., the second lateral surface 302 of FIG. 3) in the x-axis direction of the lateral member 310 of the electronic device 300. For example, the third segment part 403 may be formed more adjacent to the fourth segment part 404 than the second segment part 402.

According to an embodiment, a first conductive part 1311 may be located between the second segment part 402 and the third segment part 403. For example, the first conductive part 1311 may include the first point P1 and the first feeding point F1. The first feeding point F1 may be located more adjacent to the third segment part 403 than the first point P1. For example, the first feeding point F1 may be located between the first point P1 and the third segment part 403. The first point P1 of the first conductive part 1311 may be electrically connected to the first ground point G1 of the printed circuit board 340 through the first ground path GL1. The first feeding point F1 may be electrically connected to the wireless communication module 192 through the first signal path S1. The first conductive part 1311 may be electrically connected to the wireless communication module 192, and perform the function of a first antenna 1310.

According to an embodiment, a second conductive part 1312 may be located between the third segment part 403 and the fourth segment part 404. The second conductive part 1312 may include the second point P2 and the third point P3. For example, the second point P2 may be located more adjacent to the third segment part 403 than the third point P3. The second point P2 may be electrically connected to the second ground point G2 of the printed circuit board 340 through the second ground path GL2. The third point P3 may be electrically connected to the third ground point G3 of the printed circuit board 340 through the third ground path GL3.

According to an embodiment, a third conductive part 1313 disposed on the lateral surface in the x-axis direction of the lateral member 310 may include the second feeding point F2 and the fourth point P4. For example, the fourth segment part 404 may be located between the second conductive part 1312 and the third conductive part 1313. For example, the second feeding point F2 may be located more adjacent to the fourth segment part 404 than the fourth point P4. The second feeding point F2 may be electrically connected to the wireless communication module 192 through the second signal path S2. The fourth point P4 may be electrically connected to the fourth ground point G4 of the printed circuit board 340 through the fourth ground path GL4. The third conductive part 1313 may be electrically connected to the wireless communication module 192, and perform the function of a second antenna 1320.

According to an embodiment, the processor 120 may be electrically connected to the wireless communication module 192. For example, the processor 120 may control the wireless communication module 192 to transfer the feeding signal to at least one of the first feeding point F1 of the first conductive part 1311 and the second feeding point F2 of the third conductive part 1313. The wireless communication module 192 may selectively transfer the feeding signal to the first feeding point F1 or the second feeding point F2 under the control of the processor 120.

According to an embodiment, the patch antenna 400 may include the first feeding point PF1 and/or the second feeding point PF2. For example, the first feeding point PF1 may be located in the −y-axis direction of the patch antenna 400. The second feeding point PF2 may be located in the −x-axis direction of the patch antenna 400. The first feeding point PF1 of the patch antenna 400 may be electrically connected to the wireless communication module 192 through the third signal path S3. The second feeding point PF2 of the patch antenna 400 may be electrically connected to the wireless communication module 192 through the fourth signal path S4. The processor 120 may control the wireless communication module 192 to transfer the feeding signal to at least one of the first feeding point PF1 and the second feeding point PF2 of the patch antenna 400. The wireless communication module 192 may selectively transfer the feeding signal to the first feeding point PF1 or the second feeding point PF2 of the patch antenna 400 under the control of the processor 120. The processor 120 may determine the measurement direction of the angle of arrival by using the first polarization (e.g., vertical polarization) signal and/or the second polarization (e.g., horizontal polarization) signal by controlling the feeding signal being transferred to the first feeding point PF1 or the second feeding point PF2 of the patch antenna 400 through the wireless communication module 192.

According to an embodiment, the first feeding point PF1 of the patch antenna 400 may receive the feeding signal transferred from the wireless communication module 192 in case of measuring the angle of arrival by using the first polarization (e.g., vertical polarization) signal with the first antenna 1310 including the first conductive part 1311. For example, the processor 120 may control the wireless communication module 192 to transfer the feeding signal to the first feeding point F1 of the first conductive part 1311 and the first feeding point PF1 of the patch antenna 400, and measure the angle of arrival for the polarization (e.g., first polarization (vertical polarization)) signal in the first scan direction (the direction in parallel to the y axis and −y axis).

According to an embodiment, the second feeding point PF2 of the patch antenna 400 may receive the feeding signal transferred from the wireless communication module 192 in case of measuring the angle of arrival by using the second polarization (e.g., horizontal polarization) signal with the second antenna 1220 including the third conductive part 1313. For example, the processor 120 may control the wireless communication module 192 to transfer the feeding signal to the second feeding point F2 of the third conductive part 1313 and the second feeding point PF2 of the patch antenna 400, and measure the angle of arrival for the polarization (e.g., second polarization (horizontal polarization)) signal in the second scan direction (the direction in parallel to the x axis and −x axis).

According to an embodiment, the processor 120 may transfer the feeding signal to the first feeding point PF1 of the patch antenna 400 and the first feeding point F1 of the first conductive part 1311, and for example, measure the locations of other electronic devices (e.g., electronic devices 102 and 104 of FIG. 1) by measuring the angle of arrival for the first polarization (e.g., vertical polarization) signal. In an embodiment, the processor 120 may transfer the feeding signal to the second feeding point PF2 of the patch antenna 400 and the second feeding point F2 of the third conductive part 1313, and for example, measure the locations of other electronic devices (e.g., electronic devices 102 and 104 of FIG. 1) by measuring the angle of arrival for the second polarization (e.g., horizontal polarization) signal.

Figure 14:
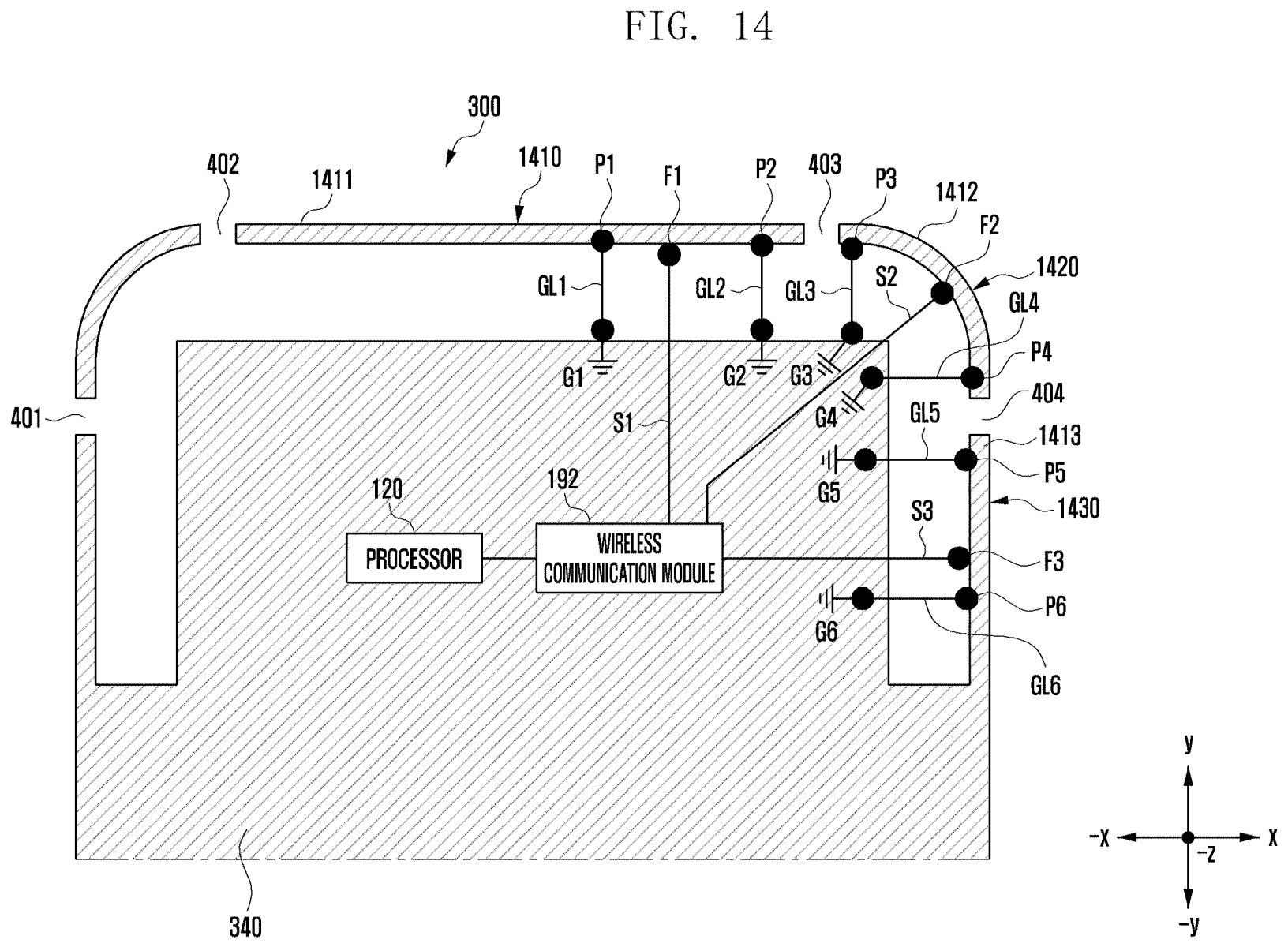

FIG. 14 is a diagram schematically illustrating an embodiment in which an electronic device includes a first antenna, a second antenna, and a third antenna according to an embodiment of the disclosure. According to an embodiment, FIG. 14 may represent an embodiment in which an electronic device according to an embodiment of the disclosure does not include a patch antenna, but uses the second conductive part disposed between the x-axis direction and ay-axis direction of the electronic device 300 as an antenna (e.g., second antenna 1420).

Referring to FIG. 14, the electronic device 300 may include the printed circuit board 340, the processor 120, and/or the wireless communication module 192. The printed circuit board 340 may be disposed inside the lateral member 310. The printed circuit board 340 may be spaced apart from the lateral member 310 at least partly.

According to an embodiment, the lateral member 310 (e.g., housing) of the electronic device 300 may include the first segment part 401, the second segment part 402, the third segment part 403, and/or the fourth segment part 404. For example, the first segment part 401 may be formed on the lateral surface in the −x-axis direction of the lateral member 310 of the electronic device 300. The second segment part 402 may be formed on the lateral surface (e.g., the first lateral surface 301 of FIG. 3 or 4A) in the y-axis direction of the lateral member 310 of the electronic device 300. The third segment part 403 may be formed on the lateral surface (e.g., the first lateral surface 301 of FIG. 3 or 4A) in the y-axis direction of the lateral member 310 of the electronic device 300. The second segment part 402 may be formed more adjacent to the first segment part 401 than the third segment part 403. The fourth segment part 404 may be formed on the lateral surface (e.g., the second lateral surface 302 of FIG. 3) in the x-axis direction of the lateral member 310 of the electronic device 300. For example, the third segment part 403 may be formed more adjacent to the fourth segment part 404 than the second segment part 402.

According to an embodiment, a first conductive part 1411 may be located between the second segment part 402 and the third segment part 403. For example, the first conductive part 1411 may include the first point P1, the second point P2, and the first feeding point F1. The first point P1 may be located more adjacent to the second segment part 402 than the second point P2. The second point P2 may be located more adjacent to the third segment part 403 than the first point P1. The first feeding point F1 may be electrically connected to the wireless communication module 192 through the first signal path S1. The first point P1 of the first conductive part 1411 may be electrically connected to the first ground point G1 of the printed circuit board 340 through the first ground path GL1. The second point P2 of the first conductive part 1411 may be electrically connected to the second ground point G2 of the printed circuit board 340 through the second ground path GL2. The first conductive part 1411 may be electrically connected to the wireless communication module 192 through the first feeding point F1 and the first signal path S1, and perform the function of the first antenna 1310.

According to an embodiment, a second conductive part 1412 may be located between the third segment part 403 and the fourth segment part 404. For example, the second conductive part 1412 may include the third point P3, the fourth point P4, and the second feeding point F2. The third point P3 may be located more adjacent to the third segment part 403 than the third point P3. The second feeding point F2 may be located between the third point P3 and the fourth point P4. The second feeding point F2 may be electrically connected to the wireless communication module 192 through the second signal path S2. The third point P3 of the second conductive part 1412 may be electrically connected to the third ground point G3 of the printed circuit board 340 through the third ground path GL3. The fourth point P4 of the second conductive part 1412 may be electrically connected to the fourth ground point G4 of the printed circuit board 340 through the fourth ground path GL4. The second conductive part 1412 may be electrically connected to the wireless communication module 192 through the second feeding point F2 and the second signal path S2, and perform the function of the second antenna 1420.

According to an embodiment, a third conductive part 1413 disposed on the lateral surface (e.g., the second lateral surface 302 of FIG. 3) in the x-axis direction of the lateral member 310 may include a fifth point P5, a sixth point P6, and a third feeding point F3. The fifth point P5 may be located more adjacent to the fourth segment part 404 than the sixth point P6. For example, the fourth segment part 404 may be located between the second conductive part 1312 and the third conductive part 1313. For example, the third feeding point F3 may be electrically connected to the wireless communication module 192 through the third signal path S3. The fifth point P5 of the third conductive part 1413 may be electrically connected to a fifth ground point G5 of the printed circuit board 340 through a fifth ground path GL5. The sixth point P6 of the third conductive part 1413 may be electrically connected to a sixth ground point G6 of the printed circuit board 340 through a sixth ground path GL6. The third conductive part 1413 may be electrically connected to the wireless communication module 192 through the third feeding point F3 and the third signal path S3, and perform the function of a third antenna 1430.

According to an embodiment, the first feeding point PF1 may receive the feeding signal transferred from the wireless communication module 192 in case of measuring the angle of arrival by using the first polarization (e.g., vertical polarization) signal with a first antenna 1410 including the first conductive part 1411. For example, the processor 120 may control the wireless communication module 192 to transfer the feeding signal to the first feeding point F1 of the first conductive part 1411, and measure the angle of arrival for the polarization (e.g., first polarization (vertical polarization)) signal in the first scan direction (the direction in parallel to the y axis and −y axis).

According to an embodiment, the second feeding point PF2 may receive the feeding signal transferred from the wireless communication module 192 in case of measuring the angle of arrival by using the third polarization (e.g., diagonal polarization) signal with the second antenna 1420 including the second conductive part 1412. For example, the processor 120 may control the wireless communication module 192 to transfer the feeding signal to the second feeding point F2 of the second conductive part 1412, and measure the angle of arrival for the third polarization (e.g., diagonal polarization) signal. In an embodiment, the second feeding point F2, which transmits and/or receives the third polarization (e.g., diagonal polarization) signal, may transmit and/or receive the first polarization (e.g., vertical polarization) signal and the second polarization (e.g., horizontal polarization) signal.

According to an embodiment, the second feeding point PF2 may receive the feeding signal transferred from the wireless communication module 192 in case of measuring the angle of arrival by using the second polarization (e.g., horizontal polarization) signal with the third antenna 1430 including the third conductive part 1413. For example, the processor 120 may control the wireless communication module 192 to transfer the feeding signal to the third feeding point F3 of the third conductive part 1413, and measure the angle of arrival for the polarization (e.g., second polarization (horizontal polarization) signal in the second scan direction (e.g., the direction in parallel to the x-axis direction and the −x-axis direction).

Figure 15:
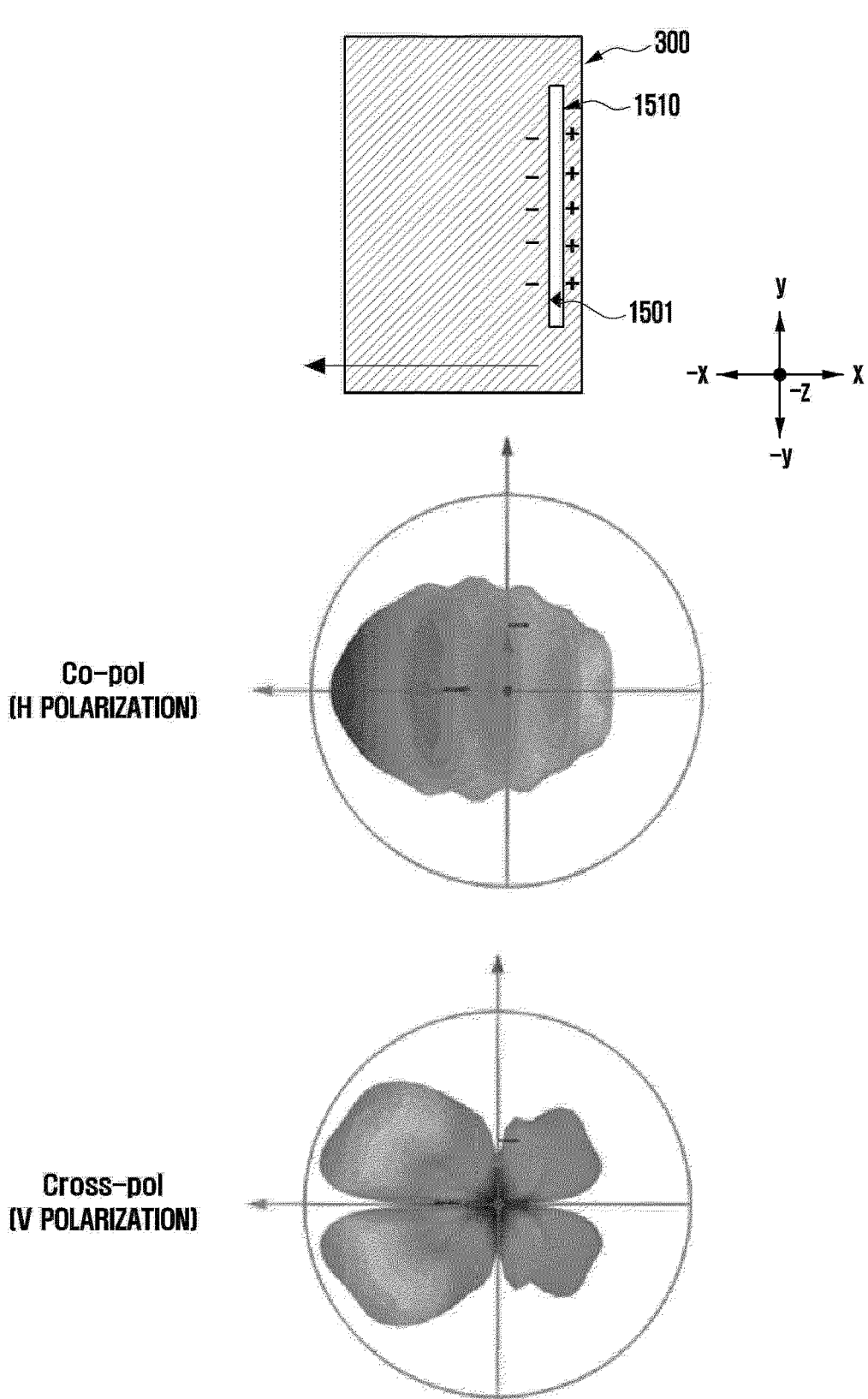
FIG. 15 is a diagram illustrating a comparative example for a horizontal polarization and a vertical polarization being measured by an electronic device including an antenna according to an embodiment of the disclosure.

FIG. 15 is a diagram illustrating a comparative example for a horizontal polarization and a vertical polarization being measured by an electronic device including an antenna according to an embodiment of the disclosure.

For example, FIG. 15 may be a drawing illustrating a comparative example of the first polarization (e.g., vertical polarization) signal and the second polarization (e.g., horizontal polarization) signal of the electronic device 300 disclosed in FIG. 11A. In an embodiment, FIG. 15 may illustrate an embodiment in which the first polarization (e.g., vertical polarization) signal and the second polarization (e.g., horizontal polarization) signal are measured in a state where a feeder point 1501 is located in the −y-axis direction.

Referring to FIG. 15, the electronic device 300 may form, for example, an antenna 1510 (e.g., a slot antenna) in a vertical direction (e.g., the y-axis direction and the −y-axis direction) being adjacent to the x-axis direction. The feeder point 1501 of the antenna 1510 may be located in the −y-axis direction (e.g., lower part) of the antenna 1510. The antenna 1510 may operate with a length of a half wavelength (λ/2). Referring to FIG. 15, the electronic device 300 may identify that the polarization characteristic for the horizontal direction (e.g., the −x-axis direction) is measured to be better than the polarization characteristic for the vertical direction (e.g., the y-axis direction).

Figure 16:
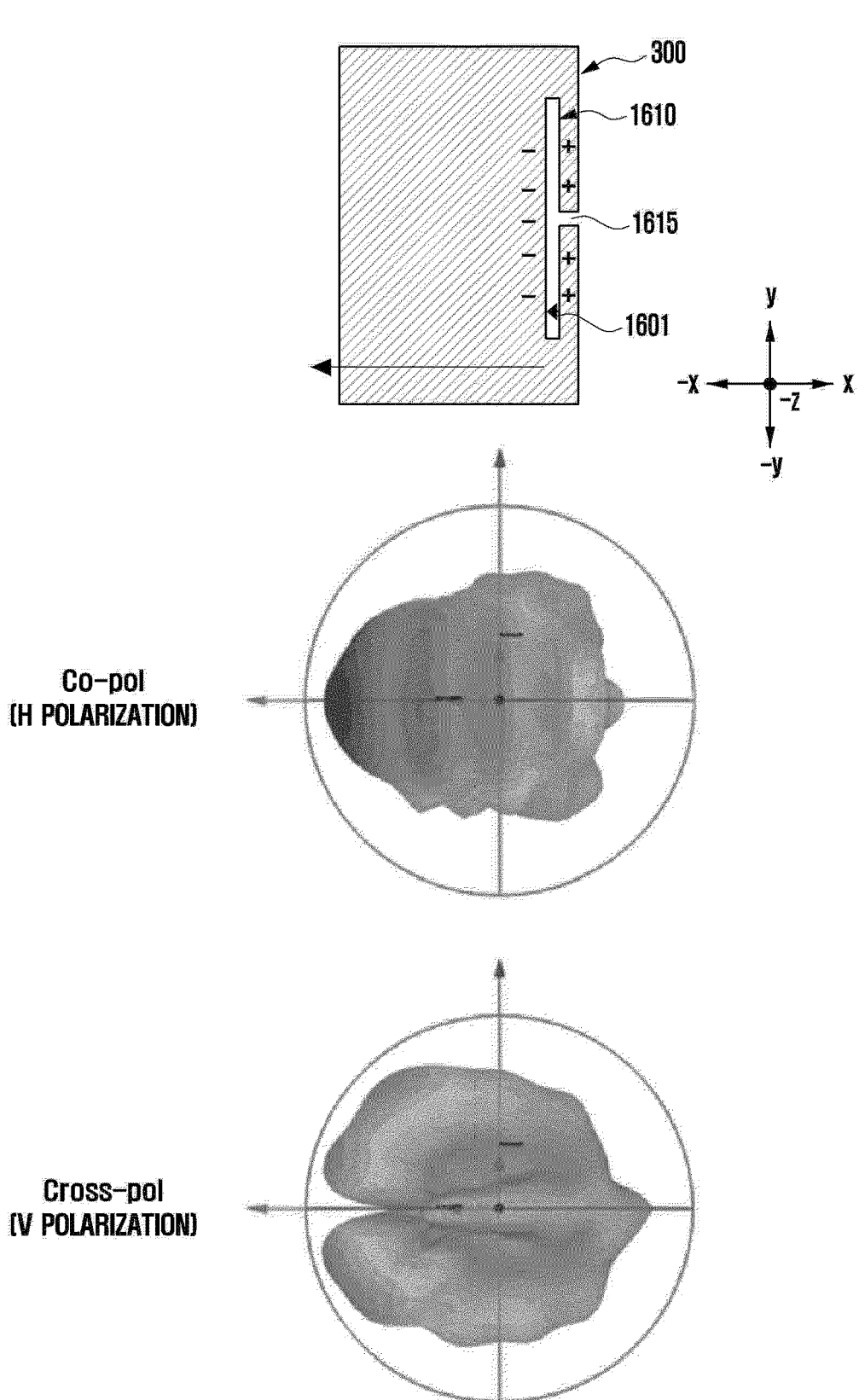
FIG. 16 is a diagram illustrating a comparative example for a horizontal polarization and a vertical polarization being measured by an electronic device including an antenna and a segment part according to an embodiment of the disclosure.

FIG. 16 is a diagram illustrating a comparative example for a horizontal polarization and a vertical polarization being measured by an electronic device including an antenna and a segment part according to an embodiment of the disclosure.

For example, FIG. 16 may be a drawing illustrating a comparative example of the first polarization (e.g., vertical polarization) signal and the second polarization (e.g., horizontal polarization) signal of the electronic device 300 disclosed in FIGS. 12 and 13. In an embodiment, FIG. 16 may illustrate an embodiment in which the first polarization (e.g., vertical polarization) signal and the second polarization (e.g., horizontal polarization) signal are measured through a constitution in which ground paths are formed with a segment part 1615 interposed therebetween as in FIGS. 12 and 13.

Referring to FIG. 16, the electronic device 300 may form, for example, an antenna 1610 in a vertical direction (e.g., the y-axis direction and the −y-axis direction) being adjacent to the x-axis direction. The antenna 1610 may include a segment part 1615. A feeder point 1601 of the antenna 1610 may be located in the −y-axis direction (e.g., lower part) of the antenna 1610. The antenna 1610 may operate with a length of a half wavelength (212). Referring to FIG. 16, the electronic device 300 may identify that the polarization characteristic for the horizontal direction (e.g., the −x-axis direction) is measured to be better than the polarization characteristic for the vertical direction (e.g., the y-axis direction).

Figure 17:
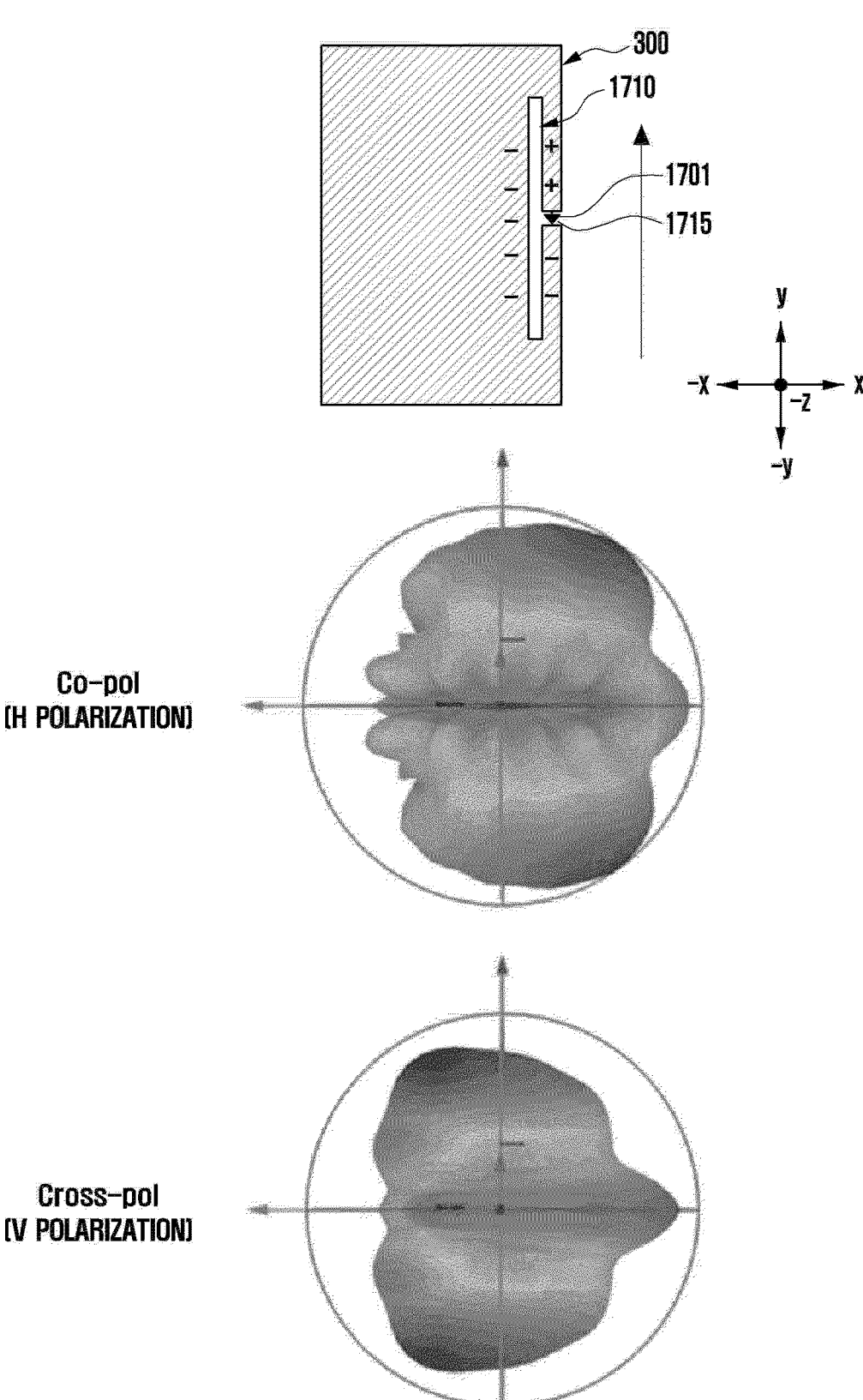
FIG. 17 is a diagram illustrating a comparative example for a horizontal polarization and a vertical polarization of an electronic device being measured by using a potential difference of an antenna including a segment part according to an embodiment of the disclosure.

FIG. 17 is a diagram illustrating a comparative example for a horizontal polarization and a vertical polarization of an electronic device being measured by using a potential difference of an antenna including a segment part according to an embodiment of the disclosure.

For example, FIG. 17 may illustrate an embodiment in which the first polarization (e.g., vertical polarization) signal and the second polarization (e.g., horizontal polarization) signal are measured in a state where a feeding point 1701 is located adjacent to a segment part 1715. In various embodiments, FIG. 17 may illustrate an embodiment in which the first polarization (e.g., vertical polarization) signal and the second polarization (e.g., horizontal polarization) signal are measured through a constitution in which the feeding point 1701 and ground paths are formed with the segment part 1715 interposed therebetween.

Referring to FIG. 17, the electronic device 300 may form, for example, an antenna 1710 in a vertical direction (e.g., the y-axis direction and the −y-axis direction) being adjacent to the x-axis direction. The antenna 1710 may include the segment part 1715. The feeding point 1701 of the antenna 1710 may be located adjacent to the segment part 1715. The antenna 1710 may operate with a length of a half wavelength (λ/2). If a feeding signal is received in the feeding point 1701, a potential difference (+, −) may occur in a conductive part adjacent to the segment part 1715 of the antenna 1710. Referring to FIG. 17, the electronic device 300 may identify that the polarization characteristic for the vertical direction (e.g., the y-axis direction) is measured to be better than the polarization characteristic for the horizontal direction (e.g., the −x-axis direction) by using the potential difference (+, −) occurring in the conductive part adjacent to the segment part 1715.

Figure 18:
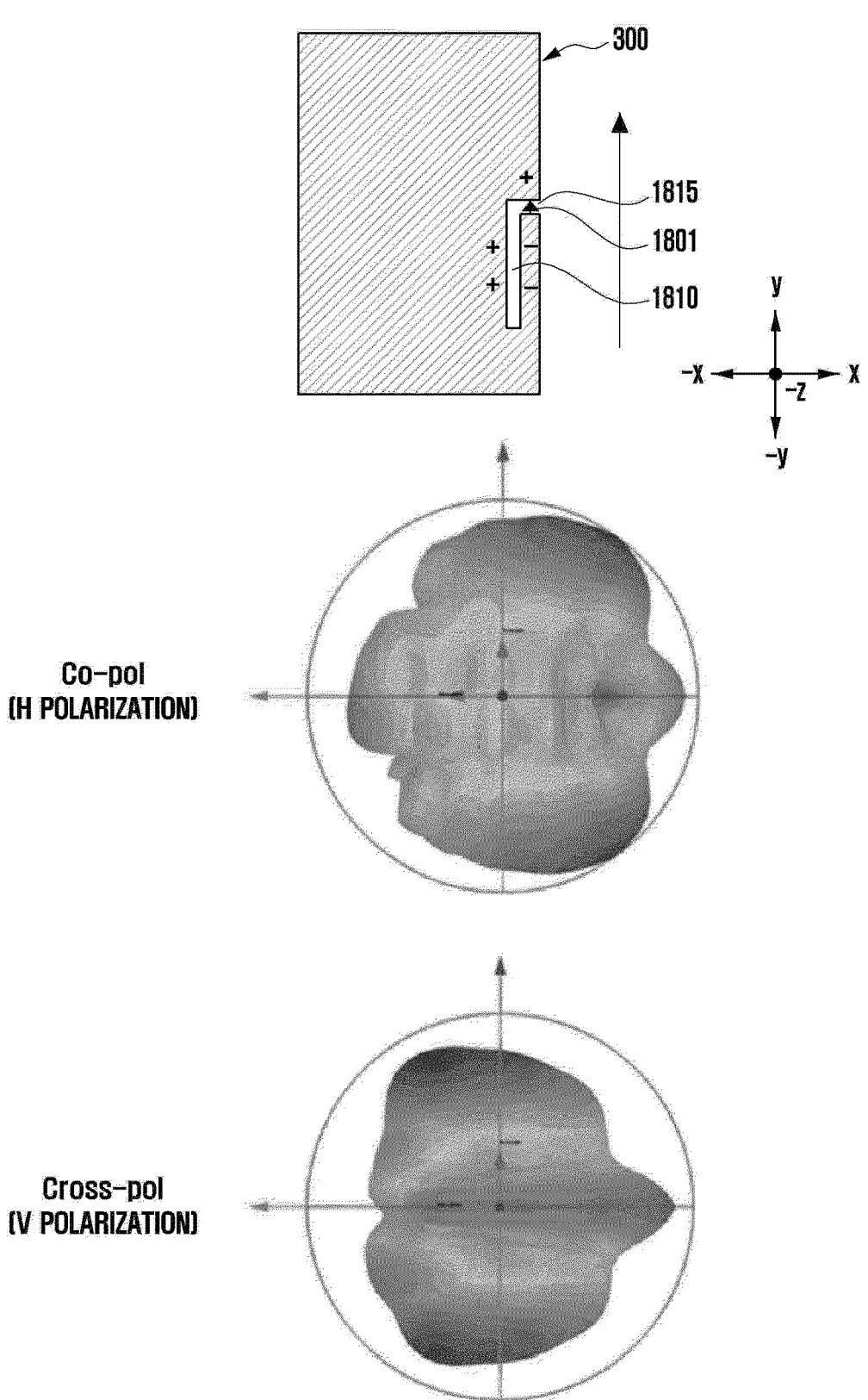
FIG. 18 is a diagram illustrating a comparative example for a horizontal polarization and a vertical polarization of an electronic device being measured in case that an antenna including a segment part operates with a λ/4 wavelength according to an embodiment of the disclosure.

FIG. 18 is a diagram illustrating a comparative example for a horizontal polarization and a vertical polarization of an electronic device being measured in case that an antenna including a segment part operates with a λ/4 wavelength according to an embodiment of the disclosure.

For example, FIG. 18 may illustrate an embodiment in which the first polarization (e.g., vertical polarization) signal and the second polarization (e.g., horizontal polarization) signal are measured in a state where the antenna operates with the λ/4 wavelength, and a feeder point 1801 is located adjacent to a segment part 1815. In various embodiments, FIG. 18 may illustrate an embodiment in which the first polarization (e.g., vertical polarization) signal and the second polarization (e.g., horizontal polarization) signal are measured through a constitution in which the feeder point 1801 and ground paths are formed with the segment part 1815 interposed therebetween.

Referring to FIG. 18, the electronic device 300 may form, for example, an antenna 1810 (e.g., an inverted F antenna (IFA)) in a vertical direction (e.g., the −y-axis direction) being adjacent to the x-axis direction. The antenna 1810 may include the segment part 1815. The feeder point 1801 of the antenna 1810 may be located adjacent to the segment part 1815. The antenna 1810 may operate, for example, with a length of λ/4 through an operation of a matching circuit. Referring to FIG. 18, the electronic device 300 may identify that the polarization characteristic for the vertical direction (e.g., the y-axis direction) is measured to be better than the polarization characteristic for the horizontal direction (e.g., the −x-axis direction).

Figure 19:
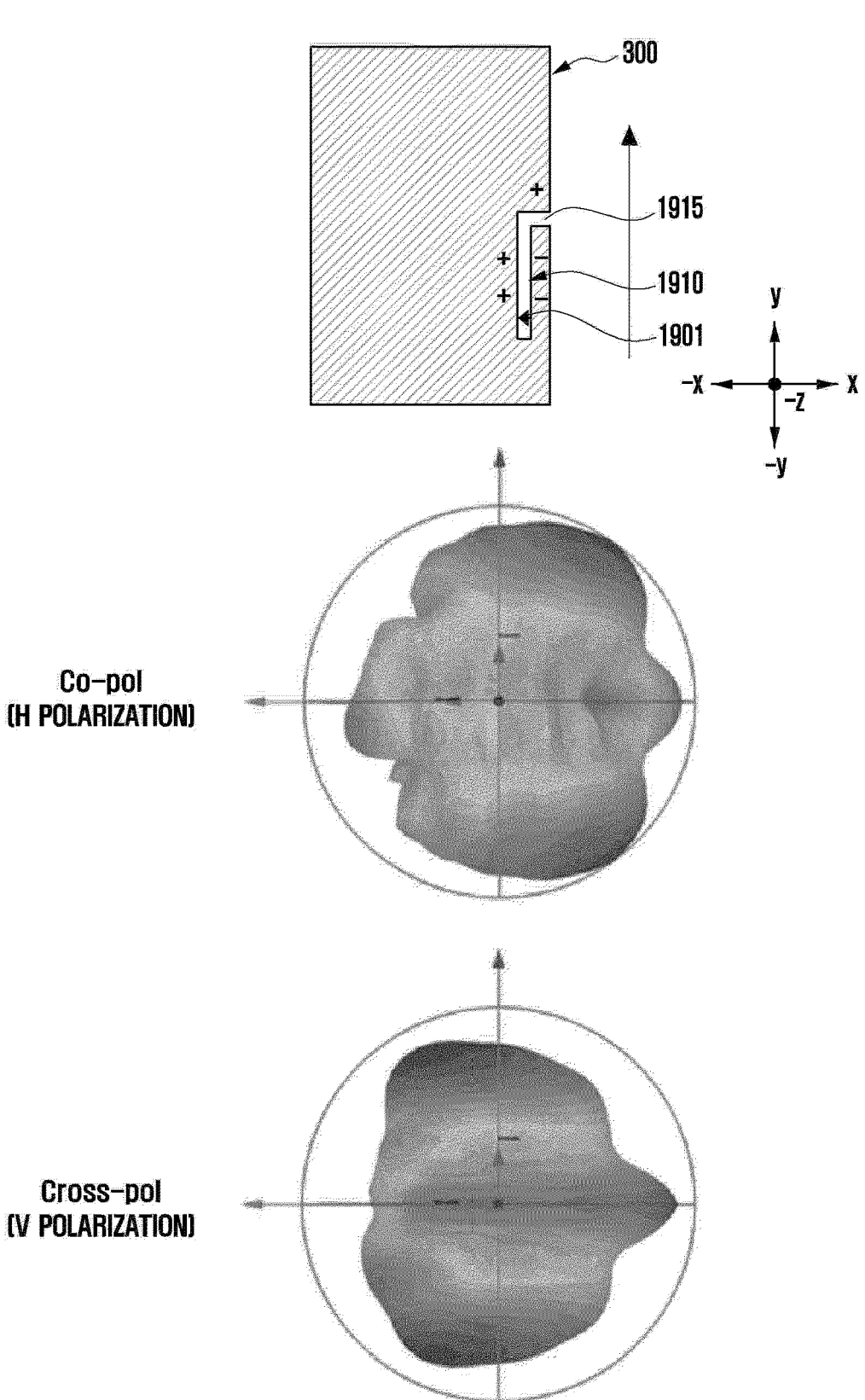
FIG. 19 is a diagram illustrating a comparative example for a horizontal polarization and a vertical polarization being measured by an electronic device in accordance with a location of a feeder point in case that an antenna including a segment part operates with a λ/4 wavelength according to an embodiment of the disclosure.

FIG. 19 is a diagram illustrating a comparative example for a horizontal polarization and a vertical polarization being measured by an electronic device in accordance with a location of a feeder point in case that an antenna including a segment part operates with a λ/4 wavelength according to an embodiment of the disclosure.

For example, FIG. 19 may illustrate an embodiment in which the first polarization (e.g., vertical polarization) signal and the second polarization (e.g., horizontal polarization) signal are measured in a state where the antenna operates with the λ/4 wavelength, and a feeder point 1901 is located in the −y-axis direction. In various embodiments, FIG. 19 may illustrate an embodiment in which the first polarization (e.g., vertical polarization) signal and the second polarization (e.g., horizontal polarization) signal are measured through a constitution in which the feeder point 1901 and ground paths are formed with segment part 1915 interposed therebetween. Referring to FIG. 19, the electronic device 300 may form, for example, an antenna 1910 (e.g., an inverted F antenna (IFA)) in a vertical direction (e.g., the −y-axis direction) being adjacent to the x-axis direction. The antenna 1910 may include the segment part 1915. The feeder point 1901 of the antenna 1910 may be located in the conductive part being far away from the segment part 1915. The antenna 1910 may operate, for example, with a length of λ/4 through an operation of a matching circuit. Referring to FIG. 19, the electronic device 300 may identify that the polarization characteristic for the vertical direction (e.g., the y-axis direction) is measured to be better than the polarization characteristic for the horizontal direction (e.g., the −x-axis direction).

Figure 20:
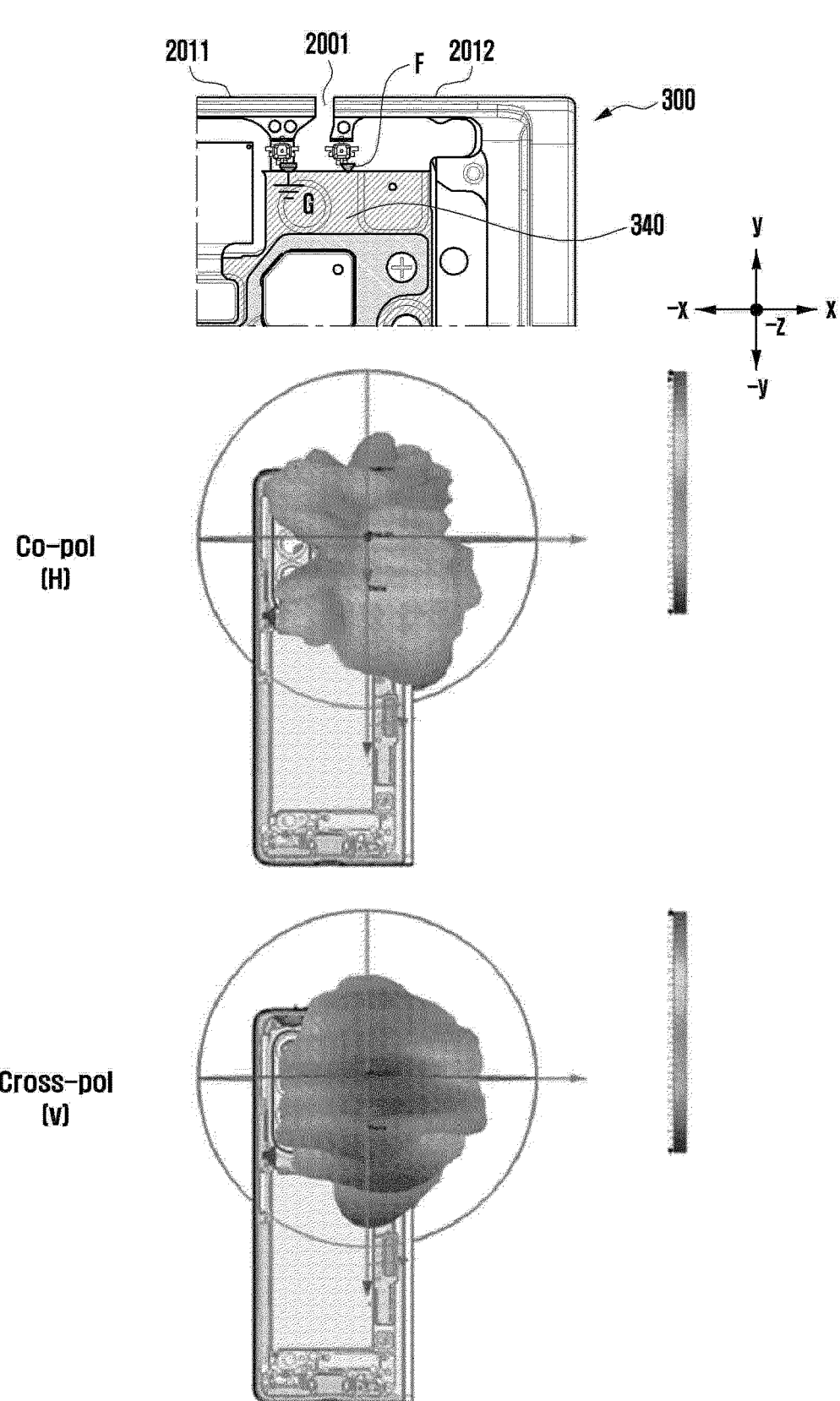
FIG. 20 is a diagram illustrating a comparative example for a horizontal polarization and a vertical polarization of an electronic device including a segment part according to an embodiment of the disclosure.

FIG. 20 is a diagram illustrating a comparative example for a horizontal polarization and a vertical polarization of an electronic device including a segment part according to an embodiment of the disclosure.

Referring to FIG. 20, the electronic device 300 may include a first conductive part 2011 (e.g., the first conductive part 1211 of FIG. 12) and a second conductive part 2012 (e.g., the second conductive part 1212 of FIG. 12) which are separated from each other through a segment part 2001 (e.g., the second segment part 402 of FIG. 12). The first conductive part 2011 may be electrically connected to the ground G of the printed circuit board 340 through a ground path (e.g., the first ground path GL1 of FIG. 12) or a connection member (e.g., a pad for contact, coupling member, C-clip, or conductive foam spring). The second conductive part 2012 may be electrically connected to the feeding point F and the wireless communication module 192 through a signal path (e.g., the first signal path S1 of FIG. 12). In an embodiment, for example, the structure of the antenna 1510, 1610, or 1710 disclosed in FIGS. 15 to 17 (e.g., slot antenna) may be constituted by using the first conductive part 2011, the second conductive part 2012, and the segment part 2001. Referring to FIG. 20, it can be identified that if the feeding signal is received from the wireless communication module 192 through the feeding point F, the vertical polarization is made by the antenna 1510, 1610, or 1710 in the direction that is orthogonal to the y axis (e.g., vertical axis). For example, the electronic device 300 may identify that the polarization characteristic for the vertical direction (e.g., the y-axis direction) is measured to be better than the polarization characteristic for the horizontal direction (e.g., the −x-axis direction).

Figure 21:
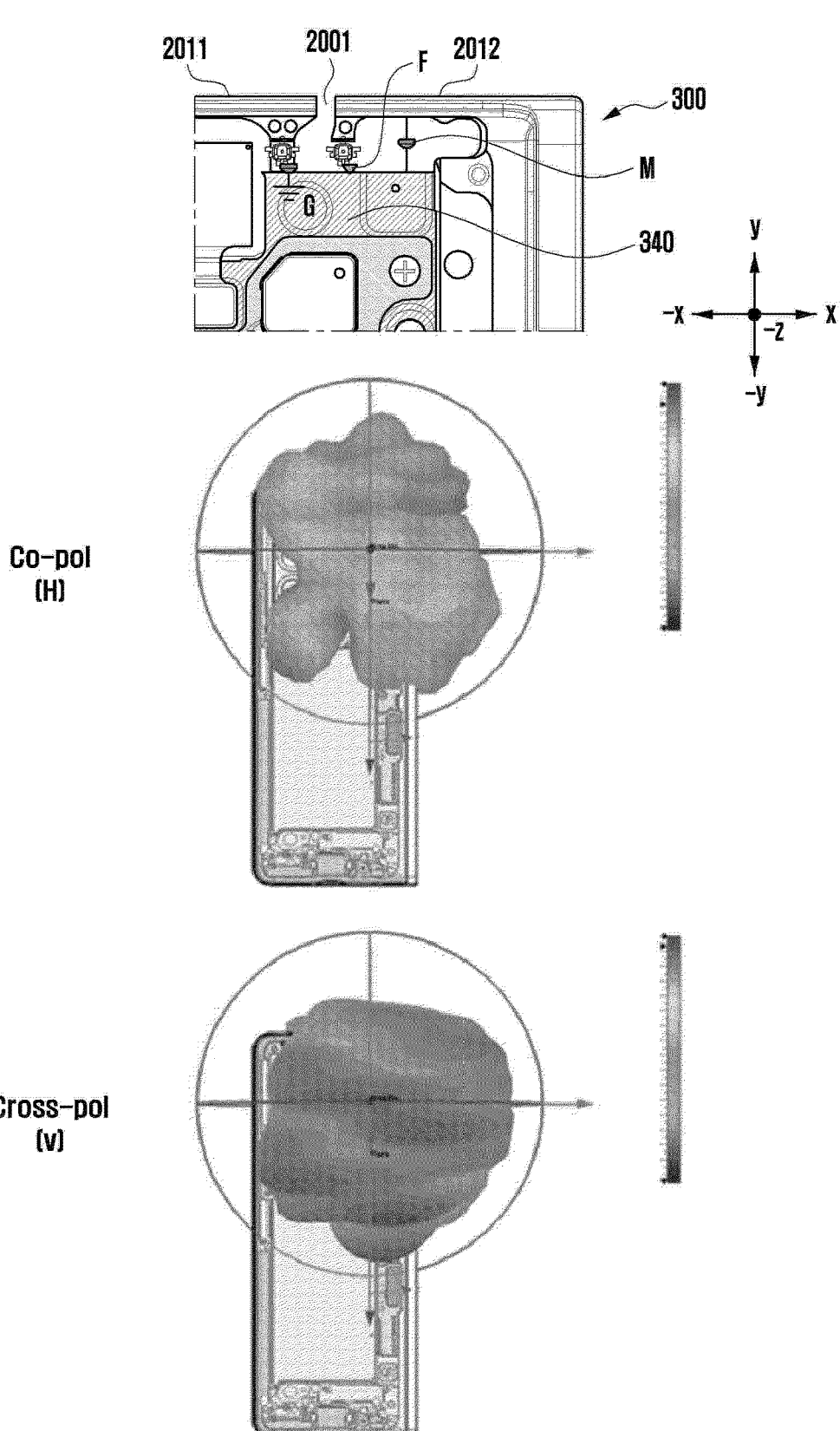
FIG. 21 is a diagram illustrating a comparative example for a horizontal polarization and a vertical polarization of an electronic device including a segment part and a first matching circuit according to an embodiment of the disclosure.

FIG. 21 is a diagram illustrating a comparative example for a horizontal polarization and a vertical polarization of an electronic device including a segment part and a first matching circuit according to an embodiment of the disclosure.

Referring to FIG. 21, the electronic device 300 may include a first conductive part 2011 (e.g., the first conductive part 1211 of FIG. 12) and a second conductive part 2012 (e.g., the second conductive part 1212 of FIG. 12) which are separated from each other through a segment part 2001 (e.g., the second segment part 402 of FIG. 12). The first conductive part 2011 may be electrically connected to the ground G of the printed circuit board 340 through a ground path (e.g., the first ground path GL1 of FIG. 12) or a connection member (e.g., a pad for contact, coupling member, C-clip, or conductive foam spring). The first point of the second conductive part 2012 may be electrically connected to the feeding point F through a signal path (e.g., the first signal path S1 of FIG. 12). The second point of the second conductive part 2012 may be electrically connected to the processor 120 disposed on the printed circuit board 340 through a matching circuit M (e.g., the second matching circuit M2 of FIG. 5A). In an embodiment, for example, the structure of the antenna 1810 or 1910 disclosed in FIGS. 18 and 19 (e.g., inverted F antenna (IFA)) may be constituted by using the first conductive part 2011, the second conductive part 2012, the segment part 2001, and the matching circuit M. The matching circuit M may include at least one switch or at least one lumped element, and control the polarization characteristic of the antenna 1810 or 1910. Referring to FIG. 21, the electronic device 300 may identify that the polarization characteristic for the vertical direction (e.g., the y-axis direction) is measured to be better than the polarization characteristic for the horizontal direction (e.g., the −x-axis direction). By controlling the polarization characteristic of the antenna 1810 or 1910 through the matching circuit M, it can be identified that the polarization characteristic of the horizontal polarization H measured in FIG. 21 appears to be better than the polarization characteristic of the horizontal polarization H measured in FIG. 20.

Figure 22:
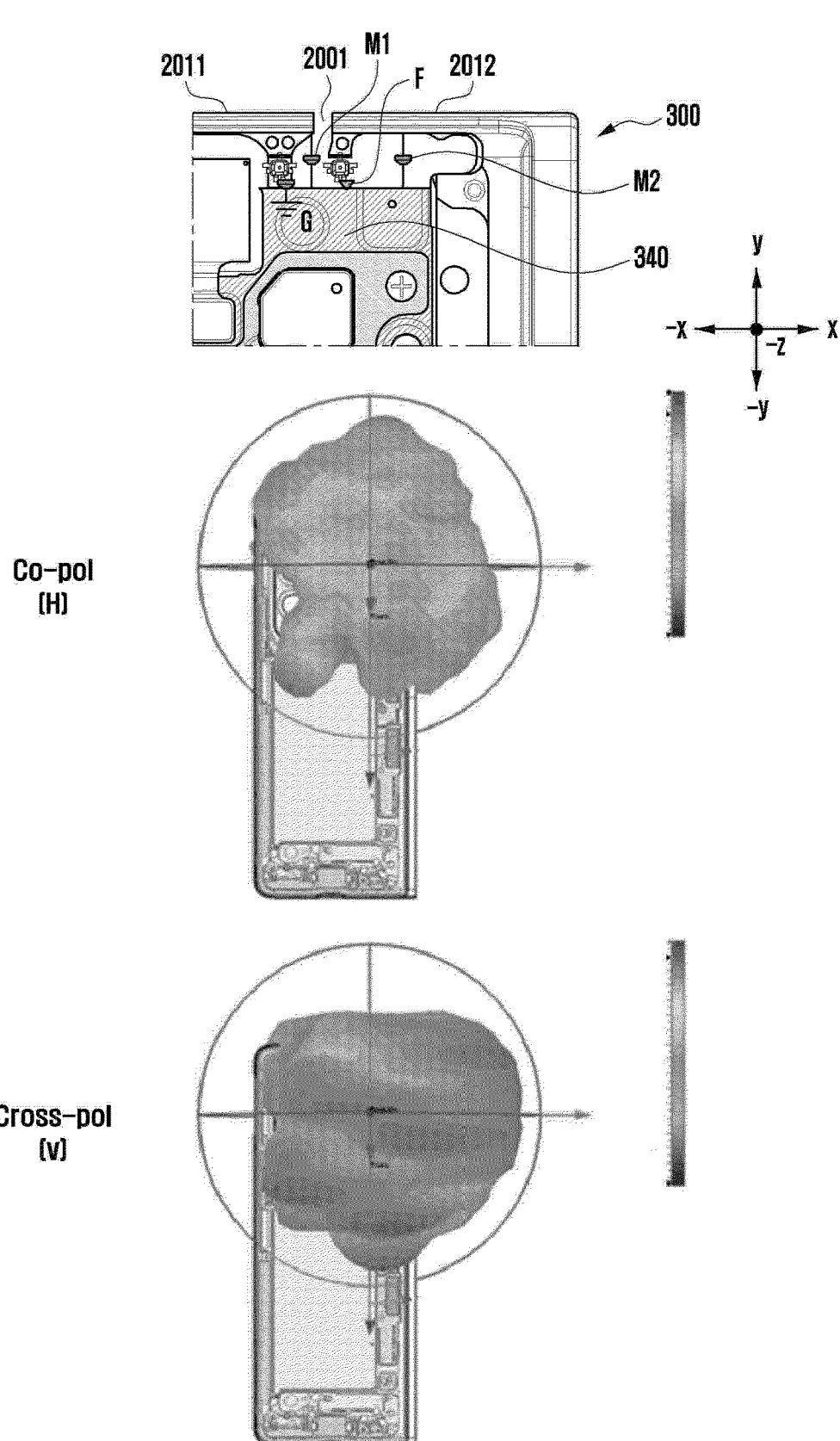
FIG. 22 is a diagram illustrating a comparative example for a horizontal polarization and a vertical polarization of an electronic device including a segment part, a first matching circuit, and a second matching circuit according to an embodiment of the disclosure.

FIG. 22 is a diagram illustrating a comparative example for a horizontal polarization and a vertical polarization of an electronic device including a segment part, a first matching circuit, and a second matching circuit according to an embodiment of the disclosure.

Referring to FIG. 22, the electronic device 300 may include a first conductive part 2011 (e.g., the first conductive part 1211 of FIG. 12) and a second conductive part 2012 (e.g., the second conductive part 1212 of FIG. 12) which are separated from each other through a segment part 2001 (e.g., the second segment part 402 of FIG. 12). The first point of the first conductive part 2011 may be electrically connected to the ground G of the printed circuit board 340 through a ground path (e.g., the first ground path GL1 of FIG. 12). The second point of the first conductive part 2011 may be electrically connected to the processor 120 disposed on the printed circuit board 340 through a first matching circuit (e.g., the first matching circuit M1 of FIG. 5A) The first point of the second conductive part 2012 may be electrically connected to the feeding point F through a signal path (e.g., the first signal path S1 of FIG. 12). The second point of the second conductive part 2012 may be electrically connected to the processor 120 disposed on the printed circuit board 340 through a second matching circuit M2 (e.g., the second matching circuit M2 of FIG. 5A). In an embodiment, for example, the structure of the antenna 1810 or 1910 disclosed in FIGS. 18 and 19 (e.g., inverted F antenna (IFA)) may be constituted by using the first conductive part 2011, the second conductive part 2012, the segment part 2001, the first matching circuit M1, and the second matching circuit M2. The first matching circuit M1 and/or the second matching circuit M2 may control the polarization characteristic of the antenna 1810 or 1910. With reference to FIG. 22, the electronic device 300 may identify that the polarization characteristic for the vertical direction (e.g., the y-axis direction) is measured to be better than the polarization characteristic for the horizontal direction (e.g., the −x-axis direction). By controlling the polarization characteristic of the antenna 1810 or 1910 through the first matching circuit M1 and the second matching circuit M2, it can be identified that the polarization characteristic of the horizontal polarization H measured in FIG. 22 appears to be better than the polarization characteristic of the horizontal polarization H measured in FIG. 20 or 21.

Figure 23:
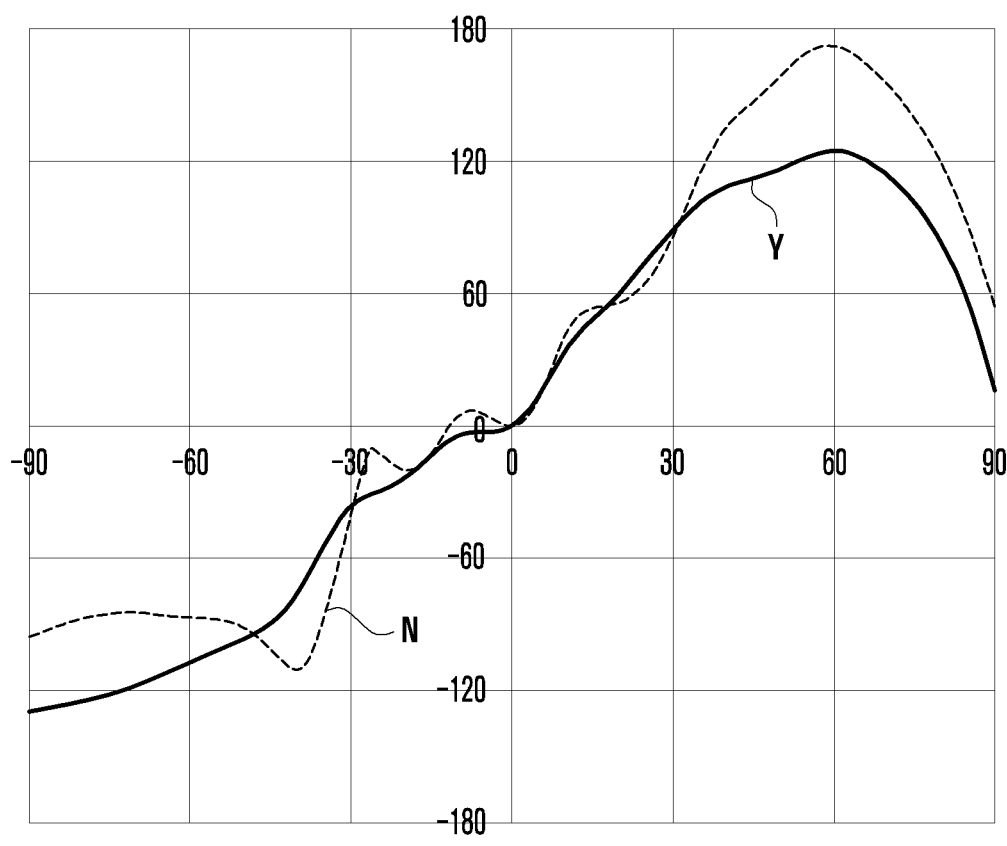
FIG. 23 is a diagram explaining comparison of the polarization characteristic using an antenna of an electronic device with the polarization characteristic using an antenna of an electronic device according to an embodiment of the disclosure.

FIG. 23 is a diagram explaining comparison of the polarization characteristic using an antenna of an electronic device with the polarization characteristic using an antenna of an electronic device according to an embodiment of the disclosure.

The electronic device 300 according to an embodiment of the disclosure may transmit and/or receive the first polarization (e.g., vertical polarization) signal of the patch antenna 400 and the first antenna 410 including the first conductive part 411, or may transmit and/or receive the second polarization (e.g., horizontal polarization) signal of the patch antenna 400 or the second antenna 420 including the second conductive part 412.

The electronic device according to the comparative embodiment may not transmit and/or receive the first polarization (e.g., vertical polarization) signal of the patch antenna 400 and the first antenna 410 including the first conductive part 411, or may not transmit and/or receive the second polarization (e.g., horizontal polarization) signal of the patch antenna 400 or the second antenna 420 including the second conductive part 412.

Referring to FIG. 23, for example, in case that the patch antenna 400 transmits and/or receives the second polarization (e.g., horizontal polarization) signal, and the second antenna 420 transmits and/or receives the first polarization (e.g., vertical polarization) signal, the electronic device according to the comparative embodiment may identify that an inversion phenomenon or wrapping phenomenon, in which the phase change occurs abruptly, occurs in about ±60° section as in the first graph N. For example, in case that the patch antenna 400 transmits and/or receives the second polarization (e.g., horizontal polarization) signal, and the second antenna 420 transmits and/or receives the second polarization (e.g., horizontal polarization) signal, the electronic device according to an embodiment of the disclosure does not occur in about ±60° section as in the second graph Y, and it is possible to transmit and/or receive a good second polarization (e.g., horizontal polarization) signal.

Figure 24:
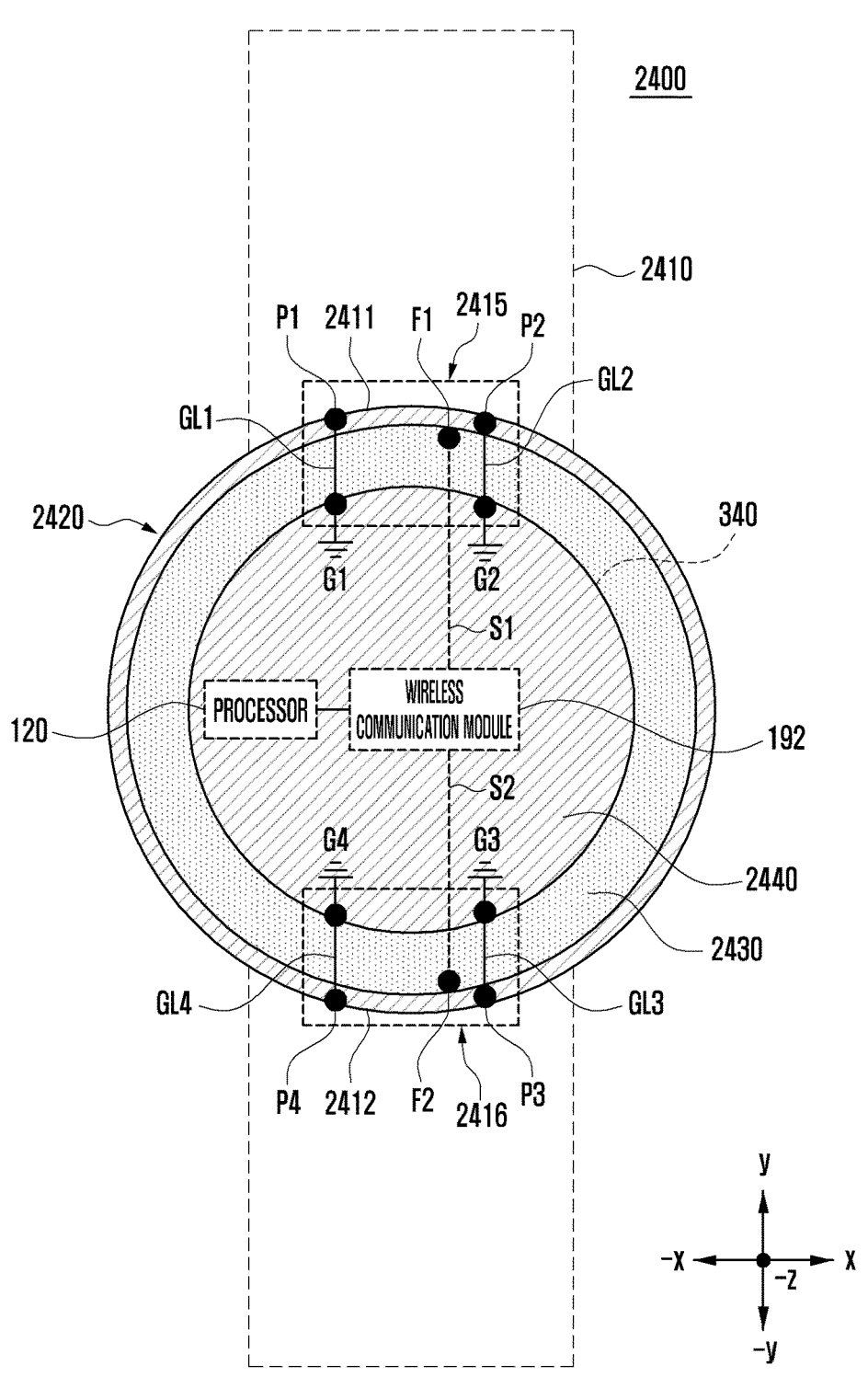
FIG. 24 is a diagram illustrating an embodiment in which an electronic device transmits and/or receives a polarization signal by using a first antenna and a second antenna according to an embodiment of the disclosure.

FIG. 24 is a diagram illustrating an embodiment in which an electronic device transmits and/or receives a polarization signal by using a first antenna and a second antenna according to an embodiment of the disclosure.

According to various embodiments, an electronic device 2400 disclosed below may include the embodiments of the electronic devices 101, 200, and 300 disclosed in FIGS. 1, 2A, 2B, 3, 4A, 4B, 5A, 5B, 6, 7A to 7C, 8A, 8B, 9A, 9B, 10, 11A, 11B, and 12 to 23. In describing the electronic device 2400 disclosed below, the same reference numerals may be given to the constituent elements substantially the same as those in the embodiments disclosed in FIGS. 1, 2A, 2B, 3, 4A, 4B, 5A, 5B, 6, 7A to 7C, 8A, 8B, 9A, 9B, 10, 11A, 11B, and 12 to 23, and duplicate explanation of their functions may be omitted.

In an embodiment, although it is illustrated that the electronic device 2400 disclosed below is in a circular shape, the shape of the electronic device 2400 is not limited thereto, and may include various shapes, such as a square, a quadrangle with rounded corners, or a rectangle.

Referring to FIG. 24, the electronic device 2400 according to various embodiments of the disclosure may include a wearable electronic device configured to be detachably attached to a user's body part (e.g., a wrist or ankle) by using a strap 2410.

According to an embodiment, the electronic device 2400 may include a housing 2420, a non-conductive part 2430, and/or a printed circuit board 340.

According to an embodiment, the housing 2420 may form at least a part of the exterior of the electronic device 2400 (e.g., watch). The housing 2420 may include a first point P1, a second point P2, a third point P3, a fourth point P4, a first feeding point F1, and/or a second feeding point F2. For example, the housing 2420 may be formed by a lateral bezel structure (e.g., the lateral member 310 of FIG. 3) including a metal and/or polymer.

According to an embodiment, the non-conductive part 2430 may be disposed inside the housing 2420. The non-conductive part 2430 may be formed along an inner periphery of the housing 2420, for example, in a circular shape.

According to an embodiment, the printed circuit board 340 may include a processor 120, a wireless communication module 192, and/or a ground 2440. In various embodiments, the ground 2440 may be disposed on a display (e.g., the display 330 of FIG. 3). For example, the ground 2440 may include a first ground point G1, a second ground point G2, a third ground point G3, and/or a fourth ground point G4.

According to an embodiment, the housing 2420 may include a first conductive part 2411 formed in the first direction (e.g., y-axis direction). For example, the first conductive part 2411 may include the first feeding point F1, the first point P1, and the second point P2. In an embodiment, the housing 2420 may include a second conductive part 2412 formed in the second direction (e.g., −y-axis direction). For example, the second conductive part 2412 may include the second feeding point F2, the third point P3, and the fourth point P4.

According to an embodiment, the first conductive part 2411 may be electrically connected to the wireless communication module 192 through the first feeding point F1 and the first signal path S1, and perform the function of a first antenna 2415. The first feeding point F1 may be located between the first point P1 and the second point P2. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the first conductive part 2411 of the housing 2420.

According to an embodiment, the second conductive part 2412 may be electrically connected to the wireless communication module 192 through the second feeding point F2 and the second signal path S2, and perform the function of a second antenna 2416. The second feeding point F2 may be located between the third point P3 and the fourth point P4. The third point P3 may be electrically connected to the third ground point G3 of the printed circuit board 340 through the third ground path GL3. The fourth point P4 may be electrically connected to the fourth ground point G4 of the printed circuit board 340 through the fourth ground path GL4. The third ground point G3 and the fourth ground point G4 may ground the second conductive part 2412 of the housing 2420.

According to an embodiment, the processor 120 may be electrically connected to the wireless communication module 192. The processor 120 may control the wireless communication module 192 to transfer the feeding signal to the first feeding point F1 of the first conductive part 2411 (e.g., the first antenna 2415) and the second feeding point F2 of the second conductive part 2412 (e.g., the second antenna 2416), and for example, measure the locations of other electronic devices (e.g., electronic devices 102 and 104 of FIG. 1) by measuring the angle of arrival for the first polarization (e.g., vertical polarization) signal.

Figure 25:
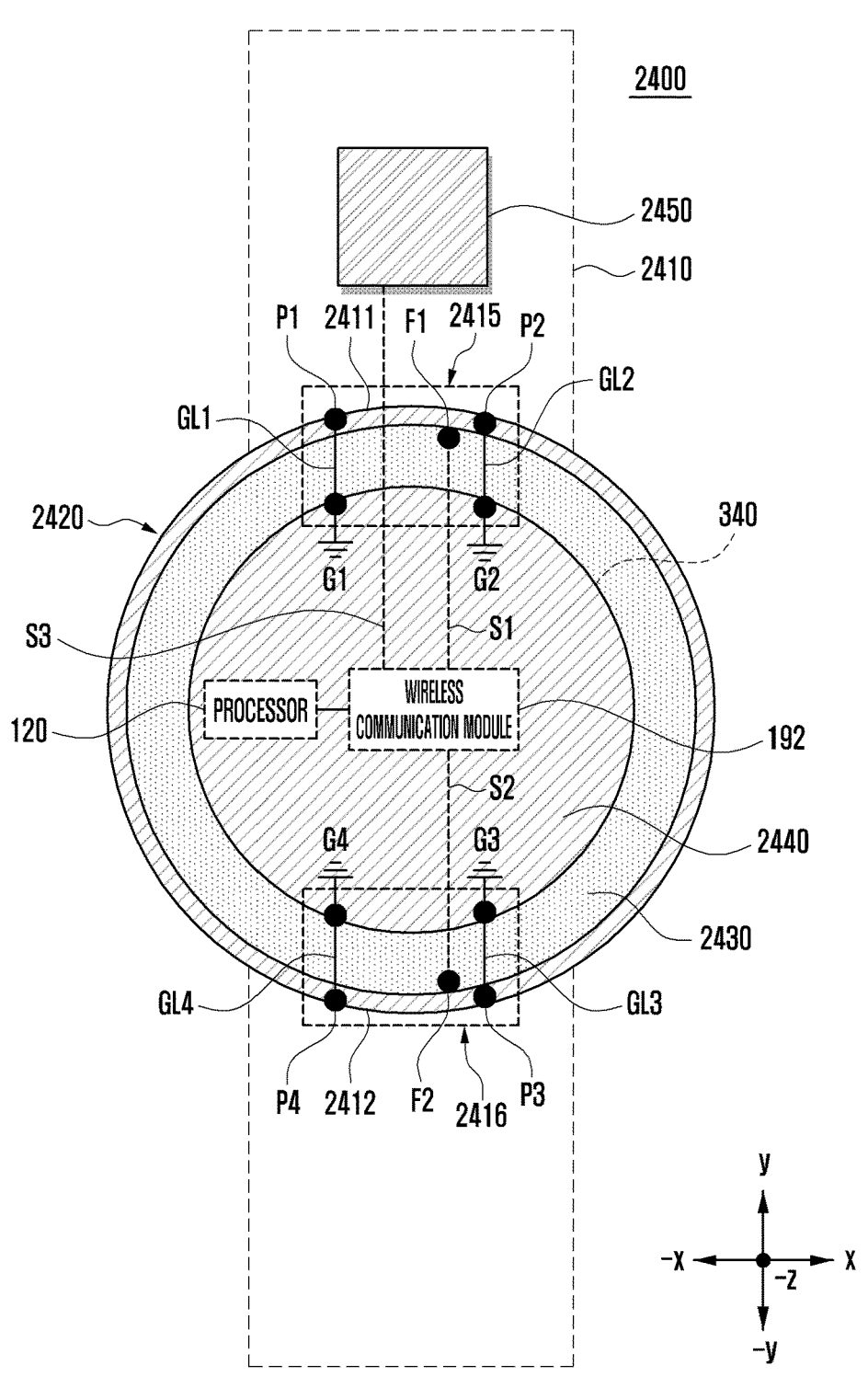
FIG. 25 is a diagram illustrating an embodiment in which an electronic device transmits and/or receives a polarization signal by using a first antenna, a second antenna, and a patch antenna according to an embodiment of the disclosure.

FIG. 25 is a diagram illustrating an embodiment in which an electronic device transmits and/or receives a polarization signal by using a first antenna, a second antenna, and a patch antenna according to an embodiment of the disclosure.

According to various embodiments, an electronic device 2400 disclosed in FIG. 25 may include the embodiments disclosed in FIG. 24. In describing the electronic device 2400 disclosed in FIG. 25, the same reference numerals may be given to the constituent elements substantially the same as those in the embodiments disclosed in FIG. 24, and duplicate explanation of their functions may be omitted.

According to an embodiment, the electronic device 2400 may include a strap 2410, a housing 2420, a non-conductive part 2430, a printed circuit board 340, and/or a patch antenna 2450.

According to an embodiment, the strap 2410 may be configured to detachably attach the electronic device 2400 to a user's body part (e.g., a wrist or ankle) by using a strap 2410. In an embodiment, the strap 2410 may include the patch antenna 2450. The strap 2410 may be formed of various materials and shapes. For example, the strap 2410 may be formed so that an all-in-one type or a plurality of unit links can be flexible by fabric, leather, rubber, urethane, metal, ceramic, silicone, fluorine rubber, plastic, or combinations of at least two of the above materials.

According to an embodiment, the electronic device 2400 disclosed in FIG. 25 may further include the patch antenna 2450 as compared with the embodiment of FIG. 24. The patch antenna 2450 may be electrically connected to the wireless communication module 192 through a third signal path S3. The patch antenna 2450 may receive the feeding signal through the wireless communication module 192. The patch antenna 2450 may operate together with a first antenna 2415 and a second antenna 2416.

According to an embodiment, the housing 2420 may include a first point P1, a second point P2, a third point P3, a fourth point P4, a first feeding point F1, and/or a second feeding point F2.

According to an embodiment, the non-conductive part 2430 may be disposed inside the housing 2420. The non-conductive part 2430 may be formed along an inner periphery of the housing 2420, for example, in a circular shape.

According to an embodiment, the printed circuit board 340 may include a processor 120, a wireless communication module 192, and/or a ground 2440. The ground 2440 may include a first ground point G1, a second ground point G2, a third ground point G3, and/or a fourth ground point G4.

According to an embodiment, the housing 2420 may include a first conductive part 2411 formed in the first direction (e.g., y-axis direction). For example, the first conductive part 2411 may include the first feeding point F1, the first point P1, and the second point P2. The housing 2420 may include a second conductive part 2412 formed in the second direction (e.g., −y-axis direction). The second conductive part 2412 may include the second feeding point F2, the third point P3, and the fourth point P4.

According to an embodiment, the first feeding point F1 may be electrically connected to the wireless communication module 192 through the first signal path S1, and perform the function of a first antenna 2415. The first feeding point F1 may be located between the first point P1 and the second point P2. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the first conductive part 2411 of the housing 2420. The first conductive part 2411 of the housing 2420 may operate as the first antenna 2415.

According to an embodiment, the second feeding point F2 may be electrically connected to the wireless communication module 192 through the second signal path S2, and perform the function of the second antenna 2416. The second feeding point F2 may be located between the third point P3 and the fourth point P4. The third point P3 may be electrically connected to the third ground point G3 of the printed circuit board 340 through the third ground path GL3. The fourth point P4 may be electrically connected to the fourth ground point G4 of the printed circuit board 340 through the fourth ground path GL4. The third ground point G3 and the fourth ground point G4 may ground the second conductive part 2412 of the housing 2420. The second conductive part 2412 of the housing 2420 may operate as the second antenna 2416.

According to an embodiment, the processor 120 may be electrically connected to the wireless communication module 192. The processor 120 may control the wireless communication module 192 to transfer the feeding signal to the first feeding point F1 of the first conductive part 2411 (e.g., the first antenna 2415), the second feeding point F2 of the second conductive part 2412 (e.g., the second antenna 2416), and/or the patch antenna 2450, and for example, expand an area for the first polarization (e.g., vertical polarization) signal.

According to various embodiments, the electronic device 2400 may transmit and/or receive the second polarization (e.g., horizontal polarization) signal that partially overlaps the first polarization (e.g., vertical polarization) signal through the patch antenna 2450, the first antenna 2415 including the first conductive part 2411, and the second antenna 1416 including the second conductive part 2412.

Figure 26:
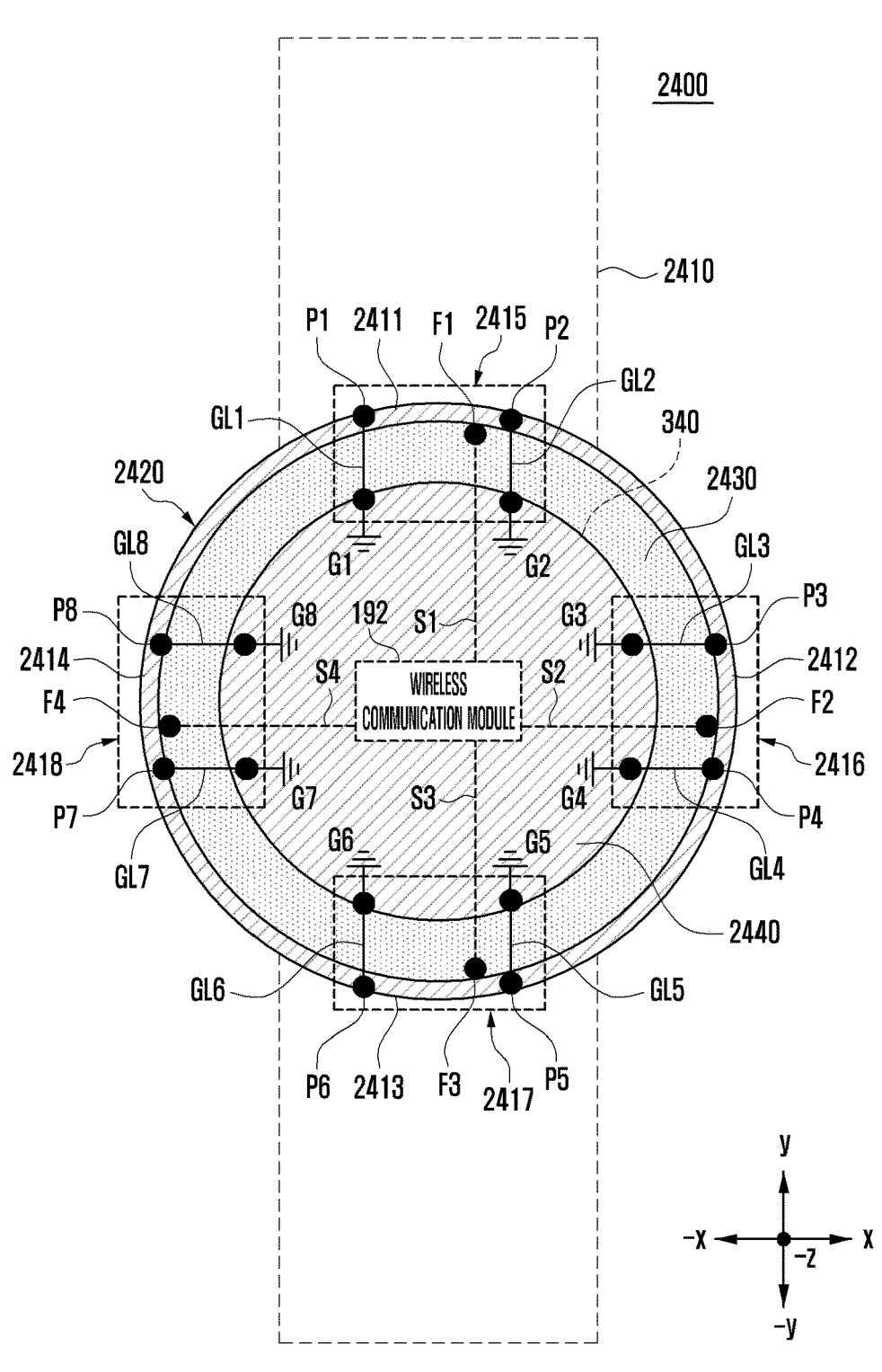
FIG. 26 is a diagram illustrating an embodiment in which an electronic device transmits and/or receives a polarization signal by using a first antenna, a second antenna, a third antenna, and a fourth antenna according to an embodiment of the disclosure.

FIG. 26 is a diagram illustrating an embodiment in which an electronic device transmits and/or receives a polarization signal by using a first antenna, a second antenna, a third antenna, and a fourth antenna according to an embodiment of the disclosure.

According to various embodiments, an electronic device 2400 disclosed below may include the embodiments disclosed in FIGS. 24 and 25. In describing the electronic device 2400 disclosed below, the same reference numerals may be given to the constituent elements substantially the same as those in the embodiments disclosed in FIGS. 24 and 25, and duplicate explanation of their functions may be omitted.

Referring to FIG. 26, the electronic device 2400 according to various embodiments of the disclosure may include a housing 2420, a non-conductive part 2430, and/or a printed circuit board 340.

According to an embodiment, the housing 2420 may include a first point P1, a second point P2, a third point P3, a fourth point P4, a fifth point P5, a sixth point P6, a seventh point P7, an eighth point P8, a first feeding point F1, a second feeding point F2, a third feeding point F3, and/or a fourth feeding point F4.

According to an embodiment, the printed circuit board 340 may include a processor 120, a wireless communication module 192, and/or a ground 2440. The ground 2440 may include a first ground point G1, a second ground point G2, a third ground point G3, a fourth ground point G4, a fifth ground point G5, a sixth ground point G6, a seventh ground point G7, and/or an eighth ground point G8.

According to an embodiment, the housing 2420 may include a first conductive part 2411 in the first direction (e.g., y-axis direction). For example, the first conductive part 2411 may include the first feeding point F1, the first point P1, and the second point P2. The housing 2420 may include a second conductive part 2412 formed in the second direction (e.g., x-axis direction). For example, the second conductive part 2412 may include the second feeding point F2, the third point P3, and the fourth point P4. The housing 2420 may include a third conductive part 2413 in the third direction (e.g., −y-axis direction). For example, the third conductive part 2413 may include the third feeding point F3, the fifth point P5, and the sixth point P6. The housing 2420 may include a fourth conductive part 2414 in the fourth direction (e.g., x-axis direction). For example, the fourth conductive part 2414 may include the fourth feeding point F4, the seventh point P7, and the eighth point P8.

According to an embodiment, the first feeding point F1 of the first conductive part 2411 may be electrically connected to the wireless communication module 192 through the first signal path S1, and perform the function of a first antenna 2415. The first feeding point F1 may be located between the first point P1 and the second point P2. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the first conductive part 2411 of the housing 2420.

According to an embodiment, the second feeding point F2 of the second conductive part 2412 may be electrically connected to the wireless communication module 192 through the second signal path S2, and perform the function of the second antenna 2416. The second feeding point F2 may be located between the third point P3 and the fourth point P4. The third point P3 may be electrically connected to the third ground point G3 of the printed circuit board 340 through the third ground path GL3. The fourth point P4 may be electrically connected to the fourth ground point G4 of the printed circuit board 340 through the fourth ground path GL4. The third ground point G3 and the fourth ground point G4 may ground the second conductive part 2412 of the housing 2420.

According to an embodiment, the third feeding point F3 of the third conductive part 2413 may be electrically connected to the wireless communication module 192 through the third signal path S3, and perform the function of a third antenna 2417. The third feeding point F3 may be located between the fifth point P5 and the sixth point P6. The fifth point P5 may be electrically connected to the fifth ground point G5 of the printed circuit board 340 through the fifth ground path GL5. The sixth point P6 may be electrically connected to the sixth ground point G6 of the printed circuit board 340 through the sixth ground path GL6. The fifth ground point G5 and the sixth ground point G6 may ground the third conductive part 2413 of the housing 2420.

According to an embodiment, the fourth feeding point F4 of the fourth conductive part 2414 may be electrically connected to the wireless communication module 192 through the fourth signal path S4, and perform the function of a fourth antenna 2418. The fourth feeding point F4 may be located between the seventh point P7 and the eighth point P8. The seventh point P7 may be electrically connected to the seventh ground point G7 of the printed circuit board 340 through a seventh ground path GL7. The eighth point P8 may be electrically connected to the eighth ground point G8 of the printed circuit board 340 through an eighth ground path GL8. The seventh ground point G7 and the eighth ground point G8 may ground the fourth conductive part 2414 of the housing 2420.

According to an embodiment, the processor 120 may be electrically connected to the wireless communication module 192. The processor 120 may control the wireless communication module 192 to transfer the feeding signal to the first feeding point F1 of the first conductive part 2411 (e.g., the first antenna 2415) and the third feeding point F3 of the third conductive part 2413 (e.g., third antenna 2417), and for example, measure the angle of arrival for the first polarization (e.g., vertical polarization) signal, and measure the locations of other electronic devices (e.g., electronic devices 102 and 104 of FIG. 1). For example, the processor 120 may control the wireless communication module 192 to transfer the feeding signal to the second feeding point F2 of the second conductive part 2412 (e.g., the second antenna 2416) and the fourth feeding point F4 of the fourth conductive part 2414 (e.g., fourth antenna 2418), and for example, measure the angle of arrival for the second polarization (e.g., horizontal polarization) signal, and measure the locations of other electronic devices (e.g., electronic devices 102 and 104 of FIG. 1).

Figure 27:
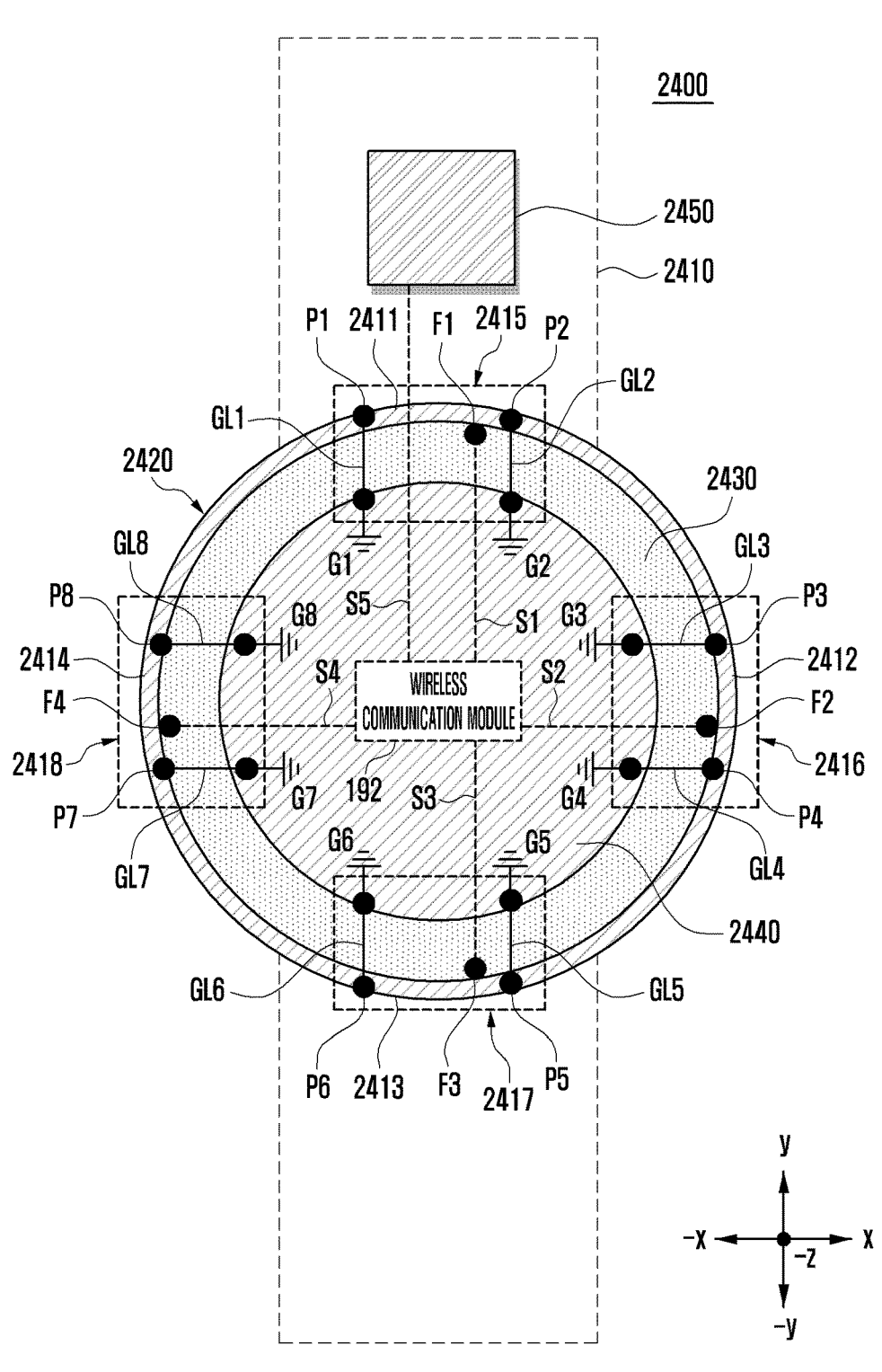
FIG. 27 is a diagram illustrating an embodiment in which an electronic device transmits and/or receives a polarization signal by using first to fourth antennas, and a patch antenna according to an embodiment of the disclosure.

FIG. 27 is a diagram illustrating an embodiment in which an electronic device transmits and/or receives a polarization signal by using first to fourth antennas, and a patch antenna according to an embodiment of the disclosure.

According to various embodiments, an electronic device 2400 disclosed in FIG. 27 may include the embodiments disclosed in FIG. 26. In describing the electronic device 2400 disclosed in FIG. 27, the same reference numerals may be given to the constituent elements substantially the same as those in the embodiments disclosed in FIG. 26, and duplicate explanation of their functions may be omitted.

Referring to FIG. 27, the electronic device 2400 may include a housing 2420, a non-conductive part 2430, a printed circuit board 340, and/or a patch antenna 2450.

According to an embodiment, the electronic device 2400 disclosed in FIG. 27 may further include the patch antenna 2450 as compared with the embodiment of FIG. 26. The patch antenna 2450 may be electrically connected to the wireless communication module 192 through a fifth signal path S5. The patch antenna 2450 may receive the feeding signal through the wireless communication module 192. The first antenna 2415 and the third antenna 2417 may expand the transmission and/or reception areas of the first polarization (e.g., vertical polarization) signal by using the patch antenna 2450. The second antenna 2416 and the fourth antenna 2418 may expand the transmission and/or reception areas of the second polarization (e.g., horizontal polarization) signal by using the patch antenna 2450.

According to various embodiments, the patch antenna 2450 may include at least one feeder point. The at least one feeder point of the patch antenna 2450 may be electrically connected to the wireless communication module 192 through a fifth signal path S5. For example, the at least one feeder point of the patch antenna 2450 may be located at corners in the –y-axis direction, –x-axis direction, or –x-axis direction or –y-axis direction.

According to an embodiment, the housing 2420 may include a first point P1, a second point P2, a third point P3, a fourth point P4, a fifth point P5, a sixth point P6, a seventh point P7, an eighth point P8, a first feeding point F1, a second feeding point F2, a third feeding point F3, and/or a fourth feeding point F4.

According to an embodiment, the printed circuit board 340 may include a processor 120, a wireless communication module 192, and/or a ground 2440. The ground 2440 may include a first ground point G1, a second ground point G2, a third ground point G3, a fourth ground point G4, a fifth ground point G5, a sixth ground point G6, a seventh ground point G7, and/or an eighth ground point G8.

According to an embodiment, the housing 2420 may include a first conductive part 2411 in the first direction (e.g., y-axis direction). For example, the first conductive part 2411 may include the first feeding point F1, the first point P1, and the second point P2. The housing 2420 may include a second conductive part 2412 formed in the second direction (e.g., x-axis direction). The second conductive part 2412 may include the second feeding point F2, the third point P3, and the fourth point P4. The housing 2420 may include a third conductive part 2413 in the third direction (e.g., –y-axis direction). The third conductive part 2413 may include the third feeding point F3, the fifth point P5, and the sixth point P6. The housing 2420 may include a fourth conductive part 2414 in the fourth direction (e.g., x-axis direction). For example, the fourth conductive part 2414 may include the fourth feeding point F4, the seventh point P7, and the eighth point P8.

According to an embodiment, the first feeding point F1 of the first conductive part 2411 may be electrically connected to the wireless communication module 192 through the first signal path S1, and perform the function of a first antenna 2415. The first feeding point F1 may be located between the first point P1 and the second point P2. The first point P1 may be electrically connected to the first ground point G1 of the printed circuit board 340 through the first ground path GL1. The second point P2 may be electrically connected to the second ground point G2 of the printed circuit board 340 through the second ground path GL2. The first ground point G1 and the second ground point G2 may ground the first conductive part 2411 of the housing 2420.

According to an embodiment, the second feeding point F2 of the second conductive part 2412 may be electrically connected to the wireless communication module 192 through the second signal path S2, and perform the function of the second antenna 2416. The second feeding point F2 may be located between the third point P3 and the fourth point P4. The third point P3 may be electrically connected to the third ground point G3 of the printed circuit board 340 through the third ground path GL3. The fourth point P4 may be electrically connected to the fourth ground point G4 of the printed circuit board 340 through the fourth ground path GL4. The third ground point G3 and the fourth ground point G4 may ground the second conductive part 2412 of the housing 2420.

According to an embodiment, the third feeding point F3 of the third conductive part 2413 may be electrically connected to the wireless communication module 192 through the third signal path S3, and perform the function of the third antenna 2417. The third feeding point F3 may be located between the fifth point P5 and the sixth point P6. The fifth point P5 may be electrically connected to the fifth ground point G5 of the printed circuit board 340 through the fifth ground path GL5. The sixth point P6 may be electrically connected to the sixth ground point G6 of the printed circuit board 340 through the sixth ground path GL6. The fifth ground point G5 and the sixth ground point G6 may ground the third conductive part 2413 of the housing 2420.

According to an embodiment, the fourth feeding point F4 of the fourth conductive part 2414 may be electrically connected to the wireless communication module 192 through the fourth signal path S4, and perform the function of the fourth antenna 2418. The fourth feeding point F4 may be located between the seventh point P7 and the eighth point P8. The seventh point P7 may be electrically connected to the seventh ground point G7 of the printed circuit board 340 through the seventh ground path GL7. The eighth point P8 may be electrically connected to the eighth ground point G8 of the printed circuit board 340 through the eighth ground path GL8. The seventh ground point G7 and the eighth ground point G8 may ground the fourth conductive part 2414 of the housing 2420.

According to an embodiment, the processor 120 may be electrically connected to the wireless communication module 192. The processor 120 may control the wireless communication module 192 to transfer the feeding signal to the first feeding point F1 of the first conductive part 2411 (e.g., the first antenna 2415), the third feeding point F3 of the third conductive part 2413 (e.g., third antenna 2417), and the patch antenna 2450, and for example, measure the angle of arrival for the first polarization (e.g., vertical polarization) signal. For example, the processor 120 may control the wireless communication module 192 to transfer the feeding signal to the second feeding point F2 of the second conductive part 2412 (e.g., the second antenna 2416), the fourth feeding point F4 of the fourth conductive part 2414 (e.g., fourth antenna 2418), and the patch antenna 2450, and for example, measure the angle of arrival for the second polarization (e.g., horizontal polarization) signal.

According to various embodiments, the electronic device 2400 may transmit and/or receive the second polarization (e.g., horizontal polarization) signal that partially overlaps the first polarization (e.g., vertical polarization) signal through the patch antenna 2450, the first antenna 2415, and the third antenna 2417. The electronic device 2400 may transmit and/or receive the first polarization (e.g., vertical polarization) signal that partially overlaps the second polarization (e.g., horizontal polarization) signal through the patch antenna 2450, the second antenna 2416, and the fourth antenna 2418.

Figure 28A:
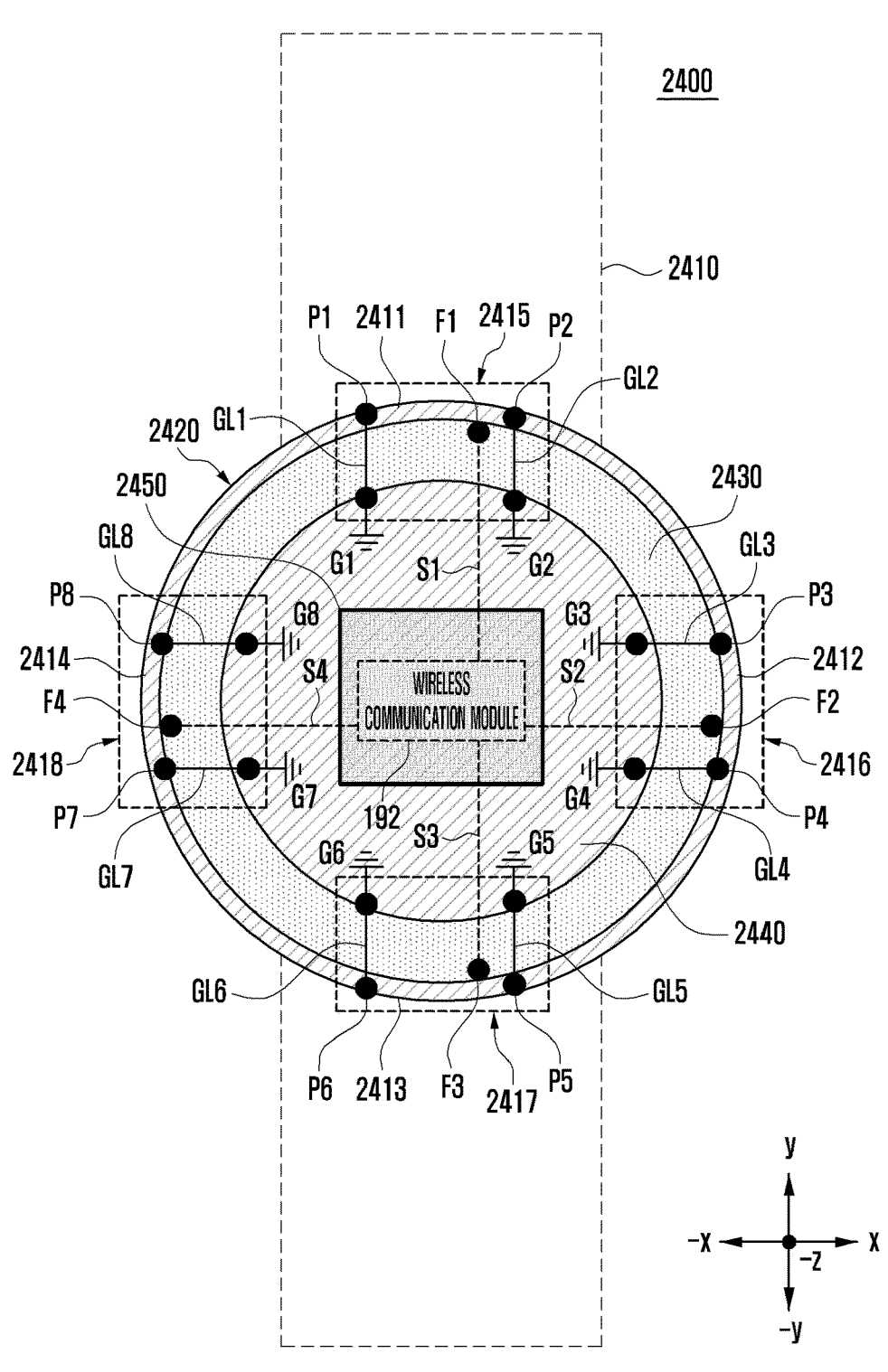
FIG. 28A is a diagram illustrating an embodiment in which a patch antenna of an electronic device is disposed on one surface (e.g., rear surface) of a ground of a display according to an embodiment of the disclosure.

FIG. 28A is a diagram illustrating an embodiment in which a patch antenna of an electronic device is disposed on one surface (e.g., rear surface) of a ground of a display according to an embodiment of the disclosure.

Figure 28B:
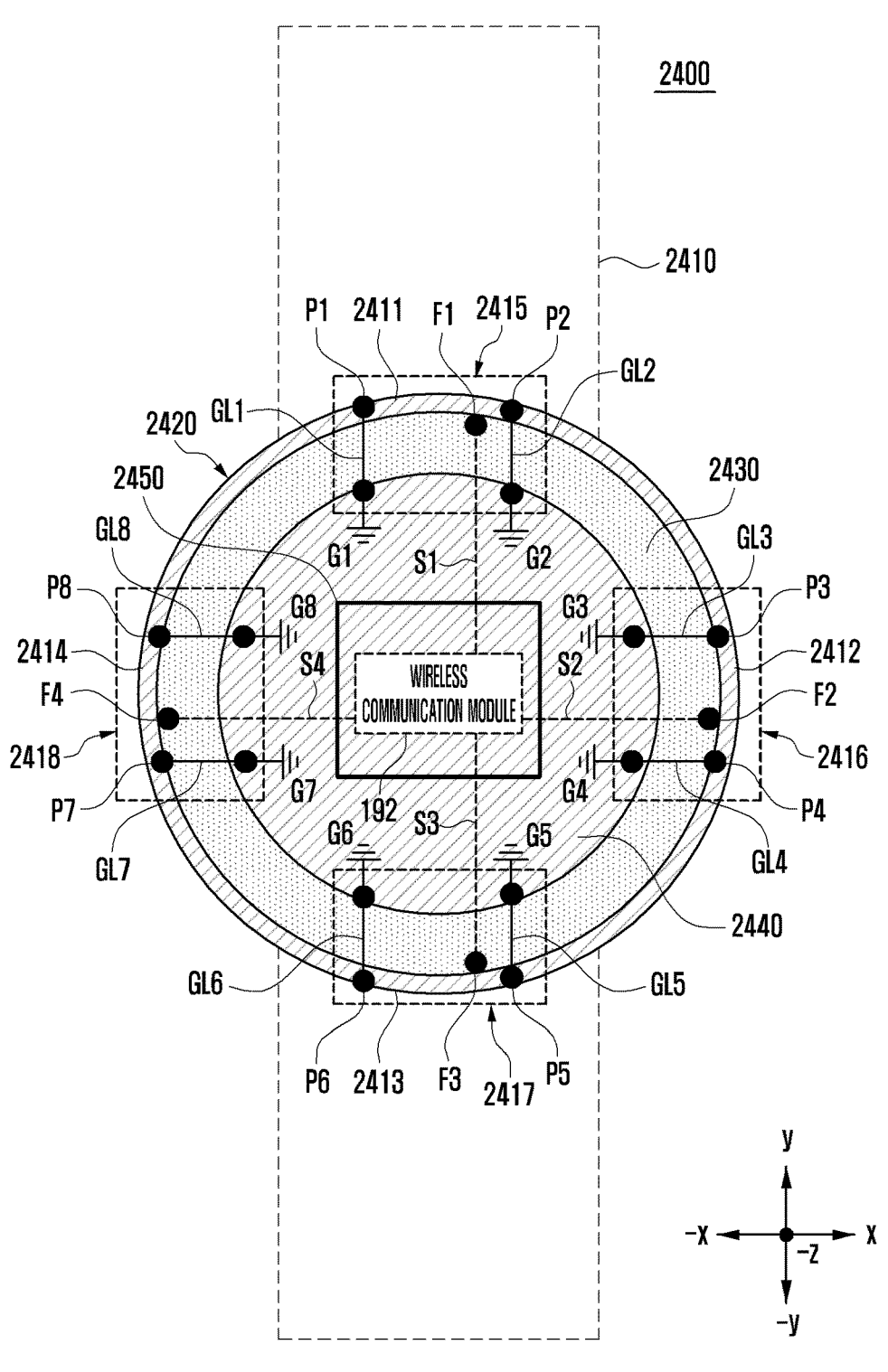
FIG. 28B is a diagram illustrating an embodiment in which a patch antenna of an electronic device is disposed on an intermediate part of a ground of a display according to an embodiment of the disclosure.

FIG. 28B is a diagram illustrating an embodiment in which a patch antenna of an electronic device is disposed on an intermediate part of a ground of a display according to an embodiment of the disclosure.

Figure 28C:
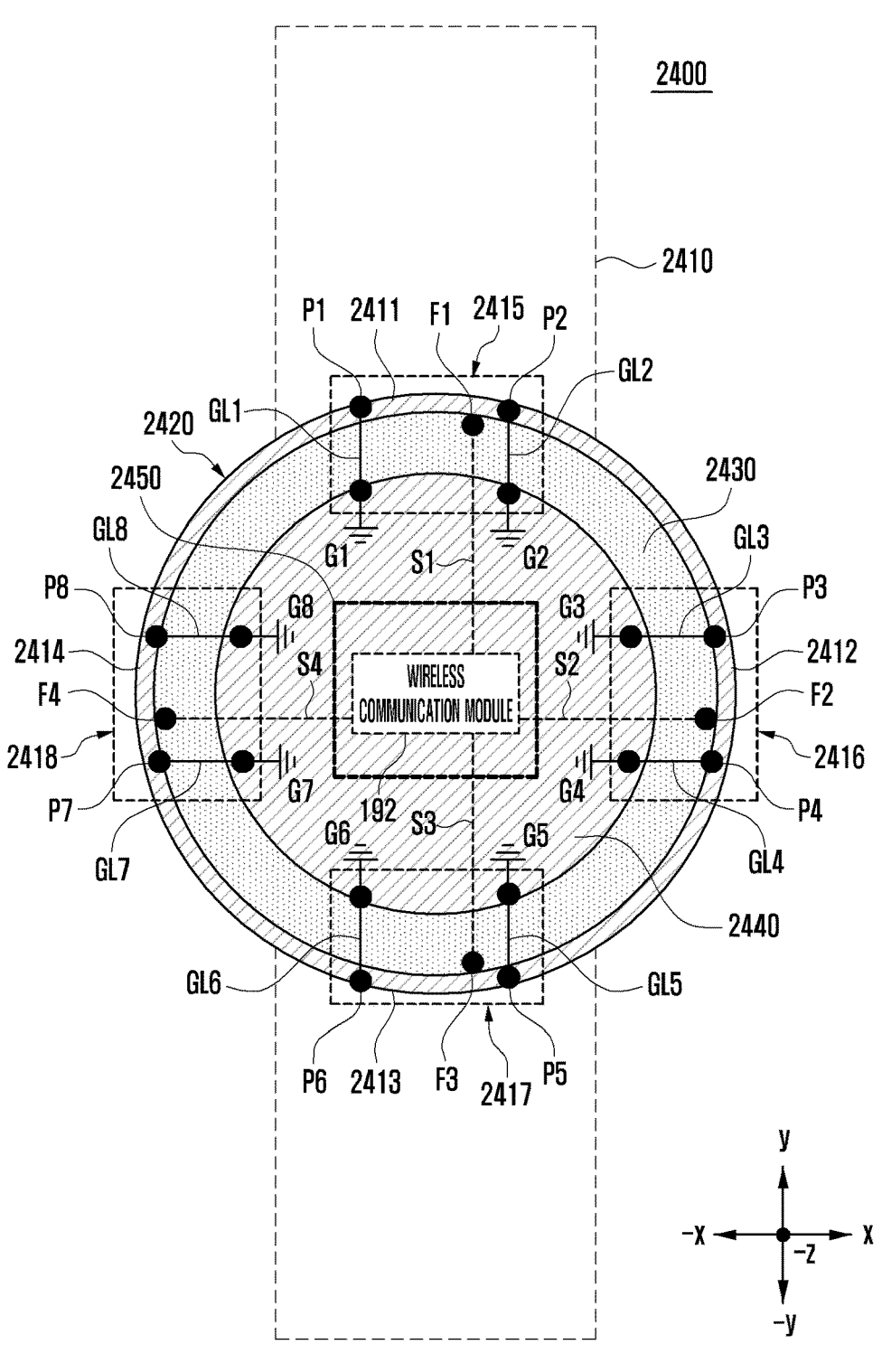
FIG. 28C is a diagram illustrating an embodiment in which an electronic device uses a cut part of a ground of a display as a patch antenna according to an embodiment of the disclosure.

FIG. 28C is a diagram illustrating an embodiment in which an electronic device uses a cut part of a ground of a display as a patch antenna according to an embodiment of the disclosure.

According to various embodiments, the electronic device 2400 disclosed in FIGS. 28A to 28C may include the embodiments disclosed in at least one of FIGS. 26 and 27. In describing the electronic device 2400 disclosed in FIGS. 28A to 28C, the same reference numerals may be given to the constituent elements substantially the same as those in the embodiments disclosed in FIGS. 26 and 27, and duplicate explanation of their functions may be omitted.

According to an embodiment, the electronic device 2400 disclosed in FIGS. 28A to 28C may have a different disposition of the patch antenna 2450, but include substantially a similar constitution as compared with the embodiment disclosed in FIG. 27.

Referring to FIG. 28A, the electronic device 2400 may be disposed on the rear surface (e.g., −z-axis direction) of a ground of a display (e.g., display 330 of FIG. 3). The patch antenna 2450 may be disposed inside the housing 2420. The patch antenna 2450 may be electrically connected to the ground of the display. For example, the display may include a transparent electrode material or a display touch sensor mesh.

Referring to FIG. 28B, in the electronic device 2400, the patch antenna 2450 may be disposed inside the ground of the display. The patch antenna 2450 may be disposed inside the ground through cutting of a part of the ground of the display. The patch antenna 2450 may be disposed inside the housing 2420. In an embodiment, the patch antenna 2450 may further include a ground layer on a surface adjacent to a user's wrist or ankle. The ground layer may be electrically connected to the ground of the electronic device 2400.

Referring to FIG. 28C, the electronic device 2400 may use at least a part of the cut portion of the ground of the display as the patch antenna 2450. The patch antenna 2450 may be disposed inside the housing 2420. The patch antenna 2450 may be electrically connected to the ground of the display.

The electronic device 2400 disclosed in FIGS. 28A to 28C may be disposed among the first antenna 2415 including the first conductive part 2411, the second antenna 2416 including the second conductive part 2412, the third antenna 2417 including the third conductive part 2413, and/or the fourth antenna 2418 including the fourth conductive part 2414.

According to an embodiment, the electronic device 2400 may measure the angle of arrival by using the first polarization (e.g., vertical polarization) signal by using the patch antenna 2450 and the first antenna 2415. The electronic device 2400 may measure the angle of arrival by using the second polarization (e.g., horizontal polarization) signal by using the patch antenna 2450 and the second antenna 2416.

According to an embodiment, in case of measuring the angle of arrival by using the first polarization (e.g., vertical polarization) signal by using the patch antenna 2450 and the first antenna 2415, the third antenna 2417 may not be constituted in the electronic device 2400. In case of measuring the angle of arrival by using the second polarization (e.g., horizontal polarization) signal by using the patch antenna 2450 and the second antenna 2416, the fourth antenna 2418 may not be constituted in the electronic device 2400.

Figure 29A:
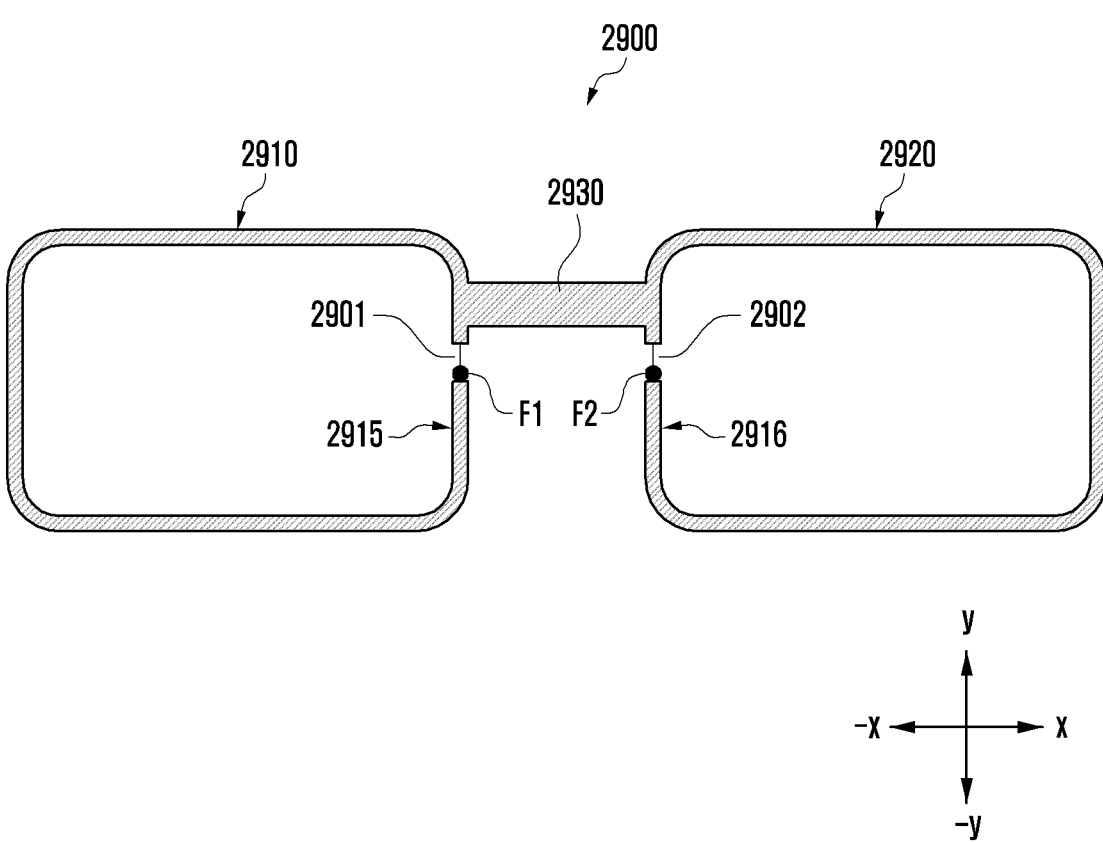
FIG. 29A is a diagram illustrating an embodiment in which an electronic device transmits and/or receives a polarization signal by using a first antenna and a second antenna according to an embodiment of the disclosure.

FIG. 29A is a diagram illustrating an embodiment in which an electronic device transmits and/or receives a polarization signal by using a first antenna and a second antenna according to an embodiment of the disclosure.

Figure 29B:
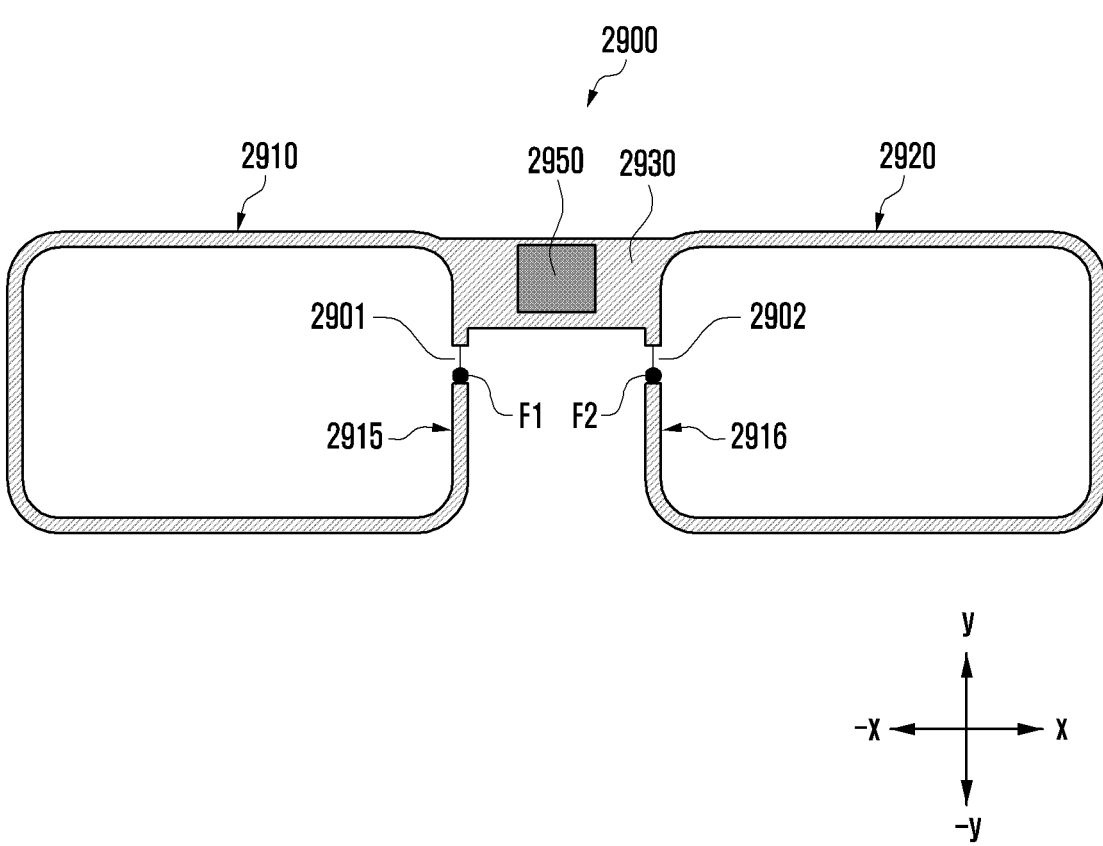
FIG. 29B is a diagram illustrating various embodiments in which an electronic device transmits and/or receives a polarization signal by using a patch antenna, a first antenna, and a second antenna according to an embodiment of the disclosure.

FIG. 29B is a diagram illustrating various embodiments in which an electronic device transmits and/or receives a polarization signal by using a patch antenna, a first antenna, and a second antenna according to an embodiment of the disclosure.

According to various embodiments, an electronic device 2900 disclosed below may include the embodiments of the electronic devices 101, 200, and 300 disclosed in FIGS. 1 to 28C.

Referring to FIGS. 29A and 29B, the electronic device 2900 according to an embodiment of the disclosure may include a wearable electronic device (e.g., augmented reality (AR) glass) that can be used to be detachably attached to a user's body part (e.g., face or head).

According to an embodiment, the electronic device 2900 may include a bridge 2930, a first rim 2910, and a second rim 2920. The bridge 2930 may connect the first rim 2910 and the second rim 2920 with each other. For example, when the user wears the electronic device 2900, the bridge 2930 may be located on a user's nose. The first rim 2910 may be disposed in the first direction (e.g., −x-axis direction) of the bridge 2930. The second rim 2920 may be disposed in the second direction (e.g., x-axis direction) of the bridge 2930. For example, the first rim 2910 and the second rim 2920 may be formed of a metal material and/or a non-metal material (e.g., polymer).

According to an embodiment, the bridge 2930 may include a printed circuit board (e.g., printed circuit board 340 of FIG. 4A) and a patch antenna 2950.

According to an embodiment, the first rim 2910 may include a first segment part 2901. A part (e.g., first conductive part) of the first rim 2910 that is separated through the first segment part 2901 may operate as a first antenna 2915. The first antenna 2915 may be electrically connected to the wireless communication module 192, and receive the feeding signal through a first feeding point F1. For example, the first antenna 2915 may operate in the Wi-Fi frequency band (e.g., about 5 GHz to 7 GHz) and/or in the Bluetooth™ frequency band (e.g., about 2 GHz to 4 GHz). According to various embodiments, the first antenna 2915 may operate in the UWB frequency band (e.g., about 6 GHz to 11 GHz).

According to an embodiment, the second rim 2920 may include a second segment part 2902. A part (e.g., second conductive part) of the second rim 2920 that is separated through the second segment part 2902 may operate as a second antenna 2916. The second antenna 2916 may be electrically connected to the wireless communication module 192, and receive the feeding signal through a second feeding point F2. For example, the second antenna 2916 may operate in the Wi-Fi frequency band (e.g., about 5 GHz to 7 GHz) and/or in the Bluetooth™ frequency band (e.g., about 2 GHz to 4 GHz). According to various embodiments, the second antenna 2916 may operate in the UWB frequency band (e.g., about 6 GHz to 11 GHz).

According to an embodiment, the electronic device 2900 may transmit and/or receive the horizontal polarization (e.g., x-axis direction and/or −x-axis direction) signal by using the first antenna 2915 and the second antenna 2916.

Referring to FIG. 29B, the electronic device 2900 may include the patch antenna 2950 on the bridge 2930. For example, the patch antenna 2950 may operate in the UWB frequency band (e.g., about 6 GHz to 11 GHz).

According to an embodiment, the electronic device 2900 may transmit and/or receive the vertical polarization (e.g., y-axis direction and/or −y-axis direction) signal by using the patch antenna 2950 and the first antenna 2915. According to various embodiments, the electronic device 2900 may transmit and/or receive the vertical polarization (e.g., y-axis direction and/or −y-axis direction) by using the patch antenna 2950 and the second antenna 2916.

An electronic device 101, 200, or 300 according to an embodiment of the disclosure may include: a housing 210 including a front plate 320, a rear plate 380, and a lateral member 310 surrounding a space between the front plate 320 and the rear plate 380; a printed circuit board 340 disposed inside the housing 210 and including a ground, and including a first ground point G1 and a second ground point G2 electrically connected to a first point P1 and a second point P2 of a first conductive part 411 formed on the lateral member 310; a first antenna 410 including a first feeding point F1 disposed between the first point P1 and the second point P2 of the first conductive part 411 formed on the lateral member 310, and configured to transmit and/or receive a first polarization signal; a patch antenna 400 disposed inside the housing 210, including a first feeding point PF1, and configured to transmit and/or receive a first polarization signal; a wireless communication module 192 electrically connected to the first feeding point F1 of the first conductive part 411 and the first feeding point PF1 of the patch antenna 400; and a processor 120 electrically connected to the wireless communication module 192, wherein the processor 120 is configured to transmit and/or receive the first polarization signal by using the patch antenna 400 and the first antenna 410.

According to an embodiment, the lateral member 310 may include a first segment part 401, a second segment part 402, and a third segment part 403; the first conductive part 411 may be disposed between the first segment part 401 and the second segment part 402; and the electronic device may further include a second antenna 420 disposed between the second segment part 402 and the third segment part 403, and including a second conductive part 412 including a second feeding point F2, a third point P3, and a fourth point P4.

According to an embodiment, the printed circuit board 340 may include a third ground point G3 and a fourth ground point G4; the second conductive part 412 may include the second feeding point F2 disposed between the third point P3 and the fourth point P4; the patch antenna 400 may include a second feeding point PF2; the second feeding point F2 of the second conductive part 412 and the second feeding point PF2 of the patch antenna may be electrically connected to the wireless communication module 192; and the processor 120 may be configured to transmit and/or receive a second polarization signal by using the second antenna 420 including the second conductive part 412 and the patch antenna 400.

According to an embodiment, the processor 120 may be configured to transfer a feeding signal to the first feeding point PF1 of the patch antenna 400 and the first feeding point F1 of the first conductive part 411 through the wireless communication module 192 in case of transmission and/or reception of the first polarization signal.

According to an embodiment, the processor 120 may be configured to transfer a feeding signal to the second feeding point PF2 of the patch antenna 400 and the second feeding point F2 of the second conductive part 412 through the wireless communication module 192 in case of transmission and/or reception of the second polarization signal.

According to an embodiment, a first diplexer 451 may be disposed between the wireless communication module 192 and the first antenna 410; a second diplexer 452 may be disposed between the wireless communication module 192 and the second antenna 420; a first filter 461 may be disposed between the wireless communication module 192 and the first feeding point PF1 of the patch antenna 400; and a second filter 462 may be disposed between the wireless communication module 192 and the second feeding point PF2 of the patch antenna 400.

According to an embodiment, the electronic device may further include a first matching circuit M1 and a second matching circuit M2 electrically connected to the processor 120; the first matching circuit M1 may be electrically connected between the first point P1 and the first ground point G1; and the second matching circuit M2 may be electrically connected between the second point P2 and the second ground point G2.

According to an embodiment, the electronic device may further include a third matching circuit M3 and a fourth matching circuit M4 electrically connected to the processor 120; the third matching circuit M3 may be electrically connected between the third point P3 and the third ground point G3; and the fourth matching circuit M4 may be electrically connected between the fourth point P4 and the fourth ground point G4.

According to an embodiment, a first coupling pattern 910 may be disposed between the first conductive part 411 and the printed circuit board 340; and a second coupling pattern 920 may be disposed between the second conductive part 412 and the printed circuit board 340.

According to an embodiment, the electronic device may further include a third antenna 1110 disposed on the patch antenna 400; and the patch antenna 400 may be configured to perform a ground function of the third antenna 1110.

An electronic device 101, 200, or 300 according to an embodiment of the disclosure may include: a lateral member 310 including a first segment part 401, a second segment part 402, and a third segment part 403; a printed circuit board 340 disposed inside the lateral member 310 to be at least partly spaced apart from the lateral member 310 and including a ground, and including a first ground point G1, a second ground point G2, a third ground point G3, and/or a fourth ground point G4; a first antenna 410 disposed between the first segment part 401 and the second segment part 402, and including a first conductive part 411 including a first feeding point F1, a first point P1, and a second point P2; a second antenna 420 disposed between the second segment part 402 and the third segment part 403, and including a second conductive part 412 including a second feeding point F2, a third point P3, and a fourth point P4; a patch antenna 400 disposed inside the lateral member 310, and including a feeding point PF; a wireless communication module 192 electrically connected to the first feeding point F1 of the first conductive part 411, the second feeding point F2 of the second conductive part 412, and the feeding point PF of the patch antenna 400; and a processor 120 electrically connected to the wireless communication module 192, wherein the processor 120 is configured to transmit and/or receive a polarization signal by using the patch antenna 400, the first antenna 410, and the second antenna 420.

According to an embodiment, the processor 120 may be configured to: transfer a feeding signal to the feeding point PF of the patch antenna 400, the first feeding point F1 of the first conductive part 411, and the second feeding point F2 of the second conductive part 412 through the wireless communication module 192, and transmit and/or receive the polarization signal.

According to an embodiment, the polarization signal may include a first polarization signal and a second polarization signal.

According to an embodiment, the first point P1 may be electrically connected to the first ground point G1; the second point P2 may be electrically connected to the second ground point G2; and the first feeding point F1 may be located between the first point P1 and the second point P2.

According to an embodiment, the third point P3 may be electrically connected to the third ground point G3; the fourth point P4 may be electrically connected to the fourth ground point G4; and the second feeding point F2 may be located between the third point P3 and the fourth point P4.

According to an embodiment, a first diplexer 451 may be disposed between the wireless communication module 192 and the first antenna 410; a second diplexer 452 may be disposed between the wireless communication module 192 and the second antenna 420; a first filter 461 may be disposed between the wireless communication module 192 and the first feeding point PF1 of the patch antenna 400; and a second filter 462 may be disposed between the wireless communication module 192 and the second feeding point PF2 of the patch antenna 400.

According to an embodiment, the electronic device may further include a first matching circuit M1 and a second matching circuit M2 electrically connected to the processor 120; the first matching circuit M1 may be electrically connected between the first point P1 and the first ground point G1; and the second matching circuit M2 may be electrically connected between the second point P2 and the second ground point G2.

According to an embodiment, the electronic device may further include a third matching circuit M3 and a fourth matching circuit M4 electrically connected to the processor 120; the third matching circuit M3 may be electrically connected between the third point P3 and the third ground point G3; and the fourth matching circuit M4 may be electrically connected between the fourth point P4 and the fourth ground point G4.

According to an embodiment, a first coupling pattern 910 may be disposed between the first conductive part 411 and the printed circuit board 340; and a second coupling pattern 920 may be disposed between the second conductive part 412 and the printed circuit board 340.

According to an embodiment, the electronic device may further include a third antenna 1110 disposed on the patch antenna 400; and the patch antenna 400 may be configured to perform a ground function of the third antenna 1110.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a front plate, a rear plate, and a lateral member surrounding a space between the front plate and the rear plate;
a printed circuit board disposed inside the housing and including a ground, a first ground point, and a second ground point electrically connected to a first point and a second point, respectively, of a first conductive part formed on the lateral member;
a first antenna including a first feeding point disposed between the first point and the second point of the first conductive part formed on the lateral member, the first antenna being configured to at least one of transmit or receive a first polarization signal;
a patch antenna disposed inside the housing and including a first feeder point, the patch antenna being configured to at least one of transmit or receive the first polarization signal;
a wireless communication circuit electrically connected to the first feeding point of the first conductive part and the first feeder point of the patch antenna; and
a processor electrically connected to the wireless communication circuit,
wherein the processor is configured to at least one of transmit or receive the first polarization signal by using the patch antenna and the first antenna simultaneously.

2. The electronic device of claim 1,
wherein the lateral member includes a first segment part, a second segment part, and a third segment part,
wherein the first conductive part is disposed between the first segment part and the second segment part, and
wherein the electronic device further comprises:
a second antenna disposed between the second segment part and the third segment part, the second antenna including a second conductive part including a second feeding point, a third point, and a fourth point.

3. The electronic device of claim 2,
wherein the printed circuit board further includes a third ground point and a fourth ground point,
wherein the second conductive part includes the second feeding point disposed between the third point and the fourth point,
wherein the patch antenna further includes a second feeder point,
wherein the second feeding point of the second conductive part and the second feeder point of the patch antenna are electrically connected to the wireless communication circuit, and
wherein the processor is further configured to at least one of transmit or receive a second polarization signal by using the patch antenna and the second antenna including the second conductive part.

4. The electronic device of claim 3, wherein the processor is further configured to transfer a feeding signal to the second feeder point of the patch antenna and the second feeding point of the second conductive part through the wireless communication circuit in case of at least one of transmitting or receiving the second polarization signal.

5. The electronic device of claim 3,
wherein a first diplexer is disposed between the wireless communication circuit and the first antenna,
wherein a second diplexer is disposed between the wireless communication circuit and the second antenna,
wherein a first filter is disposed between the wireless communication circuit and the first feeder point of the patch antenna, and
wherein a second filter is disposed between the wireless communication circuit and the second feeder point of the patch antenna.

6. The electronic device of claim 3, further comprising:
a third matching circuit electrically connected to the processor; and
a fourth matching circuit electrically connected to the processor,
wherein the third matching circuit is electrically connected between the third point and the third ground point, and
wherein the fourth matching circuit is electrically connected between the fourth point and the fourth ground point.

7. The electronic device of claim 2,
wherein a first coupling pattern is disposed between the first conductive part and the printed circuit board, and
wherein a second coupling pattern is disposed between the second conductive part and the printed circuit board.

8. The electronic device of claim 1, wherein the processor is further configured to transfer a feeding signal to the first feeder point of the patch antenna and the first feeding point of the first conductive part through the wireless communication circuit in case of at least one of transmitting or receiving the first polarization signal.

9. The electronic device of claim 1, further comprising:
a first matching circuit electrically connected to the processor; and
a second matching circuit electrically connected to the processor,
wherein the first matching circuit is electrically connected between the first point and the first ground point, and
wherein the second matching circuit is electrically connected between the second point and the second ground point.

10. The electronic device of claim 1, further comprising:
a third antenna disposed on the patch antenna,
wherein the patch antenna is further configured to perform a ground function of the third antenna.

11. The electronic device of claim 1, wherein the processor is further configured to:
control the wireless communication circuit to transfer a first feeding signal to the patch antenna and to the first antenna in case of at least one of transmitting or receiving the first polarization signal, and
control the wireless communication circuit to transfer a second feeding signal to the patch antenna and to a second antenna in case of at least one of transmitting or receiving a second polarization signal.

12. An electronic device comprising:
a lateral member including a first segment part, a second segment part, and a third segment part;
a printed circuit board including a ground and being disposed inside a housing of the electronic device while being at least partly spaced apart from the lateral member, the printed circuit board further including a first ground point, a second ground point, a third ground point, and a fourth ground point;

a first antenna disposed between the first segment part and the second segment part, the first antenna including a first conductive part including a first feeding point, a first point, and a second point;

a second antenna disposed between the second segment part and the third segment part, the second antenna including a second conductive part including a second feeding point, a third point, and a fourth point;

a patch antenna disposed inside the housing and including a first feeder point;

a wireless communication circuit electrically connected to the first feeding point of the first conductive part, the second feeding point of the second conductive part, and the first feeder point of the patch antenna; and a processor electrically connected to the wireless communication circuit, wherein the processor is configured to at least one of transmit or receive a polarization signal by using the patch antenna, the first antenna, and the second antenna simultaneously.

13. The electronic device of claim 12, wherein the processor is further configured to:

transfer a feeding signal to the first feeder point of the patch antenna, the first feeding point of the first conductive part, and the second feeding point of the second conductive part through the wireless communication circuit; and at least one of transmit or receive the polarization signal, and wherein the polarization signal comprises a first polarization signal and a second polarization signal.

14. The electronic device of claim 12, wherein the first point is electrically connected to the first ground point, wherein the second point is electrically connected to the second ground point, and wherein the first feeding point is located between the first point and the second point.

15. The electronic device of claim 12, wherein the third point is electrically connected to the third ground point, wherein the fourth point is electrically connected to the fourth ground point, and wherein the second feeding point is located between the third point and the fourth point.

16. The electronic device of claim 12, wherein the patch antenna further includes a second feeder point, wherein a first diplexer is disposed between the wireless communication circuit and the first antenna, wherein a second diplexer is disposed between the wireless communication circuit and the second antenna, wherein a first filter is disposed between the wireless communication circuit and the first feeder point of the patch antenna, and wherein a second filter is disposed between the wireless communication circuit and the second feeder point of the patch antenna.

17. The electronic device of claim 12, further comprising:

a first matching circuit electrically connected to the processor; and a second matching circuit electrically connected to the processor, wherein the first matching circuit is electrically connected between the first point and the first ground point, and wherein the second matching circuit is electrically connected between the second point and the second ground point.

18. The electronic device of claim 12, further comprising:

a third matching circuit electrically connected to the processor; and a fourth matching circuit electrically connected to the processor, wherein the third matching circuit is electrically connected between the third point and the third ground point, and wherein the fourth matching circuit is electrically connected between the fourth point and the fourth ground point.

19. The electronic device of claim 12, wherein a first coupling pattern is disposed between the first conductive part and the printed circuit board, and wherein a second coupling pattern is disposed between the second conductive part and the printed circuit board.

20. The electronic device of claim 12, further comprising:

a third antenna disposed on the patch antenna, wherein the patch antenna is configured to perform a ground function of the third antenna.

* * * * *